United States Patent
Nakayama et al.

(10) Patent No.: US 12,466,143 B2
(45) Date of Patent: Nov. 11, 2025

(54) METHOD FOR MANUFACTURING FIBER-REINFORCED RESIN STRUCTURE

(71) Applicant: HOKURIKU COLOR FOAM CO., LTD., Nomi (JP)

(72) Inventors: Nami Nakayama, Nomi (JP); Yuichi Kondo, Nomi (JP)

(73) Assignee: HOKURIKU COLOR FOAM CO., LTD., Nomi (JP)

( * ) Notice: Subject to any disclaimer, the term of this patent is extended or adjusted under 35 U.S.C. 154(b) by 145 days.

(21) Appl. No.: 17/781,532

(22) PCT Filed: Jun. 17, 2020

(86) PCT No.: PCT/JP2020/023871
§ 371 (c)(1),
(2) Date: Jun. 1, 2022

(87) PCT Pub. No.: WO2021/111661
PCT Pub. Date: Jun. 10, 2021

(65) Prior Publication Data
US 2023/0102696 A1    Mar. 30, 2023

(30) Foreign Application Priority Data

Dec. 2, 2019  (JP) .................................. 2019-218410
Dec. 2, 2019  (JP) .................................. 2019-218411
(Continued)

(51) Int. Cl.
*B29C 70/68*  (2006.01)
*B29C 70/34*  (2006.01)
(Continued)

(52) U.S. Cl.
CPC .............. *B29C 70/68* (2013.01); *B29C 70/34* (2013.01); *B29K 2023/00* (2013.01); *B29K 2105/04* (2013.01); *B29K 2995/0063* (2013.01)

(58) Field of Classification Search
CPC ................................ B29C 70/68; B29C 70/34
See application file for complete search history.

(56) References Cited

U.S. PATENT DOCUMENTS 2,875,117 A * 2/1959 Kloote .................... B32B 27/00
                                                     428/317.1
4,292,106 A * 9/1981 Herschdorfer ............. C08J 5/08
                                                     156/244.14
(Continued)

FOREIGN PATENT DOCUMENTS

JP    S54-022470 A    2/1979
JP    S63-312136 A    12/1988
(Continued)

OTHER PUBLICATIONS

International Preliminary Report on Patentability for the corresponding International patent application No. PCT/JP2020/023871 mailed May 17, 2022, which includes English translation of Written Opinion of the International Searching Authority for PCT/JP2020/023871 mailed Jul. 28, 2020.

*Primary Examiner* — Andrew D Graham
(74) *Attorney, Agent, or Firm* — Muncy, Geissler, Olds & Lowe, P.C.

(57) ABSTRACT

A novel method for producing a fiber-reinforced resin structure is provided, which has excellent strength but can be formed in various shapes. A fiber-reinforced resin structure is manufactured by preparing an assembly including a first foam having a columnar shape, a fiber body covering at least a part of a side surface portion of the first foam, and a second foam having a columnar shape adjacent to the first foam via the fiber body.

15 Claims, 49 Drawing Sheets

(30) Foreign Application Priority Data

| | | | |
|---|---|---|---|
| Dec. 2, 2019 | (JP) | ................................ | 2019-218412 |
| Dec. 2, 2019 | (JP) | ................................ | 2019-218413 |
| Jun. 17, 2020 | (JP) | ................................ | 2020-104766 |
| Jun. 17, 2020 | (JP) | ................................ | 2020-104767 |
| Jun. 17, 2020 | (JP) | ................................ | 2020-104768 |
| Jun. 17, 2020 | (JP) | ................................ | 2020-104769 |

(51) Int. Cl.
  *B29K 23/00* (2006.01)
  *B29K 105/04* (2006.01)

(56) References Cited

U.S. PATENT DOCUMENTS

| | | | | |
|---|---|---|---|---|
| 4,395,459 | A * | 7/1983 | Herschdorfer | H05K 1/0313 |
| | | | | 156/244.14 |
| 5,589,243 | A * | 12/1996 | Day | B29C 44/5654 |
| | | | | 428/56 |
| 5,834,082 | A * | 11/1998 | Day | E04C 2/296 |
| | | | | 428/56 |
| 5,900,194 | A * | 5/1999 | Ashton | B29C 37/0003 |
| | | | | 264/313 |
| 5,908,689 | A * | 6/1999 | Dana | D04H 3/004 |
| | | | | 442/388 |
| 6,586,110 | B1 * | 7/2003 | Obeshaw | B32B 3/12 |
| | | | | 428/116 |
| 6,821,638 | B2 * | 11/2004 | Obeshaw | B21C 37/154 |
| | | | | 428/116 |
| 6,949,282 | B2 * | 9/2005 | Obeshaw | F16F 7/122 |
| | | | | 138/119 |
| 6,996,860 | B1 * | 2/2006 | Blake | A47K 3/001 |
| | | | | 4/504 |
| 7,833,455 | B2 | 11/2010 | Kobayashi et al. | |
| 8,281,547 | B2 * | 10/2012 | Hettick | E04H 12/085 |
| | | | | 52/843 |
| 8,419,883 | B2 * | 4/2013 | Day | B29C 70/865 |
| | | | | 428/317.1 |
| 8,470,425 | B2 * | 6/2013 | Day | B32B 5/022 |
| | | | | 416/223 R |
| 8,646,183 | B2 * | 2/2014 | Tompkins | B29C 70/86 |
| | | | | 428/188 |
| 8,663,791 | B2 * | 3/2014 | Day | B32B 3/18 |
| | | | | 428/317.1 |
| 2002/0180104 | A1 | 12/2002 | Kobayashi et al. | |
| 2003/0198775 | A1 * | 10/2003 | Roth | B29C 70/50 |
| | | | | 442/295 |
| 2004/0071964 | A1 * | 4/2004 | Nesbitt | B29C 70/10 |
| | | | | 428/292.1 |
| 2004/0157519 | A1 * | 8/2004 | Goodell | B32B 5/28 |
| | | | | 442/181 |
| 2005/0269826 | A1 * | 12/2005 | Kobayashi | B29C 70/345 |
| | | | | 294/11 |
| 2008/0254281 | A1 * | 10/2008 | Chen | B32B 27/32 |
| | | | | 428/335 |
| 2009/0191448 | A1 * | 7/2009 | Yamamoto | H01M 50/124 |
| | | | | 264/261 |
| 2009/0324875 | A1 * | 12/2009 | Heikkila | B29C 70/58 |
| | | | | 428/323 |
| 2010/0266833 | A1 * | 10/2010 | Day | B29C 44/1285 |
| | | | | 156/195 |
| 2011/0136602 | A1 * | 6/2011 | Hsu | B29C 70/446 |
| | | | | 473/535 |
| 2012/0233861 | A1 * | 9/2012 | Tompkins | B29D 99/0021 |
| | | | | 29/897.32 |
| 2012/0302118 | A1 * | 11/2012 | Kasuya | B29C 70/465 |
| | | | | 525/240 |
| 2012/0315429 | A1 * | 12/2012 | Stamp | B32B 3/12 |
| | | | | 428/72 |
| 2014/0199515 | A1 * | 7/2014 | Oyabu | C08J 5/042 |
| | | | | 428/221 |
| 2015/0017437 | A1 * | 1/2015 | Kenny | B29C 70/523 |
| | | | | 428/394 |

FOREIGN PATENT DOCUMENTS

| | | |
|---|---|---|
| JP | S64-078825 A | 3/1989 |
| JP | H04-265714 A | 9/1992 |
| JP | H06-312483 A | 11/1994 |
| JP | 2002-292591 A | 10/2002 |
| JP | 2013-035247 A | 2/2013 |

* cited by examiner

FIG. 1 (a) (b)
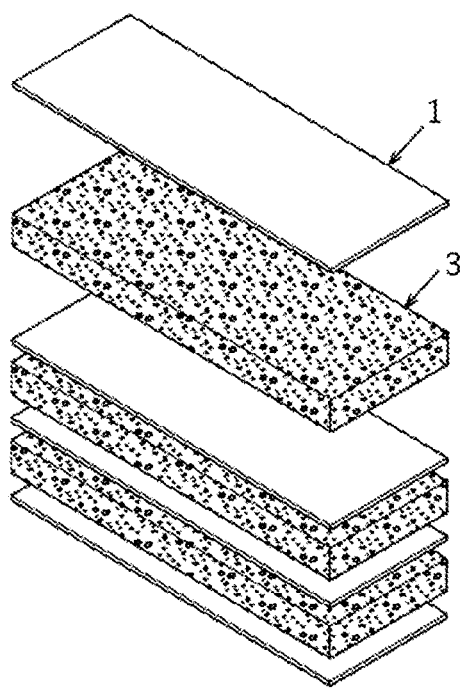
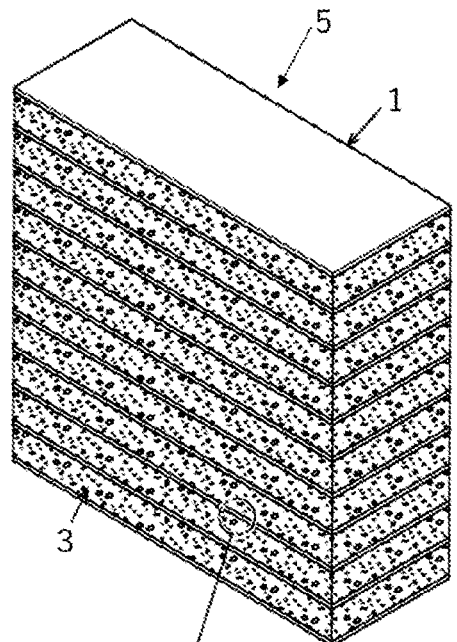
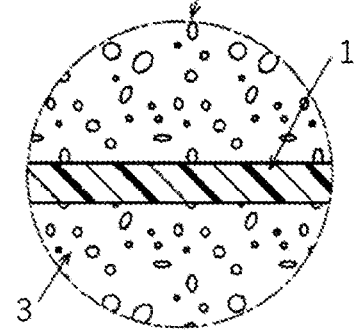

(a) (b)

(c) (d)

(a)

(b)

(a)

(b)

(c)

(d)

(a)

(b)

(c)

FIG. 24-2
(e)
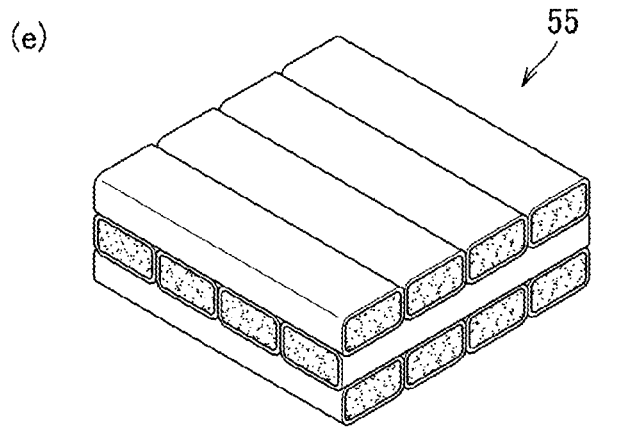
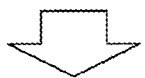
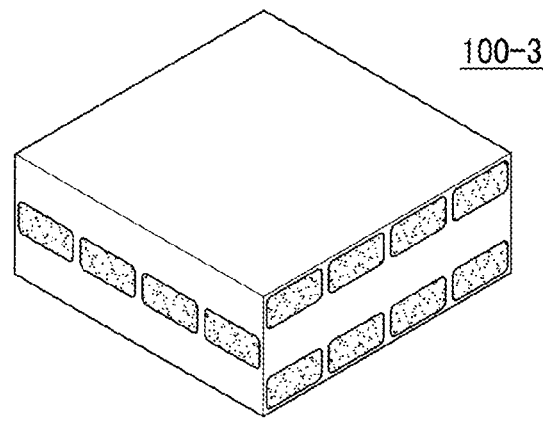
(f)
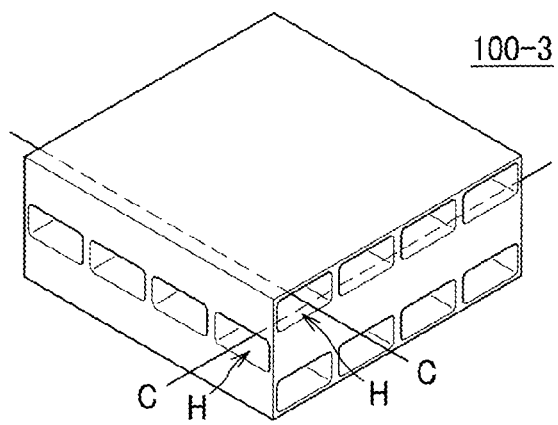

(1)

(2)

FIG. 32-1
(a)
(b)
(c)
(d)
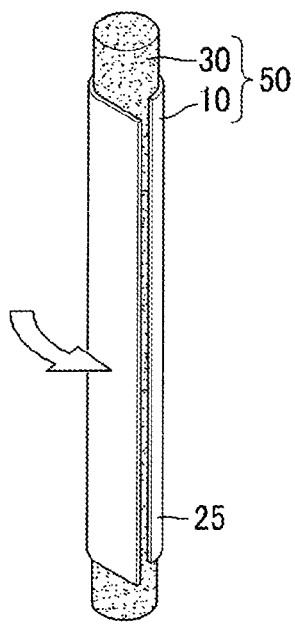
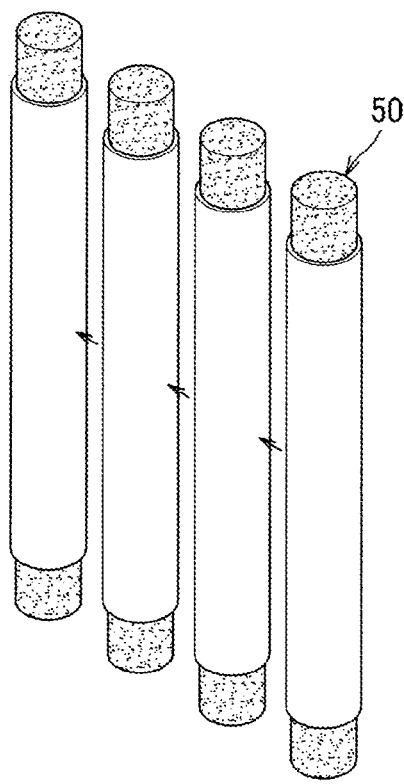
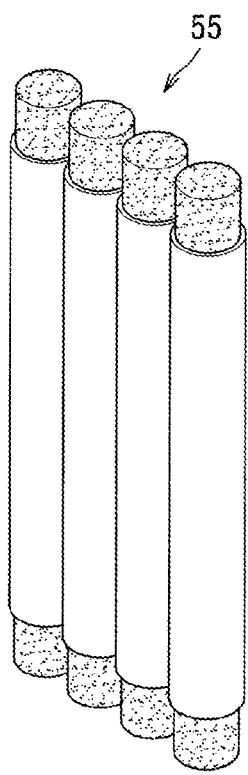
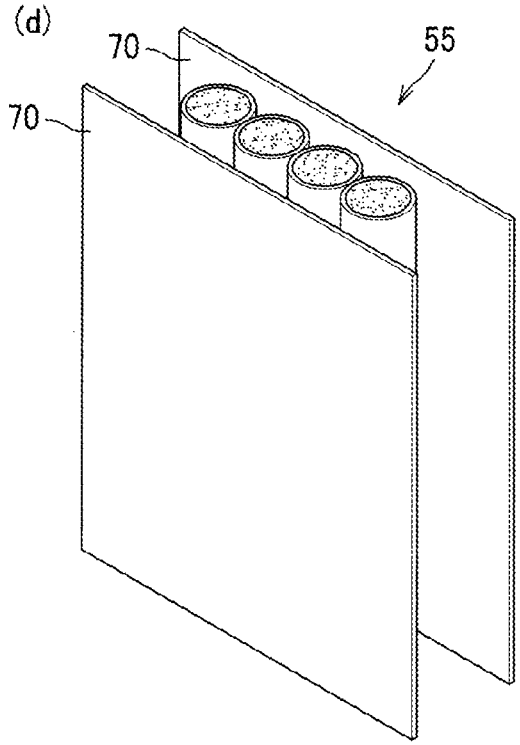

FIG. 33-1
(a)
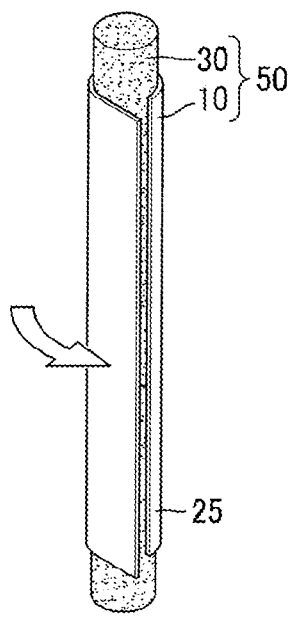
(b)
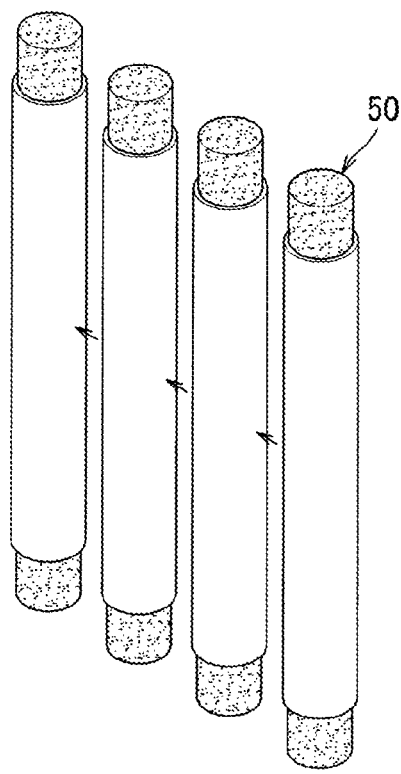
(c)
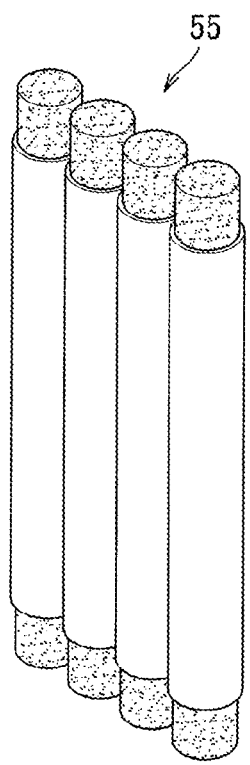
(d)
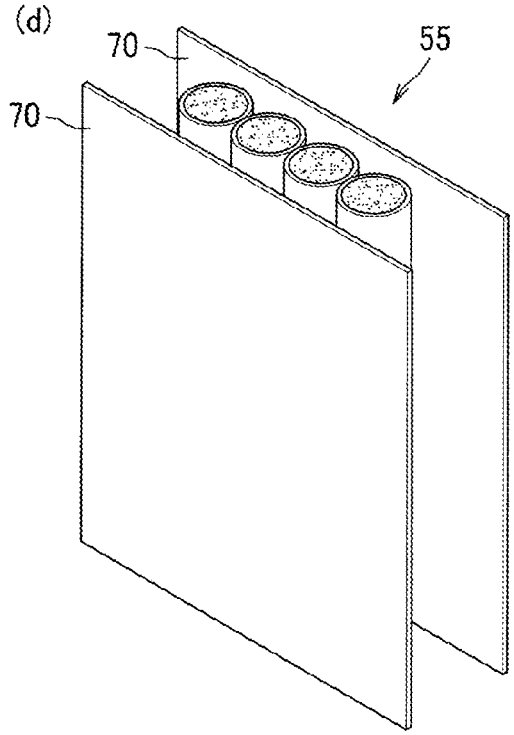

(a)

(b)

(a)

(b)

FIG. 38-1
(a)
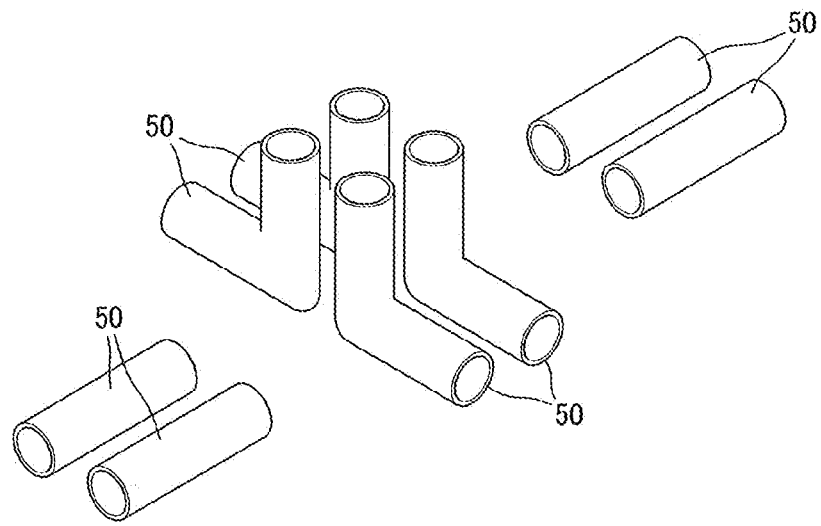
(b)
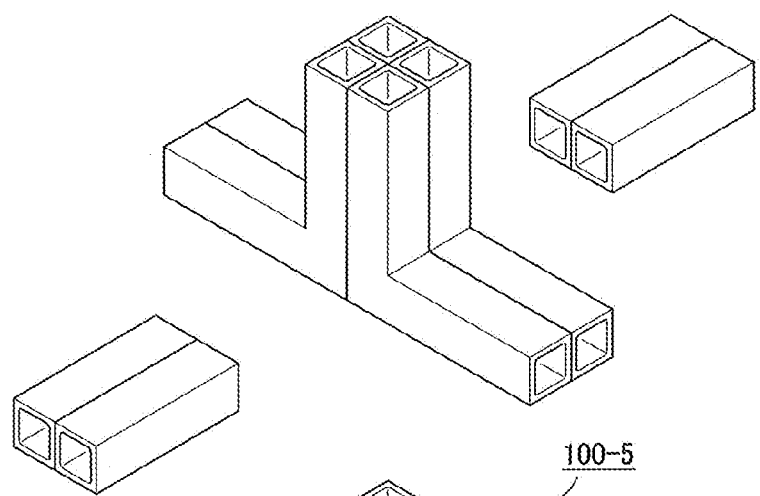
(c)
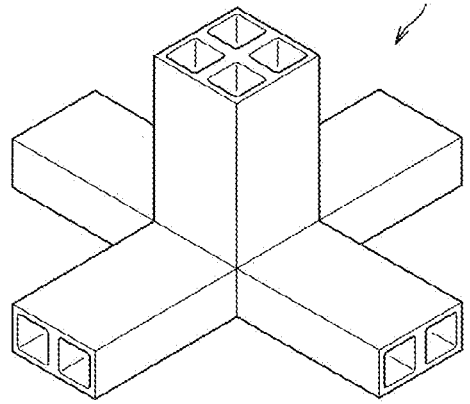

(a)

(b)

(a)

(b)

(a)

(b)

(a)

(b)

(a)

(b)

METHOD FOR MANUFACTURING FIBER-REINFORCED RESIN STRUCTURE

TECHNICAL FIELD

The present invention relates to a method for producing a fiber-reinforced resin structure containing a fiber body and a resin.

Conventionally, a composite material composed of a reinforcing fiber body such as CFRP and a flexible body such as foam has been proposed (see, for example, Patent Literature 1).

PRIOR ART DOCUMENT

Citation List

Patent Literature

Patent Literature 1:JP63-312136

SUMMARY OF INVENTION

Technical Problem

Although the method described in Patent Literature 1 has excellent strength due to fiber reinforcement even though a part of the method is curved, only a fiber-reinforced resin structure having a predetermined shape can be manufactured.

Therefore, the object of the present invention is to provide a novel method for producing a fiber-reinforced resin structure which has a predetermined excellent strength and can have various shapes. Furthermore, a second object of the present invention is to provide a novel fiber-reinforced resin structure which can be manufactured by the manufacturing method thereof.

Solution to Problem

The invention (1) is a method for producing a fiber-reinforced resin structure, comprising the steps of preparing a laminate having a columnar foam and a fiber body wound around one or more sides of the foam, the fiber body being impregnated with an uncured thermosetting resin, applying an external force to the laminate, deforming a cross-sectional shape of the foam included in the laminate, and thermally curing the thermosetting resin included in the laminate, wherein a 25% compressive load measured according to JIS K6400-2: 2012 of the foam is 1 to 2000 kPa (except for a method using a foam capable of secondary foaming as the foam, a covering body having a bleed hole through which the uncured thermosetting resin and gas can seep out, and covering the laminate).

In the invention (I), the foam may be an olefin resin foam.

In the invention (I), the foam may have a density of 1 to 800 kg/m$^3$.

In the invention (I), the deformation of the cross-sectional shape of the foam may be performed in a reduced pressure atmosphere.

The invention (I) may include the steps of cooling the laminate after the step of thermally curing the laminate to shrink the foam, and the steps of removing the foam contained in the laminate after the step of shrinking the foam.

The invention (II) is a method for producing a fiber-reinforced resin structure, comprising the steps of: preparing a laminate having a columnar foam and a fiber body covering at least a part of a side surface portion of the foam, the fiber body being impregnated with an uncured thermosetting resin; curving the laminate so that a columnar axis of the foam is curved; and thermally curing the thermosetting resin contained in the laminate, wherein a 25% compressive load of the foam measured according to JIS K6400-2: 2012 is 1 to 2000 kPa (except for a method using a secondary foamable foam as the foam and a covering body having bleed holes through which the uncured thermosetting resin and gas can be exuded and covering the laminate).

In the laminate according to the invention (II), the fiber body may be wound one or more turns around the side surface portion of the foam.

In the invention (II), the foam may be an olefin resin foam.

In the invention (II), the foam may have a density of 1 to 800 kg/m$^3$.

The invention (II) may include the steps of cooling the laminate to shrink the foam after the step of thermally curing, and removing the foam contained in the laminate after the step of shrinking the foam.

The invention (III) is a method for producing a fiber-reinforced resin structure, comprising the steps of: preparing an assembly having a first foam in a columnar shape, a fiber body wound around one or more sides of the first foam, and a second foam in a columnar shape adjacent to the first foam with the fiber body interposed therebetween, the fiber body being impregnated with an uncured thermosetting resin, and thermally curing the thermosetting resin contained in the assembly, wherein a 25% compressive load of the first foam and the second foam measured in accordance with JIS K6400-2: 2012 is 1 to 2000 kPa. A coating having bleed holes through which uncured thermosetting resin and gas can seep and covering the assembly; Except for the method using The invention (III) may include a deformation process of applying an external force to the assembly to deform the cross-sectional shapes of the first foam and the second foam before thermally curing the thermosetting resin contained in the assembly.

The assembly may include the first foam, the fiber body wound around one or more sides of the first foam, the second foam, and the fiber body wound around one or more sides of the second foam, and the fiber body wound around one or more sides of the first foam.

The first foam and the second foam may be olefin resin foams.

The invention (III) may have a density of 1 to 800 kg/m$^3$ between the first foam and the second foam.

In the III aspect, the deformation process may be performed in a reduced pressure atmosphere.

The invention (III) may include the steps of cooling the assembly after the step of thermally curing to shrink the first foam and the second foam, and the steps of removing the first foam and the second foam included in the assembly after the step of shrinking the first foam and the second foam.

The invention (IV) is a method for producing a fiber-reinforced resin structure, comprising the steps of: preparing an assembly having a columnar first foam, a fiber body covering at least a part of a side surface portion of the first foam, and a columnar second foam adjacent to the first foam via the fiber body, the fiber body being impregnated with an uncured thermosetting resin; curving the assembly so that a columnar axis of the foam is curved; and thermally curing the thermosetting resin contained in the assembly, wherein a 25% compressive load of the first foam and the second foam measured in accordance with JIS K6400-2: 2012 is 1 to 2000 kPa (a foam capable of secondary foaming as the first foam) A coating having bleed holes through which uncured thermosetting resin and gas can seep and covering the assembly; Except for the method using The invention (IV) may further include a deformation process of applying an external force to the assembly to deform the cross-sectional shapes of the first foam and the second foam before thermally curing the thermosetting resin included in the assembly.

In the assembly of the invention (IV), the fiber body may be wound one or more turns around the side surface portion of the first foam.

In the invention (IV), the assembly may include the first foam, the fiber body wound around one or more sides of the first foam, the second foam, and the fiber body wound around one or more sides of the second foam, and the fiber body wound around one or more sides of the first foam and the fiber body wound around one or more sides of the first foam may be in contact with each other.

In the invention (IV), the first foam and the second foam may be olefin resin foams.

In the invention (IV), the first foam and the second foam may have a density of 1 to 800 kg/m$^3$.

In the invention (IV), the deformation process may be performed in a reduced pressure atmosphere.

The invention (IV) may include cooling the assembly after the thermally curing step to shrink the first and second foams and removing the first and second foams from the assembly after the first and second foams are shrunk.

A method for producing a fiber reinforced resin structure, comprising the steps of: preparing an assembly having a first foam body in a columnar shape, a fiber body covering at least a part of a side surface portion of the first foam body, and a second foam body in a columnar shape adjacent to the first foam body via the fiber body, the fiber body being impregnated with an uncured thermosetting resin; curving the assembly so that a column axis of the foam is curved; and thermally curing the thermosetting resin contained in the assembly, wherein the first foam body and the second foam body are substantially solid (a foam capable of secondary foaming as the first foam) A coating having bleed holes through which uncured thermosetting resin and gas can seep and covering the assembly; This may be the same (except for the method using).

The foam as a flexible body may be a foam having a 25% compression load of 1 to 2000 kPa measured in accordance with JIS K6400-2: 2012.

Advantageous Effects of Invention

According to the present invention, it is possible to provide a novel method for producing a fiber-reinforced resin structure which has excellent strength but can have various shapes. Further, according to the present invention, a novel fiber reinforced resin structure can be provided.

BRIEF DESCRIPTION OF DRAWINGS

FIGS. 1(a) and 1(b) are views for explaining a first embodiment, in particular, FIG. 1(a) is a perspective view for explaining a state in which a fiber sheet and a flexible body are directly laminated, and FIG. 1(b) is a perspective view showing a first multilayer laminate.

FIGS. 2(a) to 2(e) are views for explaining the first embodiment, particularly FIG. 2(a) is a perspective view for explaining a state in which a fiber sheet and a flexible body are directly laminated, FIG. 2(b) is a perspective view for explaining a state in which the fiber sheet is wound around a core material, FIG. 2(c) is a perspective view for explaining a state in which the fiber sheet is wound around the core material a plurality of times, FIG. 2(d) is a perspective view showing an uncured vortex laminate, and FIG. 2(e) is a perspective view showing a cured vortex laminate after curing.

FIG. 3(a) is a perspective view for explaining a state in which a fiber sheet and a flexible body are directly laminated, FIG. 3(b) is a perspective view for explaining a state in which the fiber sheet is wound around a core material, FIG. 3(c) is a perspective view for explaining a state in which the fiber sheet is wound around the core material a plurality of times, FIG. 3(d) is a perspective view showing a first cylindrical laminate in an uncured state, and FIG. 3(e) is a perspective view showing a cured first cylindrical laminate after curing.

FIG. 4(a) is a perspective view showing a first multilayer laminate, FIG. 4(b) is a perspective view for explaining a state in which the first multilayer laminate is cut, FIG. 4(c) is a perspective view for explaining a second multilayer laminate, FIG. 4(d) is a perspective view for explaining how a fiber sheet is wound around a core material, FIG. 4(e) is a perspective view for explaining a state in which a fiber sheet is wound around a core material, FIG. 4(f) is a perspective view showing a second cylindrical laminate in an uncured state, and FIG. 4(g) is a perspective view showing a cured second cylindrical laminate after curing.

FIG. 5(a) is a cross-sectional view for explaining a laminated state of a fiber sheet and a flexible body, FIG. 5(b) is a cross-sectional view for explaining a state in which an energy-curable resin impregnated in the fiber sheet seeps out into the flexible body, FIG. 5(c) is a cross-sectional view for explaining a state in which the energy-curable resin impregnated in the fiber sheet seeps out into the flexible body and cures, and FIG. 5(d) is a cross-sectional view for explaining a state in which the energy-curable resin seeping out into the flexible body cures.

FIG. 6(a) is a perspective view for explaining a state of cutting a cured vortex laminate to obtain a cut vortex laminate, and FIG. 6(b) is a perspective view for explaining a state of cutting a cured first cylindrical laminate to obtain a cut first cylindrical laminate.

FIG. 7(a) is a perspective view showing a cured first multilayer laminate, FIG. 7(b) is a perspective view for explaining a state in which the cured first multilayer laminate is cut, FIG. 7(c) is a perspective view for explaining a state in which a second cut laminate is arranged side by side on a plate member, and FIG. 7(d) is a perspective view for explaining a state in which a plurality of second cut laminates are interposed between a pair of plate members.

FIG. 8(a) is a perspective view for explaining a state in which a plurality of cut vortex laminated bodies are interposed between a pair of plate members, and FIG. 8(b) is a perspective view for explaining a state in which a plurality of cut first cylinder laminated bodies are interposed between a pair of plate members.

FIG. 9(a) is a perspective view showing a third multilayer laminate, FIG. 9(b) is a perspective view for explaining a state in which the third multilayer laminate is cut, FIG. 9(c) is a perspective view for explaining a state in which a fourth multilayer laminate is obtained by directly laminating a fiber sheet on the third multilayer laminate, and FIG. 9(d) is a perspective view showing a cured fourth multilayer laminate.

FIG. 11(a) is a perspective view for explaining a state of winding a fiber sheet around a cylindrical foam to obtain a cylindrical laminate, FIG. 11(b) is a perspective view for explaining a state of arranging the cylindrical laminates in a line to obtain a cylindrical laminate group, FIG. 11(c) is a perspective view for explaining a state of cutting the cylindrical laminate group to obtain a first cut cylindrical laminate group, FIG. 11(d) is a perspective view for explaining a state of sandwiching the first cut cylindrical laminate group by a pair of fiber sheets, and FIG. 11(e) is a perspective view for explaining a state of obtaining a cured special plate laminate by performing a curing step on a special plate laminate.

FIG. 12(a) is a perspective view for explaining a state in which a fiber sheet is wound around a cylindrical foam to obtain a cylindrical laminate, FIG. 12(b) is a perspective view for explaining a state in which cylindrical laminate groups are overlapped with each other, FIG. 12(c) is a perspective view for explaining a state in which a second cut cylindrical laminate group is obtained by cutting a plurality of cylindrical laminate groups overlapped with each other, FIG. 12(d) is a perspective view for explaining a second cut cylindrical laminate group, and FIG. 12(e) is a perspective view for explaining a state in which a cured special block laminate is obtained by performing a curing step on a special block laminate.

FIG. 13(a) is a perspective view for explaining a state in which a fiber sheet is wound around a cylindrical foam to obtain a cylindrical laminate, FIG. 13(b) is a perspective view for explaining a state in which a group of cylindrical laminates are bundled in a bundle, FIG. 13(c) is a perspective view for explaining a state in which a bundle of cylindrical laminates is cut to obtain a bundle of cut cylindrical laminates, FIG. 13(d) is a perspective view for explaining the bundle of cut cylindrical laminates, and FIG. 13(e) is a perspective view for explaining a state in which a cured special cylindrical laminate is obtained by performing a curing step on a special cylindrical laminate.

FIG. 24-2 is a perspective view showing a fiber-reinforced resin structure and a method of manufacturing the same according to embodiment III.

FIG. 32-1 is a perspective view showing a fiber reinforced resin structure and a method of manufacturing the same according to embodiment IV.

FIG. 32-2 is a perspective view showing a fiber reinforced resin structure and a method of manufacturing the same according to embodiment IV.

FIG. 33-1 is a perspective view showing a fiber-reinforced resin structure and a method of manufacturing the same according to embodiment IV.

FIG. 33-2 is a perspective view showing a fiber-reinforced resin structure and a method of manufacturing the same according to embodiment IV.

FIG. 38-1 is a perspective view showing a fiber-reinforced resin structure according to modification 4.

FIG. 38-2 is a perspective view showing a fiber-reinforced resin structure according to Modification 4.

DESCRIPTION OF EMBODIMENTS

Figure 2:
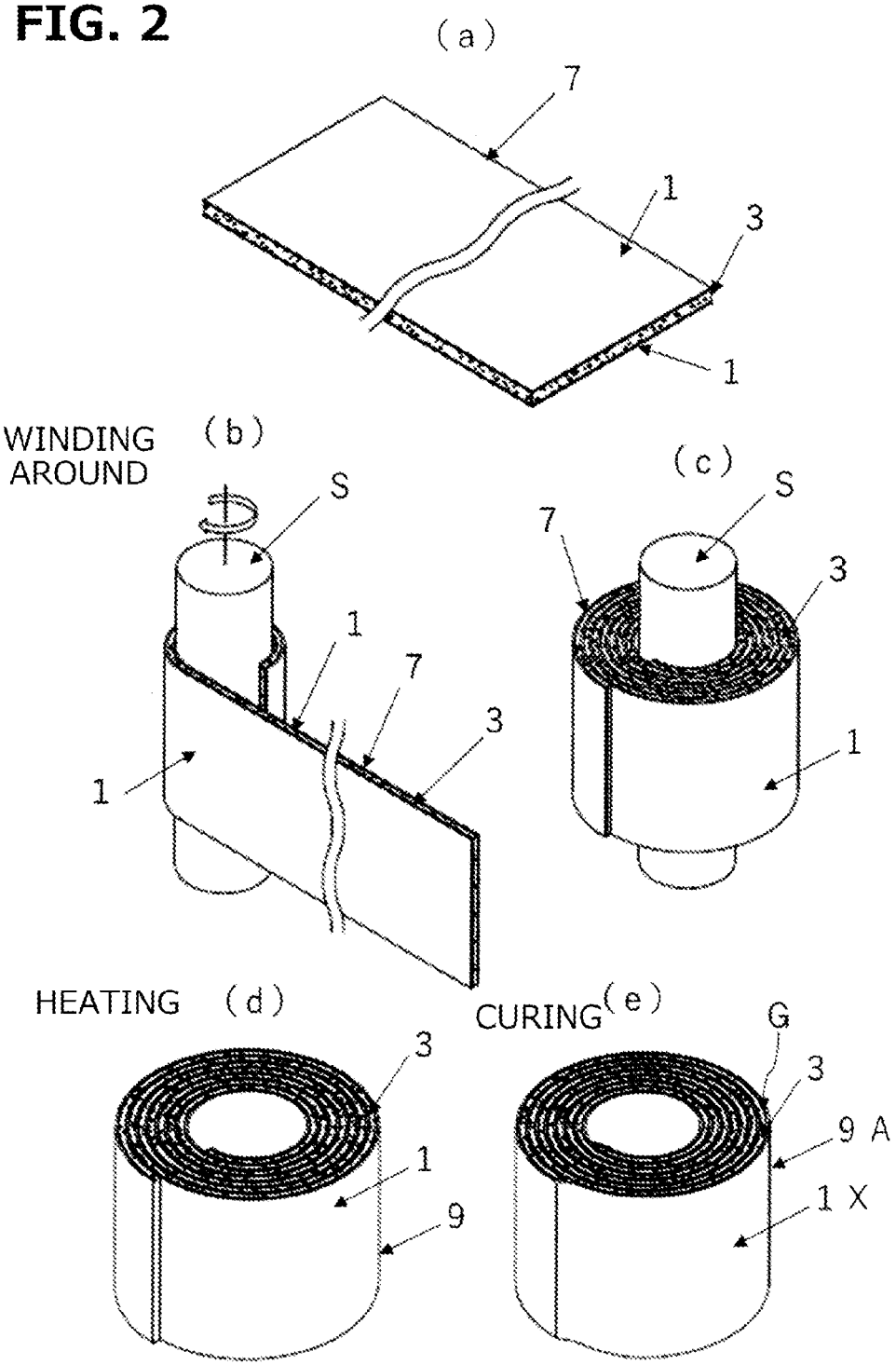

The present application incorporates all contents of Japanese Patent Application No. 2019-218410, Japanese Patent Application No. 2019-218411, Japanese Patent Application No. 2019-218412, and Japanese Patent Application No. 2019-218413, which are filed on Feb. 2, 2019 and granted. Furthermore, the present application incorporates all the contents of Patent Application No. 2020-104766, Patent Application No. 2020-104767, Patent Application No. 2020-104768, and Patent Application No. 2020-104769, which are filed on Jun. 17, 2020.

Although the present invention will be specifically described below, the present invention is not limited in any way. To the extent that there are no particular contradictions, the present invention also includes a configuration obtained by combining the items disclosed in one embodiment with the items disclosed in another embodiment.

In addition, in the description of each embodiment, the items already described in another embodiment are not particularly described. For example, the same reference numerals are given to the portions where the same materials are indicated, and the description thereof may be omitted or simplified. In addition, in the drawings, the same reference numerals are given, and the description thereof may be omitted or simplified. When the same reference numerals are assigned to the first to second embodiments described later and the I to IV embodiments described later, it may be determined that different members are disclosed.

In the present invention, the "circle" includes an ellipse.

In the present invention, when expressed as "polygon" or the like, it is sufficient that the structure is different from a circle or an irregular shape by having a linear side in a part thereof, and it can be determined that the whole shape is a polygon or a polygon. Therefore, a shape in which some sides are rounded and a shape in which the sides are gently connected are also included in the concept of a "polygon". In the case of simply "polygon", a regular polygon is preferably shown, but configurations other than the regular polygon are also included.

In the present specification, the vertical and horizontal directions in the drawing are referred to as "vertical and horizontal" as they are.

Hereinafter, the present invention will be described based on two aspects, that is, the aspects of the first to second embodiments and the aspects of the I to IV embodiments.

In the first to second embodiments and the I to IV embodiments, there are mutually overlapping portions or different portions. The items described in the description of the first to second embodiments and not described in the description of the I to IV embodiments can be appropriately incorporated into the I to IV embodiments within a range where no contradiction occurs.

The method for producing a fiber-reinforced resin structure described below may include a step of using a secondary foamable foam as a foam and covering the laminate with a coating having a bleed hole through which an uncured thermosetting resin and a gas can be exuded, but it is preferred that such step not be included. In the case where the secondary foamable foam is not used and the step of covering the laminate with the covering body having the bleed hole through which the uncured thermosetting resin or the like can seep out is not provided, the unnecessary step of controlling the secondary foaming of the foam can be omitted and the outflow of the necessary thermosetting resin from the bleed hole can be prevented.

First and Second Embodiment

First Embodiment

First, the first embodiment will be described. In the first embodiment, there is provided a method of manufacturing a composite material including a fiber body and a flexible body, the method including a laminating step of directly laminating a fiber body impregnated with an energy-curable resin and a flexible body to obtain an uncured laminate or directly bringing the fiber body into contact with the flexible body and then impregnating the fiber body with an energy-curable resin to obtain an uncured laminate, and a curing step of applying energy to the uncured laminate to cure the energy-curable resin contained in the fiber body constituting the uncured laminate. Hereinafter, the raw materials, processes, and composite materials will be described in this order.

<<1. Raw Material>>

(1-1. Fiber Body)

As the fiber body according to the present invention, the shape, size and the like thereof are not particularly limited, but a sheet-like fiber sheet can be used, for example. The fiber sheet is not particularly limited as long as the sheet is a sheet in which fibers are aggregated, and examples thereof include woven fabrics (twill, double weave, triple weave, and the like) and nonwoven fabrics.

The thickness of the fiber sheet is not particularly limited and can be appropriately selected. If the fiber sheet is too thin, the mechanical properties such as the strength and elastic modulus of the fiber sheet may be reduced. Therefore, the thickness of the fiber sheet according to the present invention is preferably 20 μm to 500 μm, more preferably 30 μm to 300 μm, and particularly preferably 30 μm to 200 μm. A plurality of such fiber sheets may be laminated. It is needless to say that a fiber sheet having a thickness of several mm such as a chopped strand mat or a core mat may be used.

The fibers forming the fiber sheet are not particularly limited, and known ones can be used, and at least one of metal fibers, inorganic fibers, and organic fibers can be included. Examples of the fiber include metal fibers such as stainless steel fibers, nickel fibers, copper fibers, aluminum fibers, silver fibers, gold fibers, and titanium fibers; organic fibers such as polyparaphenylene benzoxazole, polyethylene terephthalate (PET) resin, polyvinyl alcohol (PVA), polyolefin resin such as polyethylene and polypropylene, polyvinyl chloride resin, aramid resin, acrylic resin, polyimide resin, polyparaphenylenebenzoxazole(PBO) fibers, cellulose, vinolone, nylon, rayon, aramid, phenol-based fibers, fluorine fibers, pulp (fibers), kenaf, hemp and bamboo fibers, inorganic fibers such as glass fibers, carbon fibers, silica fibers, rock wool, basalt fibers, slag wool, alumina fibers, and ceramic fibers. One or a plurality of them may be used in combination. The fiber according to the present invention is preferably a fiber having a Young's modulus higher than that of a resin, a matrix resin, or the like used for the sealing material, and more preferably a metal fiber or an inorganic fiber. The higher the Young's modulus of the fiber, the higher the rigidity of the fiber sheet can be made, and when embedded in the resin, the rigidity of the resin can be effectively improved. Therefore, it is possible to obtain a sealing material having high rigidity and being hardly broken.

(1-1-1. Method for Producing the Fiber Sheet)

A known method can be used as the method for producing the fiber sheet. For example, as a method of manufacturing a nonwoven fabric which is a preferable example, a dry method such as a carding method or an air-laid method, a wet-type manufacturing method which is formed by being embedded in paper, a fries forming method such as a spunbonding method or a meltblowing method; Examples thereof include a fleece bonding method such as a thermal bonding method, a chemical bond method, a needle punch method, a spunlace method (hydroentangling method), a stitch bonding method, and a steam jet method. Among them, the manufacturing method by the wet-type manufacturing method is suitable because it is possible to thin the fiber sheet and is excellent in uniformity.

(1-2. Thermosetting Resin)

Examples of the thermosetting resin include an epoxy resin, an unsaturated polyester resin, a polyvinyl ester resin, a phenol resin, a polyurethane resin, an acrylic resin, a melamine resin, a urea resin, a benzoguanamine resin, a rosin-modified maleic acid resin, and a rosin-modified fumaric acid resin. One of them may be used alone or two or more thereof may be used in combination.

The thermosetting resin may include an energy ray-curable resin as another curable resin. Examples of the energy ray-curable resin include an epoxy resin, an acrylic resin, a silicone resin, and a polyester resin. One of them may be used alone or two or more thereof may be used in combination.

Regarding the volume ratio of the thermosetting resin and the fiber sheet, when the total volume of the thermosetting resin and the fiber sheet is 100% by volume, the volume fraction (fiber fraction) of the fiber sheet can be 15 to 85% by volume, preferably 25 to 85% by volume, and more preferably 45 to 80% by volume. When the volume fraction (fiber fraction) of the fiber sheet is in such a range, the fiber-reinforced resin structure after curing has few defects, is hardly broken such as buckling, and has excellent mechanical strength.

(1-3. Flexible Body)

A columnar foam is used as the flexible body. The foam may be a closed cell foam, an open cell foam, or a foam containing both closed cells and open cells. Note that the closed cell foam shown here does not show only a foam in which all the bubbles are completely independent, but may be such that some bubbles communicate with adjacent bubbles, and each bubble is independent to the extent that it is understood as a closed cell foam as a whole.

Here, in the case where the foam contains closed cells and open cells, the average ratio of the closed cells and the open cells (hereinafter referred to as closed cell ratio) is not particularly limited, but for example, the closed cell ratio may be 0.1 to 99.9%, preferably 10.0 to 99.9%, more preferably 30.0 to 99.9%, and still more preferably 50.0 to 99.9%. A foam containing only closed cells is most preferable. In the case of containing a large amount of closed cells, since a large amount of sealed air layers exist in the foam, when the foam is heated, the sealed air layers thermally expand in addition to the thermal expansion of the resin itself, and the force of the foam pressing the fiber body can be increased. Therefore, when the foam is heated in a thermal curing step described later, thermal expansion occurs more strongly, and by pressing the fiber body, the moldability (without wrinkles or twisting, and the shape is set to a desired shape) can be made more excellent, and by shrinkage at the time of cooling after curing, the foam is easily removed from the laminate.

The closed cell ratio contained in the foam is obtained by observing the cross section of the foam using a microscope or a scanning electron microscope, counting the number of closed cells and the number of open cells per unit area in a captured image, dividing the number of closed cells by the number of the entire cells (all of the closed cells and the open cells), and multiplying the result by 100. The measurement of the closed cell rate is repeated at 10 points of a randomly selected cross section of the same foam, and the average value of the closed cell rates obtained is set as the closed cell rate of the foam.

The resin constituting the foam is not particularly limited, and may be appropriately selected depending on the use, such as an olefin resin, a urethane resin, a styrene resin, a phenol resin, and a silicone resin. In addition, natural rubber (NR), chloroprene rubber (CR), ethylene propylene diene rubber (EPDM), nitrile rubber (NBR), and the like may be used as the foam. Of these, an olefin-based resin can be preferably used. For the olefin-based resin, for example, it is easy to adjust the curing temperature of the fiber body and the degree of thermal expansion of the foam at the curing temperature of the fiber body by adjusting the blending ratio of polyethylene and polypropylene. That is, when the foam is heated in a thermal curing step described later and thermally expanded, the foam can be made excellent in moldability (without wrinkles or twisting, and the shape can be made a desired shape) by pressing the fiber body, but the degree of thermal expansion can be adjusted by changing the ratio of the blending of the olefin resin, for example, polyethylene and polypropylene, and the moldability can be made excellent in accordance with the shape of the fiber body. By adjusting the mixing ratio of polyethylene and polypropylene, presence or absence of crosslinking, and degree of crosslinking, flexibility (hardness), thermal expansion, wettability (affinity), and softening point of the foam can be easily adjusted.

The resin constituting the foam can be freely selected in consideration of the affinity with the uncured resin contained in the fiber body. When the affinity between the resin constituting the foam and the uncured resin contained in the fiber body is high, the operation of winding the laminate around the foam becomes easy, and it may become difficult to remove the foam after heating and curing. Therefore, it is preferable to adjust the affinity of the resin constituting the foam and the uncured resin contained in the fiber body.

In order to adjust the affinity of the resin constituting the foam and the uncured resin contained in the fiber body, the wettability (for example, contact angle or surface energy) of the resin constituting the foam and the uncured resin contained in the fiber body may be adjusted, and in order to increase the affinity, the contact angle (or surface energy) of the resin constituting the foam and the uncured resin contained in the fiber body may be selected. When the affinity is increased, the contact angle (or surface energy) between the resin constituting the foam and the uncured resin contained in the fiber body may be set to a close value, and when the affinity is decreased, the contact angle and surface energy of the resin constituting the foam and the uncured resin contained in the fiber body may be set to a distant value.

The difference in contact angle between the resin constituting the foam and the uncured resin contained in the fiber body is not particularly limited, but may be more than 0° and less than 90°. When the difference in the contact angle between the resin constituting the foam and the uncured resin contained in the fiber body is within such a range, the fiber body is easily wound around the foam, and the foam is easily removed after heating and curing.

The softening point of the resin constituting the foam is not particularly limited and can be selected according to the curing temperature of the thermosetting resin used for the fiber. For example, the softening point of the resin constituting the foam can be set to be 10° C. or more higher than the curing temperature of the thermosetting resin used in the fiber body. For example, when the thermosetting resin is an epoxy resin, the softening point of the resin constituting the foam can be 60 to 200° C., preferably 80 to 160° C., and more preferably 100 to 150° C. When the softening point of the resin constituting the foam is in such a range, the foam has sufficient thermal expansion property as the foam and sufficient strength (for example, tensile strength) during heating.

The foam is preferably a solid body. It is preferable that the foam does not have a hole (through hole/hollow portion) having a diameter that is ½ or more, ⅓ or more, ¼ or more, ⅕ or more, ⅒ or more, ¹⁄₁₅ or more, or ¹⁄₂₀ or more of the outer diameter of the foam. In other words, the foam preferably has a ratio of the inner diameter/outer diameter of ½ or less, ⅓ or less, ¼ or less, ⅕ or less, ⅒ or less, ¹⁄₁₅ or less, ¹⁄₂₀ or less, ¹⁄₅₀ or less, or ⁰⁄₁ (i.e., the foam is a solid). With such a configuration of the foam, buckling of the foam can be prevented when the foam is deformed/curved.

The foam may contain known additive components such as thickeners, plasticizers, lubricants, fillers, flame retardants, colorants, antioxidants, reinforcements, conductive materials, and the like.

The density of the foam is not particularly limited, but may be, for example, 1 kg/m³ or more, 2 kg/m³ or more, 3 kg/m³ or more, 4 kg/m³ or more, 5 kg/m³ or more, 10 kg/m³ or more, or 15 kg/m³ or more, and may be 800 kg/m³ or less, 700 kg/m³ or less, 600 kg/m³ or less, 500 kg/m³ or less, 250 kg/m³ or less, 100 kg/m³ or less, or 50 kg/m³ or less. The upper limit value and the lower limit value can be arbitrarily combined into a desired numerical value range. For example, 5 to 800 kg/m³, preferably 5 to 500 kg/m³, more preferably 10 to 250 kg/m³. When the density of the foam is in such a range, the foam has sufficient thermal expansion properties as the foam and sufficient strength (for example, tensile strength) during heating, so that excellent moldability (without wrinkles or twisting, and the shape can be formed into a desired shape) during molding can be achieved. The density of the foam is the apparent density measured according to JIS K7222: 2005 "Foamed Plastic and Rubber—How to determine apparent density". The reciprocal of the density of the foam may be expressed as the foaming magnification.

The foam has a tensile elongation at break at 25° C. of greater than 25% and less than 400%, preferably greater than 50% and less than 350%, more preferably greater than 80% and less than 300%. If the tensile elongation at break at 25° C. of the foam is in such a range, it is possible to sufficiently deform the laminate in the deformation step described later, and it is possible to further adjust the thermal expansion coefficient to a suitable range, and therefore, when the foam is heated in the heat curing step described later, it is possible to strongly press the fiber body, and it is possible to make the foam more excellent in moldability (without wrinkles, twisting, and the like, and making the shape a desired shape).

The tensile elongation at break at 25° C. of the foam is measured by processing the foam into a No. 3 dumbbell test piece according to JIS K6767 "Foamed Plastic-Polyethylene-Test Method".

The tensile strength of the foam at 25° C. is not particularly limited, but may be, for example, 0.05 MPa or more, preferably 0.1 MPa or more, and more preferably 0.2 MPa or more. The upper limit of the tensile strength of the foam at 25° C. is not particularly limited, but may be, for example, 20 MPa or less. When the tensile strength of the foam at 25° C. is in such a range, the foam has sufficient strength in the deformation step described later, and the foam can uniformly press the fibrous body. For this reason, when the foam is heated in the heat curing step, it is possible to strongly press the fiber body, and it is possible to make the moldability (to make the shape into a desired shape without wrinkles or twisting) more excellent.

The tensile strength of the foam at 25° C. can be measured by processing the foam into a No. 3 dumbbell test piece according to JIS K6767 "Foamed Plastic-Polyethylene-Test Method".

The tear strength of the foam at 25° C. is not particularly limited, but may be, for example, 0.5 N/mm or more, preferably 0.8 N/mm or more, and more preferably 1.0 N/mm or more. The upper limit of the tear strength of the foam at 25° C. is not particularly limited, but may be, for example, 50 N/mm or less. When the foam has a tear strength in the range of 25° C., the foam has sufficient strength in the deformation step described below, and the foam can uniformly press the fibrous body. For this reason, when the foam is heated in the heat curing step, it is possible to strongly press the fiber body, and it is possible to make the moldability (to make the shape into a desired shape without wrinkles or twisting) more excellent.

The tear strength of the foam at 25° C. can be measured according to JIS K6767 "Foamed Plastic-Polyethylene-Test Method".

The 25% compressive load (hardness) of the foam at 25° C. is not particularly limited, but may be, for example, 1 to 2000 kPa, preferably 5 to 1000 kPa, more preferably 10 to 500 kPa, and still more preferably 10 to 200 kPa. When the 25% compressive load of the foam is in such a range, it is easy to wind the fiber body around the foam, and it is possible to sufficiently deform the laminate in the deformation step described later, and further, in the heat curing step described later, the reaction force of the foam itself can act in addition to the thermal expansion. For this reason, when the foam is heated in the heat curing step, the fiber body can be strongly pressed, and the moldability (the shape is set to a desired shape without wrinkles or twisting) can be further improved.

The 25% compressive load of the foam at 25° C. can be determined by the D method described in JIS K6400-2: 2012 "Soft foam material-physical characteristics-second part: Method of determining hardness and compressive stress-strain characteristics".

The thermal conductivity of the foam is not particularly limited, but may be, for example, 0.01 W/m·K or more, preferably 0.02 W/m·K or more, and more preferably 0.03

W/m·K or more. The upper limit of the thermal conductivity of the foam is not particularly limited, but may be, for example, 0.2 W/m·K or less. In the case where the thermal conductivity of the foam is in such a range, the foam can be uniformly heated in a short period of time when the foam is heated in a thermal curing step described later, and therefore the foam can be uniformly thermally expanded. For this reason, the variation in the force of the foam pressing the fiber body is reduced, and the moldability (the shape is set to a desired shape without wrinkles or twisting) can be further improved.

The thermal conductivity of the foam can be measured by the method described in JIS A1412-1: 2016 "Measuring Method of Thermal Resistance and Thermal Conductivity of Thermal Insulating Material—First Part: Protective Thermal Plate Method (GHP Method)".

The linear thermal expansion coefficient of the foam is not particularly limited, but may be, for example, 0.01% or more, preferably 0.05% or more, more preferably 0.10% or more, and even more preferably 1.00% or more. The upper limit of the linear thermal expansion coefficient of the foam is not particularly limited, but may be 10.00% or less. In the case where the coefficient of linear thermal expansion of the foam is in such a range, the foam can strongly press the fiber body when heated in a heat curing step described later, and the moldability (the shape is set to a desired shape without wrinkles or twisting) can be further improved.

The linear thermal expansion coefficient of the foam can be measured by a method of processing the foam into width 3 mm×length 25 mm×thickness 2 mm, raising the temperature from 25 to 85° C. at 1° C./minute in tensile mode with a distance of 10 mm between chucks and a load of 5 g under a nitrogen atmosphere, then lowering the temperature from 85° C. to 25° C. at 1° C./min., and raising the temperature from 25° C. to 85° C. at 1° C./min. again, and measuring the linear thermal expansion coefficient at 85° C. at the time of the second temperature rise in this case using a TMA.

Such foams can be manufactured by known methods. Examples of the method for producing a foam include a raw material preparing step which is a step of obtaining a liquid raw material mixture containing at least an aqueous liquid dispersion medium and a water-dispersed resin, a foaming step of foaming the liquid raw material mixture to obtain a foamed mixture, and a drying step of evaporating the dispersion medium in the foamed mixture. Before or after the foaming step, the liquid raw material mixture or the foamed mixture may be applied by using a doctor knife or a doctor roll, or the liquid raw material mixture or the foamed mixture may be extruded or injection molded to form the foamed mixture into a sheet. A rubber sponge or the like may be molded into a desired shape, or a foam molded into a block shape may be formed into a desired shape such as a sheet shape, a string shape, or a cylindrical shape by slicing, cutting, polishing or the like. A part or all of these steps may be simultaneously executed.

Examples of the foaming means in the foaming step include a method of forming bubbles by blending a foaming agent generating a gas by a chemical reaction into a liquid raw material mixture, a method of forming bubbles by dissolving an appropriate gas in the liquid raw material mixture under high pressure and then reducing the pressure or heating the gas, a method of forming bubbles by removing a soluble substance mixed in the liquid raw material mixture and forming bubbles as voids, and a method of mechanically stirring the liquid raw material mixture so that air or an appropriate gas is contained (mechanical frothing).

The foaming conditions (temperature, time, etc.) in the foaming step and the drying conditions (temperature, time, etc.) in the drying step can be appropriately changed according to the raw material of the foam, the foaming means used, and the like.

The shape, size, and the like of the flexible body are not particularly limited, and in addition to a sheet-like flexible body sheet and a cylindrical flexible body, a flexible body having a columnar shape, a quadrangular prism shape, a hexagonal prism shape, a star shape, a semicircular shape in cross section, and the like can be appropriately selected.

<<2. Process>>

(2-1. Laminating Step)

In this laminating step, generally, the fiber sheet and the flexible body are directly laminated. In this laminating step, fiber bodies and flexible bodies of various shapes and thicknesses can be used. The pattern of the lamination process is not particularly limited, but various patterns listed below are exemplified.

(2-1-1. Pattern 1 of Lamination Step)

Figures 1, 24:
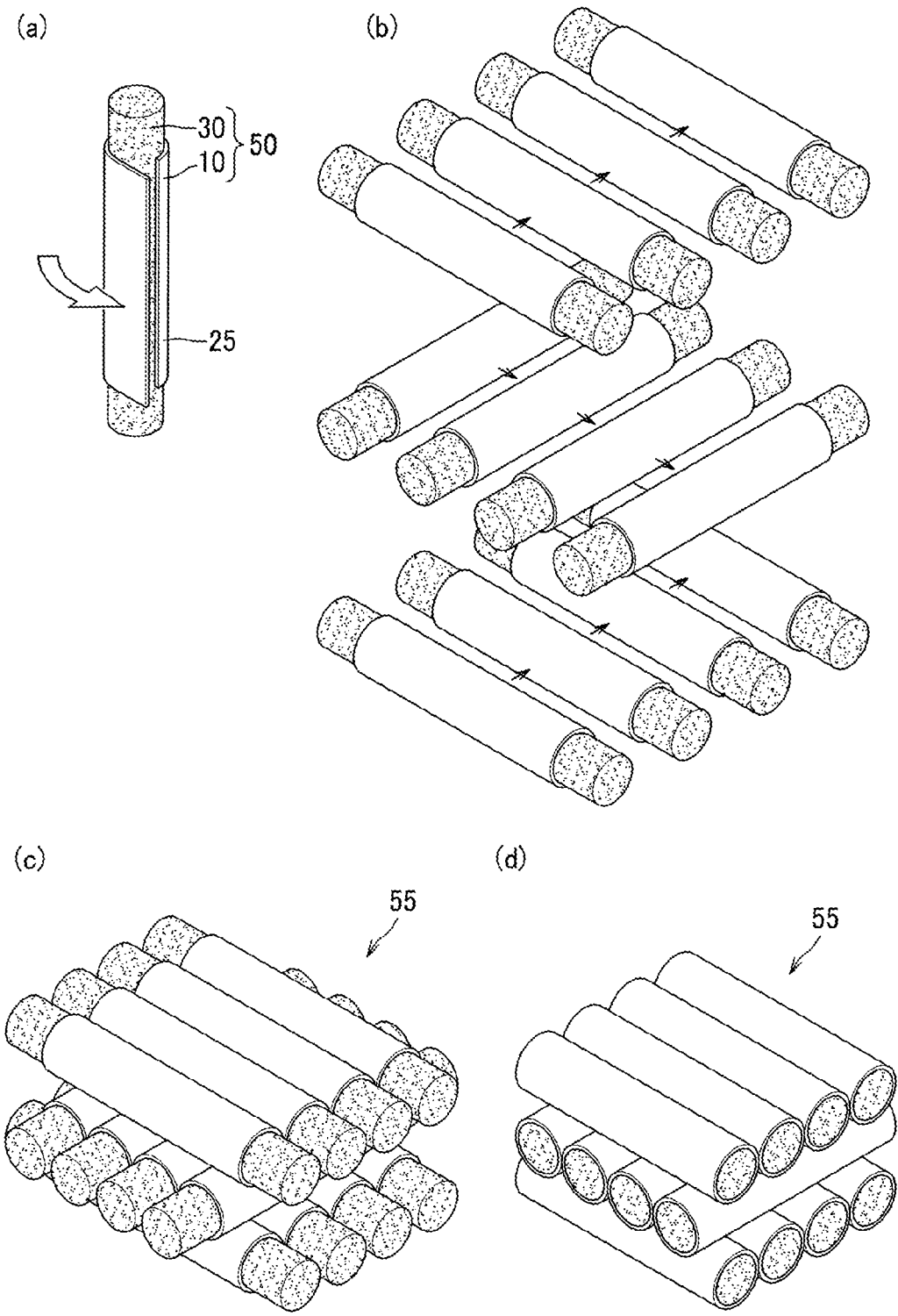
FIG. 24-1 is a perspective view showing a fiber-reinforced resin structure according to embodiment III and a method of manufacturing the same.

In this pattern 1, as shown in FIG. 1, a fiber sheet 1 in an uncured state in which an energy curable resin is impregnated in advance and a plate-like flexible body 3 are used. Examples of the method of impregnating the fiber sheet 1 with the energy-curable resin in advance include, but are not limited to, dipping in which the fiber sheet 1 is immersed in an uncured viscous liquid material of the energy-curable resin, roll coating in which the fiber sheet 1 is passed between a plurality of horizontally disposed hard rolls to coat the uncured viscous liquid material, a so-called hand-lay-up molding method, a RIMP (resin infusion) molding method, and the like. The fiber sheet 1 may be a single sheet, or a plurality of sheets may be stacked, and is not particularly limited. This is the same as the following.

In this pattern 1, as shown in FIG. 1(a), the lower surface of a flexible body 3 is directly superposed on the upper surface of a fiber sheet 1 placed on a plane, the lower surface of another fiber sheet 1 is directly superposed on the upper surface of the flexible body 3, and then the upper surface of another fiber sheet 1 and the lower surface of another flexible body 3 are directly superposed on each other. As a result, the respective fiber sheets 1 and the respective flexible bodies 3 are in surface contact with each other, and the flexible bodies 3 are temporarily bonded to the fiber sheets 1 by the uncured energy-curable resin impregnated in the fiber sheets 1. As shown in FIG. 1(b), the first multilayer laminate 5 in the form of a block in which the fiber sheet 1 and the flexible body 3 are stacked in several layers is obtained.

(2-1-2. Pattern 2 of Lamination Process)

In the pattern 2, the fiber sheet 1 and the flexible body 3 described in the pattern 1 are used. As shown in FIGS. 2(a) and 3(a), the fiber sheets 1 and 1 are directly superposed on the upper surface and the lower surface (both surfaces of the flexible body 3) of the flexible body 3, respectively, thereby obtaining a single-layer laminate 7 in which the flexible body 3 is interposed between the pair of fiber sheets 1 and 1. The single-layer laminate 7 may be formed by directly laminating the fiber sheet 1 on only one surface of the flexible body 3.

(2-1-3. Pattern 3 of Lamination Step)

In the pattern 3, a first cut laminate 5a obtained through a cutting step shown in FIG. 4(b) (this will be described later) is used for the first multilayer laminate 5 shown in FIG. 4(a). As shown in FIG. 4(c), other fiber sheets 1A and 1B similar to the above-described fiber sheet 1 are directly laminated on both sides along the cutting direction of the first cut laminate 5a, thereby obtaining a second multilayer laminate 8 shown in FIG. 4(d).

Although the pattern 1 to 3 of the above-described lamination step has been described by taking the case where the energy-curable resin is impregnated in the fiber sheet in advance as an example, it is needless to say that the energy-curable resin may be impregnated in the fiber sheet 1 in the same manner as the impregnation method described in the above-described pattern 1 after the fiber sheet 1 and the flexible body 3 are directly laminated.

(2-2. Winding Step)

This winding step is a step of winding the respective laminates 7 and 8 obtained in the above-described patterns 2 and 3. Since the laminate bodies 7 and 8 are composed of the fiber sheet 1 and the flexible body 3, the laminate bodies 7 and 8 are flexible even in this state, and can be easily subjected to deformation processing such as bending and twisting. In the present embodiment, the winding step, which is a kind of bending process, is employed as an example of the deformation process, and is described below, but it is needless to say that the present invention is not limited thereto.

(2-2-1. Pattern 1 of Winding Step)

In the pattern 1, the single-layer laminate 7 obtained in the pattern 2 of the above-described laminating step is used (see FIG. 2(a)). As shown in FIG. 2(b) and FIG. 2(c), the single laminate 7 is wound several times around a core S made of, for example, a metal pipe, a resin tube, a foam formed in a cylindrical shape, or the like. For this reason, the length of the single-layer laminate 7 of the pattern 1 is set to several times the outer peripheral length of the core S (to a degree corresponding to the number of windings). The single-layer laminate 7 is wound around the core S a plurality of times, and then the core S is pulled out (the core S is removed), thereby obtaining a spiral laminate 9 in which a plurality of single-layer laminates 7 are laminated, as shown in FIG. 2(d).

(2-2-2. Pattern 2 of Winding Step)

Also in this pattern 2, the single-layer laminate 7 obtained in the pattern 2 of the above-described lamination step is used (see FIG. 3(a)). In the pattern 2, as shown in FIGS. 3(b) and 3(c), the single laminate 7 is wound in many turns around the core S. That is, a single laminate 7 having substantially the same length as the outer peripheral length of the core S is wound so that both end faces thereof are joined together, and another single laminate 7 slightly longer than the above-described single laminate 7 is further wound so that both end faces thereof are joined together. Thereafter, the core S is pulled out to obtain a cylindrical first cylindrical laminate 11 in which a plurality of single laminates 7 are laminated as shown in FIG. 3(d).

(2-2-3. Pattern 3 of Winding Step)

In the pattern 3, the second multilayer laminate 8 obtained in the pattern 3 of the lamination step described above is used, and the length of the second multilayer laminate 8 is set to be substantially the same as the outer peripheral length of the core S. As shown in FIGS. 4(d) and 4(e), the second multilayer laminate 8 is wound around the core S. That is, the second multilayer laminate 8 is wound so that both end faces in the winding direction are joined to each other, and then the core S is pulled out, thereby obtaining the cylindrical second cylindrical laminate 13 shown in FIG. 4(f).

In the second cylindrical laminate 13, the outer peripheral surface of the other fiber sheet 1A directly laminated on one surface of the second multilayer laminate 8 forms the outer peripheral surface of the second cylindrical laminate 13, and the outer peripheral surface of the other fiber sheet 1B directly laminated on the other surface of the second multilayer laminate 6 forms the inner peripheral surface of the second cylindrical laminate 13. Between the fiber sheets 1A and 1B, the fiber sheet 1 and the flexible body 3 of the first cut laminate 5a extend along the longitudinal direction of the second cylindrical laminate 13, and are in a positional relationship of crossing the other fiber sheets 1A and 1B. In other words, each of the fiber sheet 1 and the flexible body 3 has a rib structure which stands with respect to the other fiber sheets 1A and 1B and extends along the longitudinal direction of the second cylindrical laminate 13.

It is needless to say that the inner diameter of the hollow portion along the central axis of each of the vortex laminated body 9, the first cylindrical laminated body 11, and the second cylindrical laminated body 13 can be appropriately adjusted by using cores S having different diameters. In the patterns 1 to 3 of the winding step described above, the core S is used to wind the various laminates 7 and 8, but the invention is not limited thereto, and the spiral laminate 9 may be obtained by directly winding the various laminates 7 and 8 in a spiral form from the ends thereof without using the core S, or the first cylindrical laminate 11 and the second cylindrical laminate 13 may be obtained by directly bending the various laminates 7 and 8 so as to be wound and temporarily bonding both ends in the winding direction with an uncured energy curable resin impregnated in the fiber sheet 1.

(2-3. Curing Step)

Figure 5:
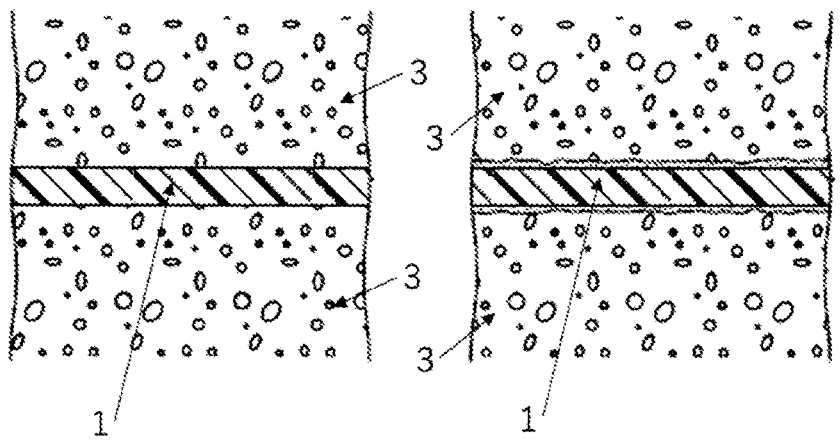
FIGS. 5(a) to 5(d) are views for explaining the first embodiment, particularly.
Figure 5:
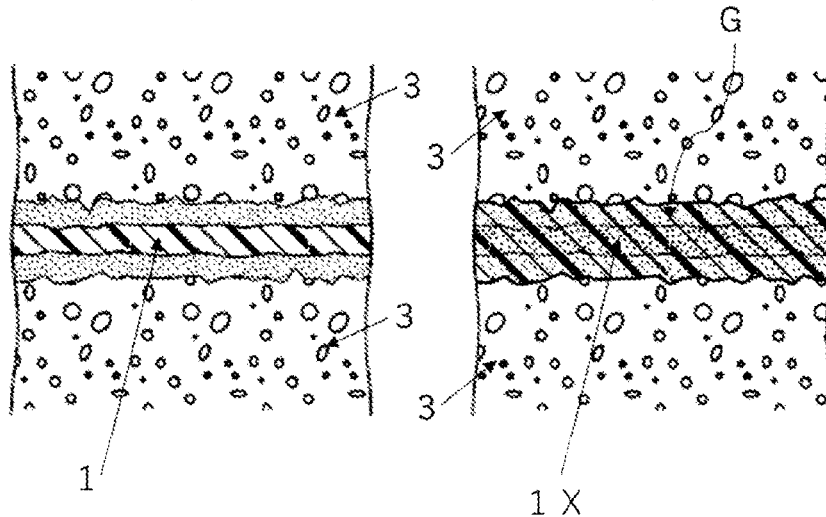

In this curing step, energy is applied to the first multilayer laminate 5, the single-layer laminate 7, the second multilayer laminate 8, the vortex laminate 9, the first cylindrical laminate 11, and the second cylindrical laminate 13 (hereinafter, collectively referred to as "laminate 5 and the like") obtained in the patterns 1 to 3 of the laminating step described above. The energy to be applied is caused by heating the stacked body 5 or the like, and may further include energy rays or the like. As shown in FIGS. 5(a) to 5(c), by applying energy to the laminate 5 and the like, the energy curable resin impregnated in the fiber sheet 1 of the laminate 5 and the like in a temporarily bonded state by lamination seeps out (enters) into each flexible body 3 and is cured.

The cured energy-curable resin becomes an adhesive portion G that adheres (anchors) the fiber sheet 1 and the flexible body 3, and the fiber sheet 1 and the flexible body 3 are integrated. Further, the energy-curable resin impregnated in the fiber sheet 1 is cured to form a cured fiber sheet 1X. As a result, the first multilayer laminate 5 becomes a cured first multilayer laminate 5A (see FIG. 7(a)), the single-layer laminate 7 becomes a cured single-layer laminate (not shown), the second multilayer laminate 8 becomes a cured second multilayer laminate (not shown), the vortex laminate 9 becomes a cured vortex laminate 9A (see FIG. 2(e)), the first cylindrical laminate 11 becomes a cured first cylindrical laminate 11A (see FIG. 3(e)), and the second cylindrical laminate 13 becomes a cured second cylindrical laminate 13A (see FIG. 4(g)) (hereinafter collectively referred to as "cured laminate 5A and the like"). By performing the curing step in this manner, the cured laminate 5A and the like as the composite material are obtained. In the cured laminate 5A and the like obtained in this way, since no adhesive or the like is used for joining the fiber sheet 1 and the flexible body 3, it is possible to prevent damage due to deterioration of the adhesive or the like.

Next, the configuration of the cured laminate 5A shown in the drawings among the cured laminate 5A and the like will be described with reference to the drawings. That is, a cured first multilayer laminate 5A shown in FIG. 7(*a*) has a plurality of layers of a cured fiber sheet 1X and a flexible body 3 in which an energy-curable resin impregnated therein is cured, and the cured fiber sheet 1X and the flexible body 3 are integrated by an adhesive portion G.

Also, in the cured vortex laminate 9A shown in FIG. 2(*e*), the cured fiber sheet 1X and the flexible body 3 in which the impregnated energy-curable resin is cured are wound a plurality of times around the central axis line and form a plurality of layers expanding in the radial direction with respect to the central axis line.

Figure 3:
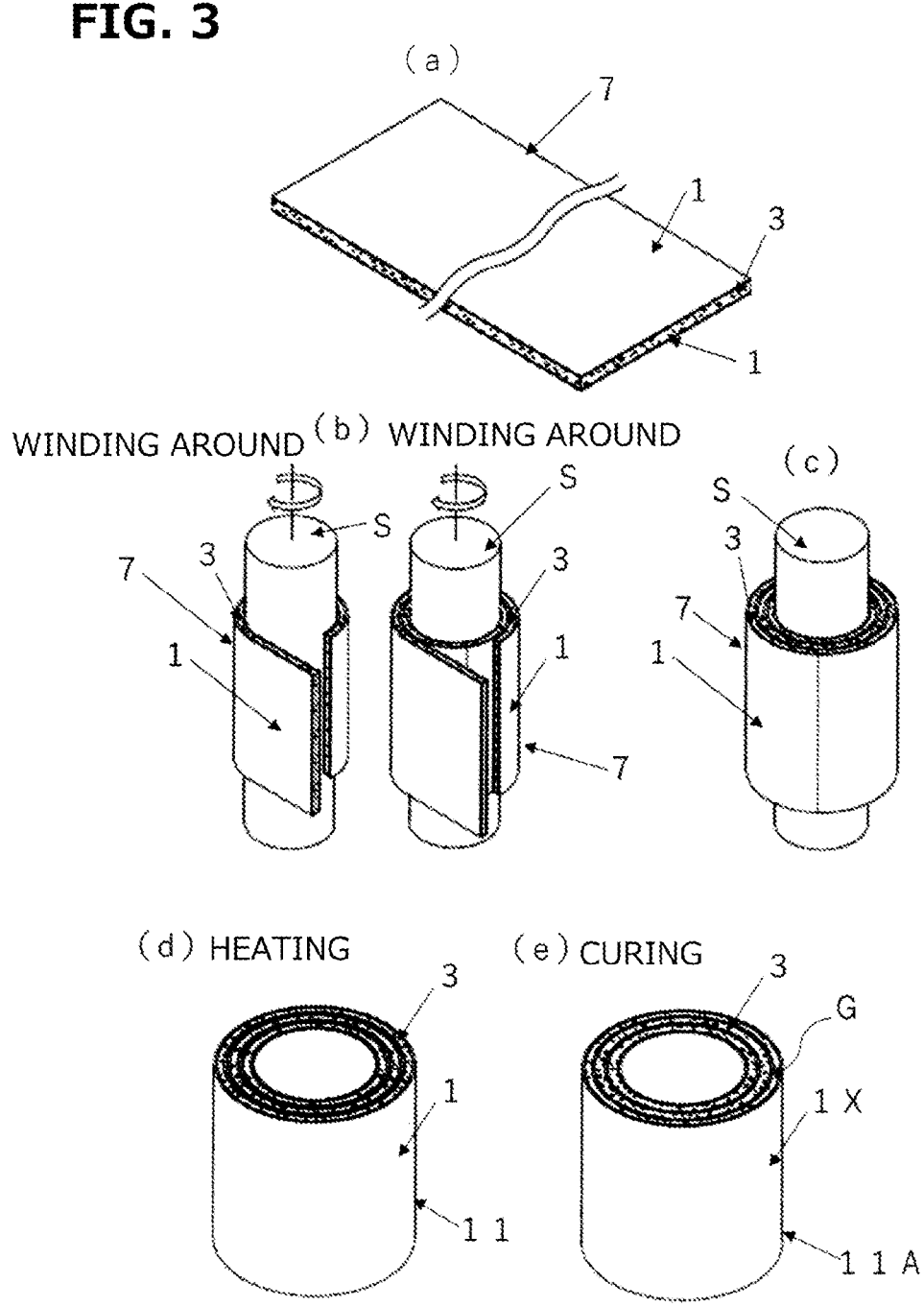
FIGS. 3(a) to 3(e) are views for explaining the first embodiment, particularly.

Further, the cured first cylindrical laminate 11A shown in FIG. 3(*e*) also has a cured fiber sheet 1X formed in a cylindrical shape and obtained by curing an impregnated energy-curable resin, and a cylindrical flexible body 3 bonded to at least one of an inner peripheral surface and an outer peripheral surface of the fiber body, and the cured fiber sheet 1X and the flexible body 3 are integrated by a bonding portion G.

Figure 4:
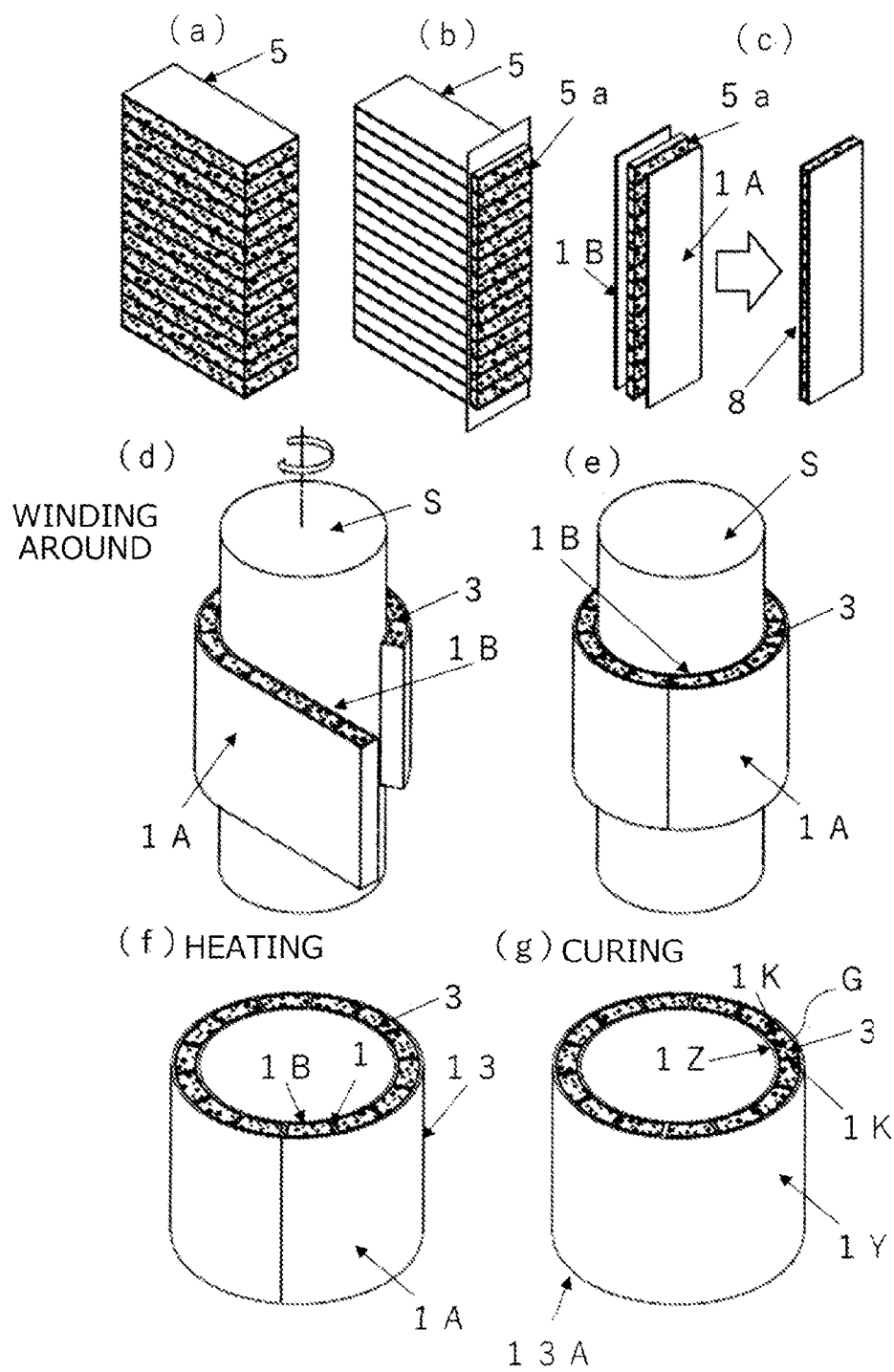
FIGS. 4(a) to 4(g) are views for explaining the first embodiment, in particular.

As shown in FIG. 4(*g*), the cured second cylindrical laminate 13A includes a first cylindrical fiber body 1Y formed in a cylindrical shape and cured with an impregnated energy-curable resin, a second cylindrical fiber body 1Z formed in a cylindrical shape having a smaller diameter than the first cylindrical fiber body 1Y and disposed in a hollow portion of the first cylindrical fiber body 1Y so as to be concentric with the first cylindrical fiber body 1Y and cured with an impregnated energy-curable resin, an elongated plate-like interposed fiber body 1K extending along a longitudinal direction of the first and second cylindrical fiber bodies 1Y and 1Z in a state interposed between the first and second cylindrical fiber bodies 1Y and 1Z and cured with an impregnated energy-curable resin, and an inner space formed by a pair of interposed fiber bodies 1K and 1K opposed to the first and second cylindrical fiber bodies 1Y and 1Z, and soft fiber bodies 3Y and 3Z opposed to each other.

Further, the cured second cylindrical laminate 13A is integrated with the contact portions between the first and second cylindrical fiber bodies 1Y and 1Z and the intervening fiber bodies 1K and 1K in the flexible body 3 by an adhesive portion G. In addition, the contact portions between the first and second cylindrical fiber bodies 1Y and 1Z and the plurality of intervening fiber bodies 1K are also bonded and integrated by the bonding portion G. In this example, since no adhesive or the like is used for the bonding of the fiber sheet 1 and the flexible body 3 and the bonding of the fiber sheets 1, 1A, and 1B, it is possible to prevent damage due to deterioration of the adhesive or the like. In addition, since the plurality of intervening fibers 1K are arranged between the inner first cylindrical fiber body 1Y and the outer second cylindrical fiber body 1Z in the form of ribs erected with respect to the respective fiber bodies 1Y and 1Z, it is possible to obtain the cured second cylindrical laminated body 13A which is difficult to deform by increasing the strength thereof compared to a simple cylindrical shape.

(2-4. Cutting Step)

In this cutting step, the laminate 5 and the like before curing obtained in the laminating step and the winding step, and the cured laminate 5A and the like after curing obtained in the curing step are cut to be smaller than these. In this cutting step, the laminate 5 and the like and the cured laminate 5A and the like may be cut into any shape and size, and the pattern thereof is not particularly limited, but some examples thereof will be described below.

(2-4-1. Pattern 1 of Cutting Step)

In the pattern 1, the first multilayer laminate 5 before curing obtained in the pattern 1 of the laminating step is cut. As shown in FIG. 4(*b*), the first multilayer laminate 5 is vertically and thinly cut in a state of being placed on a plane such that the fiber sheet 1 and the flexible body sheet 3 are horizontal, thereby obtaining a first cut laminate 5a before curing which is used in the pattern 3 of the laminating step. As described above, the first cut laminate 5a is formed into the second multilayer laminate 8 by the pattern 3 of the laminating step, is formed into the second cylindrical laminate 13 by the pattern 3 of the winding step, and is then subjected to the curing step to form the cured second cylindrical laminate 13A as a composite material.

(2-4-2. Pattern 2 of Cutting Step)

Figure 7:
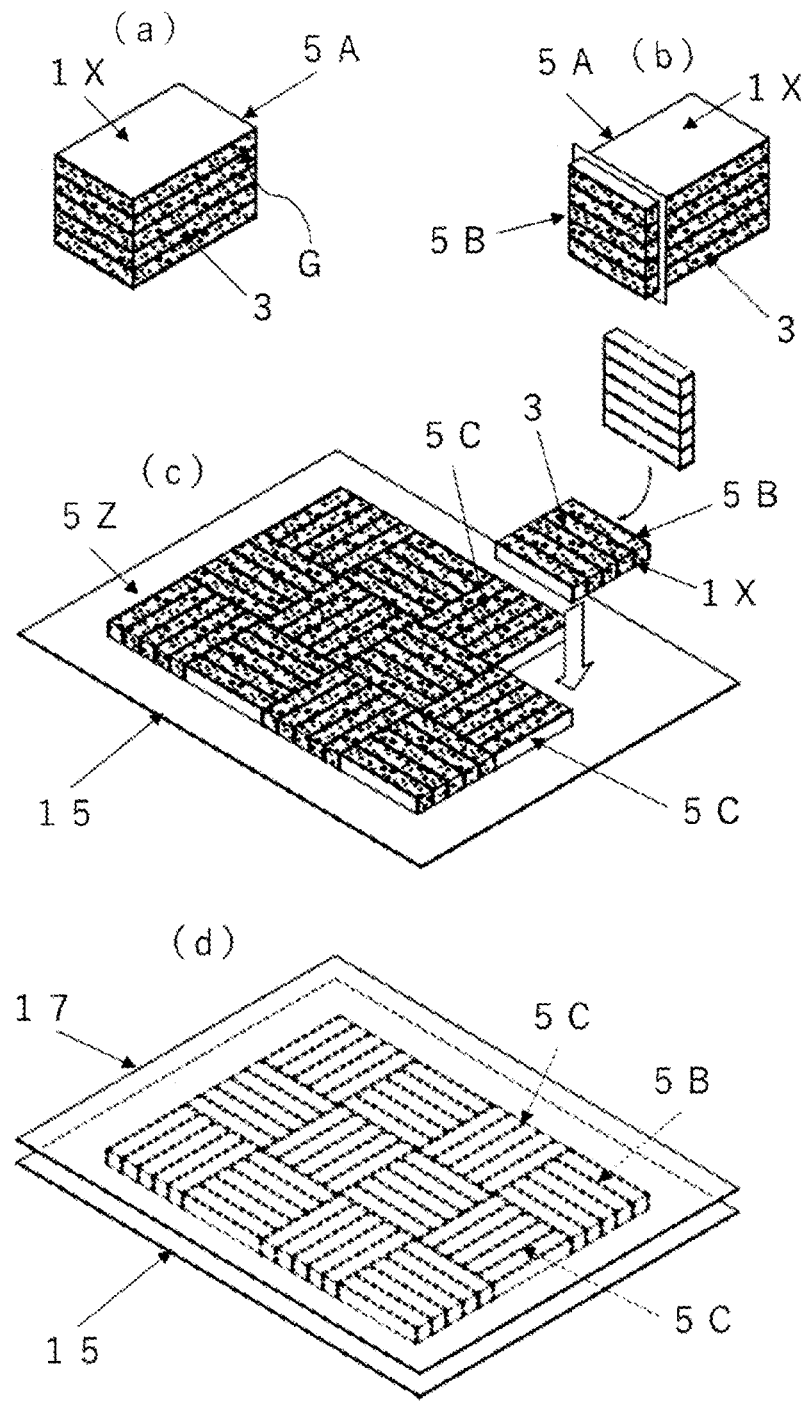
FIGS. 7(a) to 7(d) are views for explaining the first embodiment, particularly

In the pattern 2, the cured first multilayer laminate 5A after curing after the curing step shown in FIG. 7(*a*) is cut. As shown in FIG. 7(*b*), the cured first multilayer laminate 5A is vertically and thinly cut in a state of being placed on a plane so that the fiber sheet 1 and the flexible body sheet 3 are horizontal, thereby obtaining a cured second cut laminate 5B after curing.

(2-4-3. Pattern 3 of Cutting Step)

Figure 6:
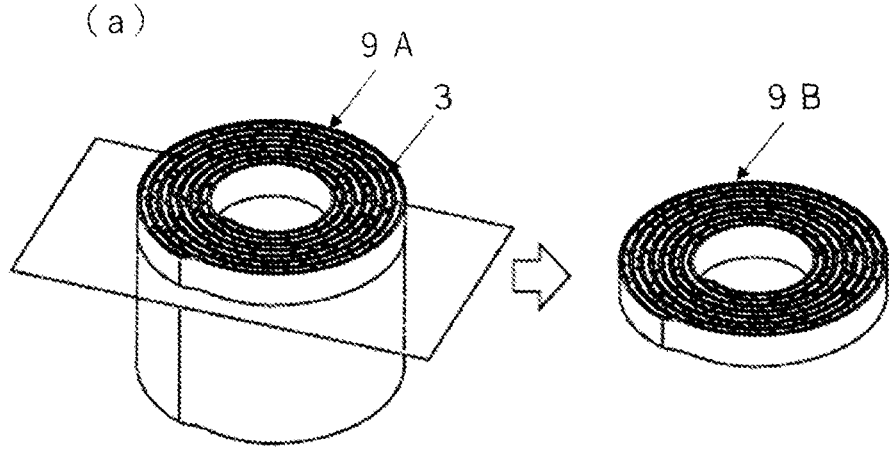
FIGS. 6(a) and 6(b) are views for explaining the first embodiment, in particular.
Figure 6:
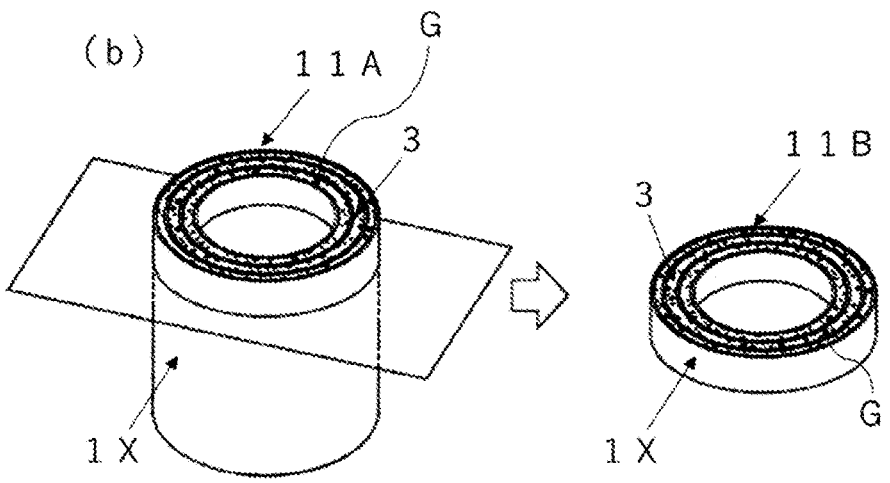

In the pattern 3, the cured vortex laminated body 9A and the cured first cylindrical laminated body 11A cured through the curing step are cut. As shown in FIG. 6(*a*) and FIG. 6(*b*), the cured vortex laminate 9A and the cured first cylindrical laminate 11 are cut (sliced) into a predetermined width in the longitudinal direction thereof to obtain a cured cut vortex laminate 9B and a cured cut first cylindrical laminate 11B as composite materials. Although not shown in the drawings, it is needless to say that the second cylindrical laminate 13A after curing may be cut in the same manner to obtain a cured and cut second cylindrical laminate as a composite material.

<<3. Composite Material>>

Here, the composite material obtained through the above-described steps will be described.

(3-1. Pattern 1 of Composite Material)

As shown in FIG. 7, the pattern 1 is an example of using cured second cut laminates 5B, 5C, and 5D as composite materials obtained in the pattern 2 of the cutting step (in FIG. 7, only 5B, 5C, and 5D are given as reference numerals of the cured second cut laminates, and the whole mass composed of these is referred to as a cured second laminate group 5Z). As shown in FIG. 7, the plurality of second cut laminate bodies 5B, 5C, and 5D are placed so that the cured fiber sheet 1X and the flexible body 3 of each of the second cut laminate bodies 5B, 5C, and 5D are erected like a rib with respect to the upper surface of the lower first plate member 15 of the first plate members 15 and 17 such as resin plates (in other words, the cured fiber sheet 1X and the flexible body 3 are extended in a direction (vertical direction in FIG. 7(*c*)) in which they intersect with each other with respect to the plate surfaces of the plate members 15 and 17).

Further, at the time of this mounting, one cured second cut laminate 5C and the other cured second cut laminate 5D are mounted so that the extending direction of the cured fiber sheet 1X and the flexible body 3 of the cured second cut laminate 5B and the extending direction of the cured fiber sheet 1X and the flexible body 3 of the other cured second cut laminates 5C and 5D adjacent to the cured second cut laminate 5B cross each other (in FIG. 7(*c*), they are orthogonal to each other). This is repeated to obtain a cured second laminate group 5Z in which the cured second cut laminates 5B, 5C, and 5D are laid over substantially the entire upper surface of the first plate member 15. After that, the lower surface of the upper second plate member 17 and the upper surface of the cured second laminate group 5Z are bonded in a state where the upper surface of the first plate member 15 and the lower surface of the cured second laminate group 5Z are bonded, whereby the plate members 15 and 17 can be reinforced. Although the pair of plate members 15 and 17 are used in the pattern 1, it is needless to say that only one of the plate members 15 and 17 may be used.

(3-2. Pattern 2 of Composite Material)

Figure 8:
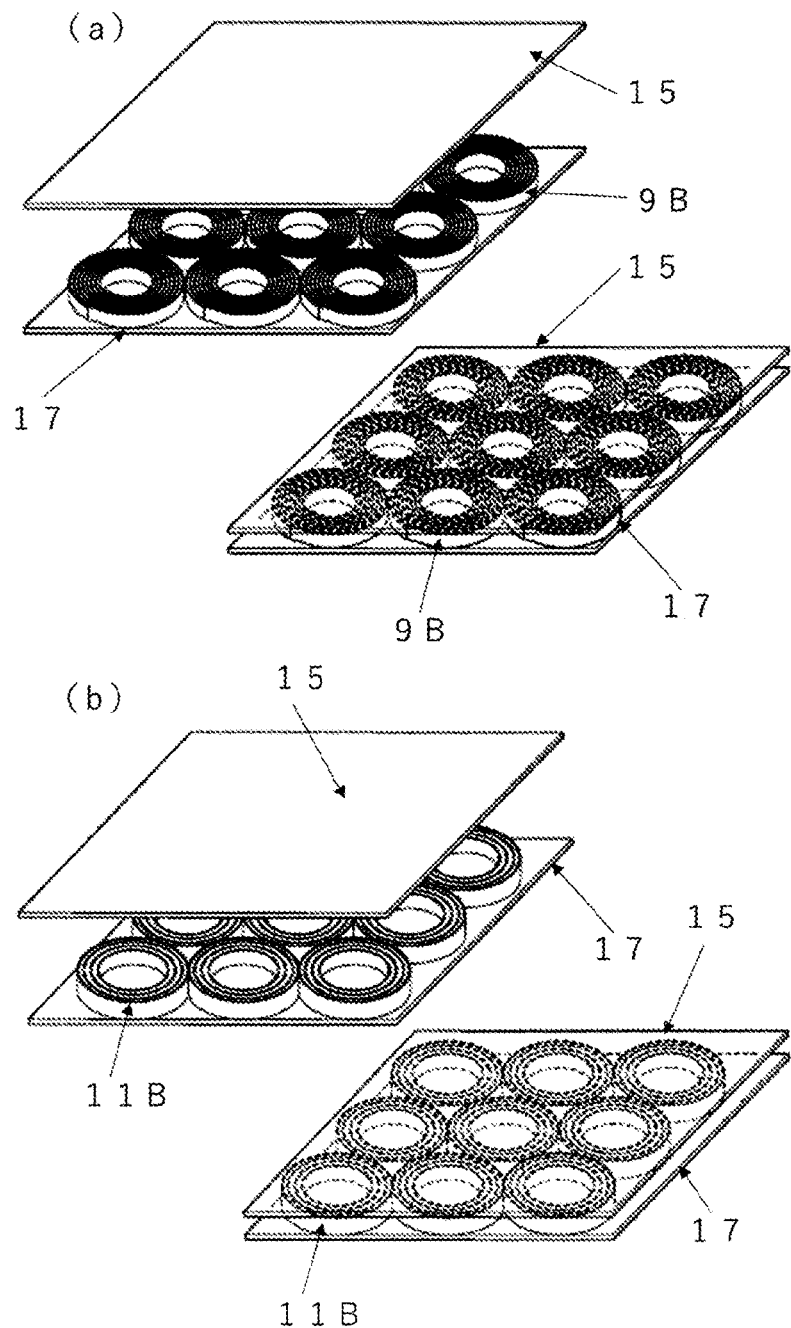
FIGS. 8(a) and 8(b) are views for explaining the first embodiment, in particular.

In the pattern 2, as shown in FIGS. 8(*a*) and 8(*b*), a plurality of cured cut vortex laminates 9B or a plurality of cured cut first cylindrical laminates 11B are arranged side by side so as to be adjacent to each other between plate members 15 and 17 similar to the pattern 1 of the composite material. Thereafter, the upper surface of the plate member 15 is bonded to the lower surfaces of the plurality of cured cut vortex laminates 9B or the plurality of cured cut first cylindrical laminates 11B, and the lower surface of the plate member 17 is bonded to the upper surfaces of the plurality of cured cut vortex laminates 9B or the plurality of cured cut first cylindrical laminates 11B. Accordingly, the plate members 15 and 17 can be reinforced.

In the pattern 2, the cut laminate 9B or the cut first cylindrical laminate 11B is bonded to the plate members 15 and 17, but the present invention is not limited to this, and for example, through holes may be formed in the plate members 15 and 17 and the cut laminate 9B or the cut first cylindrical laminate 11B may be fitted into the through holes to reinforce the plate members. In addition, a foam similar to that of the flexible body 3 may be used as the plate members 15 and 17, through holes similar to those described above may be formed in the plate members 15 and 17, the uncured vortex laminated body 9, the first cylindrical laminated body 11, and the second cylindrical laminated body 13 may be fitted into the through holes, and then a curing step may be performed to obtain a cured plate member. In this case, when a plate member having no through hole is desired, for example, the spiral laminated body 9 having no hollow portion may be provided by directly winding the various laminated bodies 7 and 8 in a spiral shape from the end portion without using the core S, and the spiral laminated body 9 may be fitted into the through hole of the plate member.

The present invention is not limited to the first embodiment described above, and various modifications may be made without departing from the gist thereof. In this modification, the same reference numerals are given to the same portions as those in the first embodiment, and the description thereof is omitted or simplified.

In the first embodiment described above, the flexible bodies 3 having the same width (thickness) are used in the pattern 1 of the laminating step as shown in FIG. 1(*b*) and the like. An example of this specific example is shown in FIG. 9, and this will be described below while interweaving the various steps described above.

Figure 9:
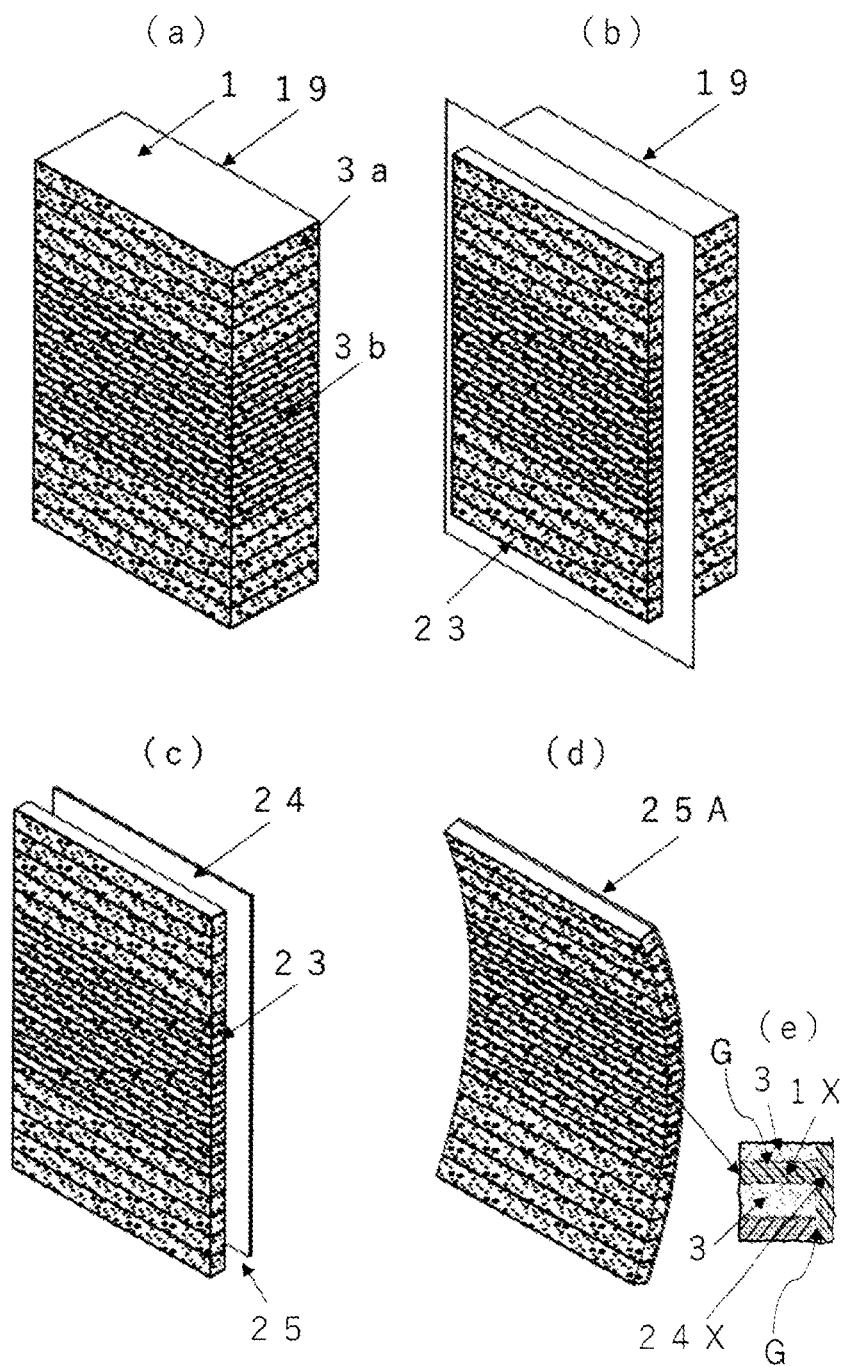
FIGS. 9(a) to 9(d) are views for explaining a modification of the first embodiment, in particular.

In the example shown in FIG. 9, the fiber sheet 1, the flexible body 3*a* having a predetermined width, and the flexible body 3*b* having a width smaller than that of the flexible body 3*a* are used to perform the lamination process. As shown in FIG. 9(*a*), a block-shaped third multilayer laminate 19 in which the fiber sheet 1 and the flexible bodies 3*a* and 3*b* are stacked in several layers is obtained. That is, the central portion of the third multilayer laminate 19 extending vertically is formed by alternately stacking relatively thin flexible bodies 3*b* and fiber sheets 1, and the upper portion and the lower portion of the third multilayer laminate 19 are formed by alternately stacking relatively thick flexible bodies 3*a* and fiber sheets 1.

Next, as shown in FIG. 9(*b*), a cutting step of cutting the third multilayer laminate 19 thin in the vertical direction is performed to obtain a third cut laminate 23. Then, as shown in FIG. 9(*c*), a laminating step of directly laminating another fiber sheet 24 on one surface of the third cut laminate 23 is performed to obtain a fourth multilayer laminate 25. Since the fourth multilayer laminate 25 is composed of the uncured fiber sheet 1 and the flexible body 3, the fourth multilayer laminate 25 is flexible even in this state, and deformation processing such as bending and twisting can be easily performed. For this reason, a bending step of slightly bending the fourth multilayer stacked body 25 around the central portion thereof can be performed (see FIG. 9(*d*)). Then, the above-described curing step is performed on the bent fourth multilayer laminate 25.

Here, in the fourth multilayer laminate 25, as shown in FIG. 9(*c*), the respective fiber sheets 1 extend in a state of being erected substantially vertically like ribs with respect to the fiber sheet 24. The flexible body 3 standing from the fiber sheet 24 and interposed between the adjacent fiber sheets 1 and 1 is in surface contact with the fiber sheets 1, 1, and 24 to be temporarily bonded. Therefore, as shown in FIG. 9(*e*) in an enlarged manner, when the curing step is performed, the energy-curable resin exuding from each of the fiber sheets 1, 1, and 24 seeps out into the flexible body 3 and is cured as described above. That is, the fiber sheets 1, 1, and 24 become the cured fiber sheets 1X, 1X, and 24X, respectively, by the curing step, and the energy-curable resin exuded and cured into the flexible body 3 becomes the bonding portion G between the flexible body 3 and the cured fiber sheets 1X, 1X, and 24X, and these are integrated. Similarly, the respective contact portions of the fiber sheets 1, 1, and 24 are also bonded and integrated by the adhesive portion G of the energy curable resin which has been exuded and cured. Thus, a cured fourth multilayer laminate 25A as a composite material can be obtained. In place of the uncured fiber sheets 1, 1, and 24, at least one of these may be cured fiber sheets 1X, 1X, and 24X, and in this case, the same operation and effect are also obtained.

In other words, the cured fourth multilayer laminate 25A includes the cured fiber sheet 24X which is the first fiber body obtained by curing the impregnated energy-curable resin, the plurality of cured fiber sheets 1X and 1X which are disposed in a standing state with respect to the cured fiber sheet 24X and which are the second fiber bodies obtained by curing the impregnated energy-curable resin, and the flexible body 3 which is in contact with the cured fiber sheet 24X and the cured fiber sheets 1X and 1X adjacent to each other, and the contact portion of the flexible body 3 with the cured fiber sheets 1X, 1X, and 24X includes the adhesive portion G which is formed of the energy-curable resin obtained by impregnating at least one of the cured fiber sheets 1X, 1X, and 24X and having been cured by exuding the energy-curable resin when energy is applied to the energy-curable resin impregnated into the cured fiber sheets 1X, 1X, and 24X.

The cured fourth multilayer laminate 25A obtained in this way has the cured fiber sheet 24C and the plurality of cured fiber sheets 1C erected with respect to the cured fiber sheet 24C, and therefore has higher strength than a simple plate-shaped cured fiber sheet. Further, as described above, in the state before curing, deformation processing such as bending and twisting can be easily performed, so that a composite material having a desired shape can be easily obtained. The same effect can be obtained when the fiber sheet 1 impregnated with the energy curing resin is used instead of the plate members 15 and 17.

Here, in the example shown in FIG. 9, the width of the flexible body 3a in the central portion is larger than the width of the flexible body 3b in the upper portion and the lower portion, but the width is not limited to this, and for example, the width of the flexible body 3a in the central portion may be made larger than the width of the flexible body 3b in the upper portion and the lower portion. In short, the flexible body 3 having a width according to the use may be used, and the width or the like may be appropriately set.

Further, in the example shown in FIG. 9, the cured fourth multilayer laminate as the composite material is obtained by performing the curing step on the fourth multilayer laminate 25, but the present invention is not limited thereto, and for example, the cured third multilayer laminate of the composite material may be obtained by performing the curing step on the third multilayer laminate 19 shown in FIG. 9(a), or the cured third cut laminate as the composite material may be obtained by performing the curing step on the third cut laminate 23 shown in FIG. 9(b). In this case, for example, the composite material can be obtained based on laminating the fiber sheet 24 into a releasable mold having a curved surface, and arranging the cured third cut laminate thereon to be combined. The cured third cut laminate may be used instead of the plurality of second laminates 5b, 5c, and 5d (see FIG. 7) described in the pattern 1 of the composite material.

However, for example, a cylindrical laminate may be obtained by repeating winding the fiber sheet 1 one or more times around the core S shown in FIG. 2, winding the flexible body 3 on the outside thereof, and winding the fiber sheet 1 one or more times. The fiber sheet 1 may be laminated on at least one of the side surfaces of the first multilayer laminate 5. In short, it is not particularly limited as long as the fiber sheet 1 and the flexible body 3 are directly laminated. The fiber sheet 1 may be cured after the fiber sheet 1 is laminated on at least one of the upper surface, the lower surface, and the side surfaces of the cured second laminate group 5Z shown in FIG. 7, or the cured laminate and the uncured fiber sheet may be appropriately combined.

Second Embodiment

Next, a second embodiment will be described. The second embodiment is a method of manufacturing a reinforced fiber body, the method including: a laminating step of directly laminating a fiber body impregnated with an energy curable resin and a flexible body to obtain an uncured laminate or directly bringing the fiber body into contact with the flexible body and then impregnating the fiber body with an energy curable resin to obtain an uncured laminate; a deforming step of deforming the uncured laminate; and a curing step of applying energy to the uncured laminate deformed in the deforming step to cure the energy curable resin contained in the fiber body constituting the uncured laminate(s).

Figure 10:
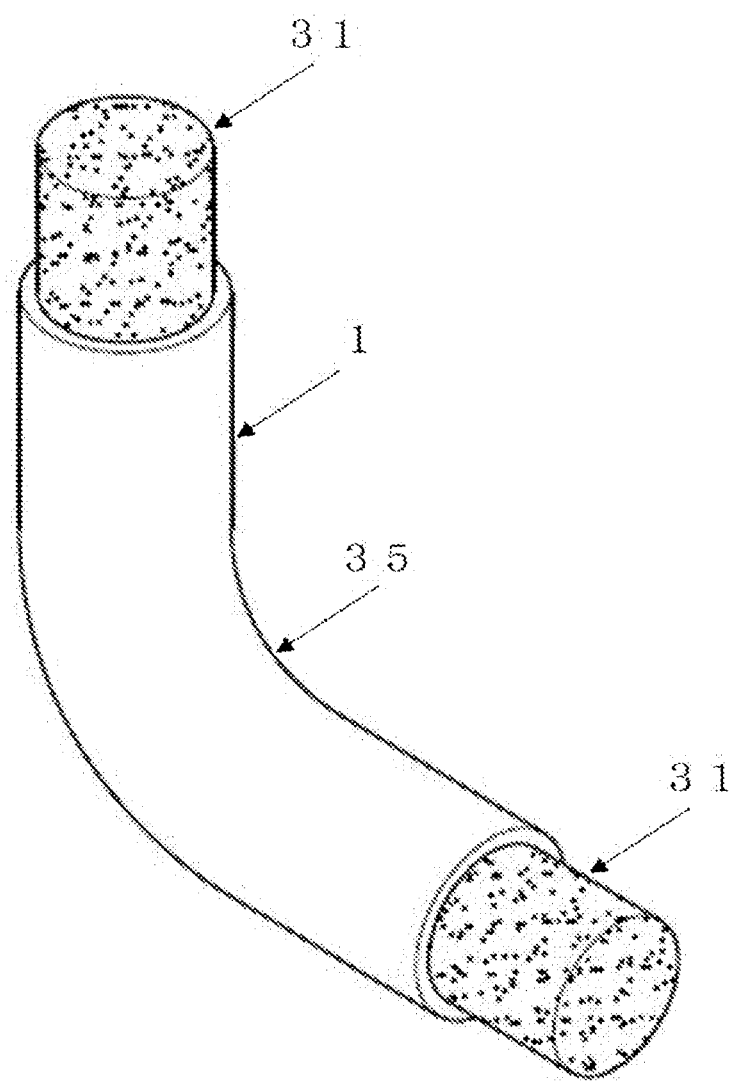
FIG. 10 is a plan view showing a bent cylindrical laminate according to the second embodiment.
Figure 11:
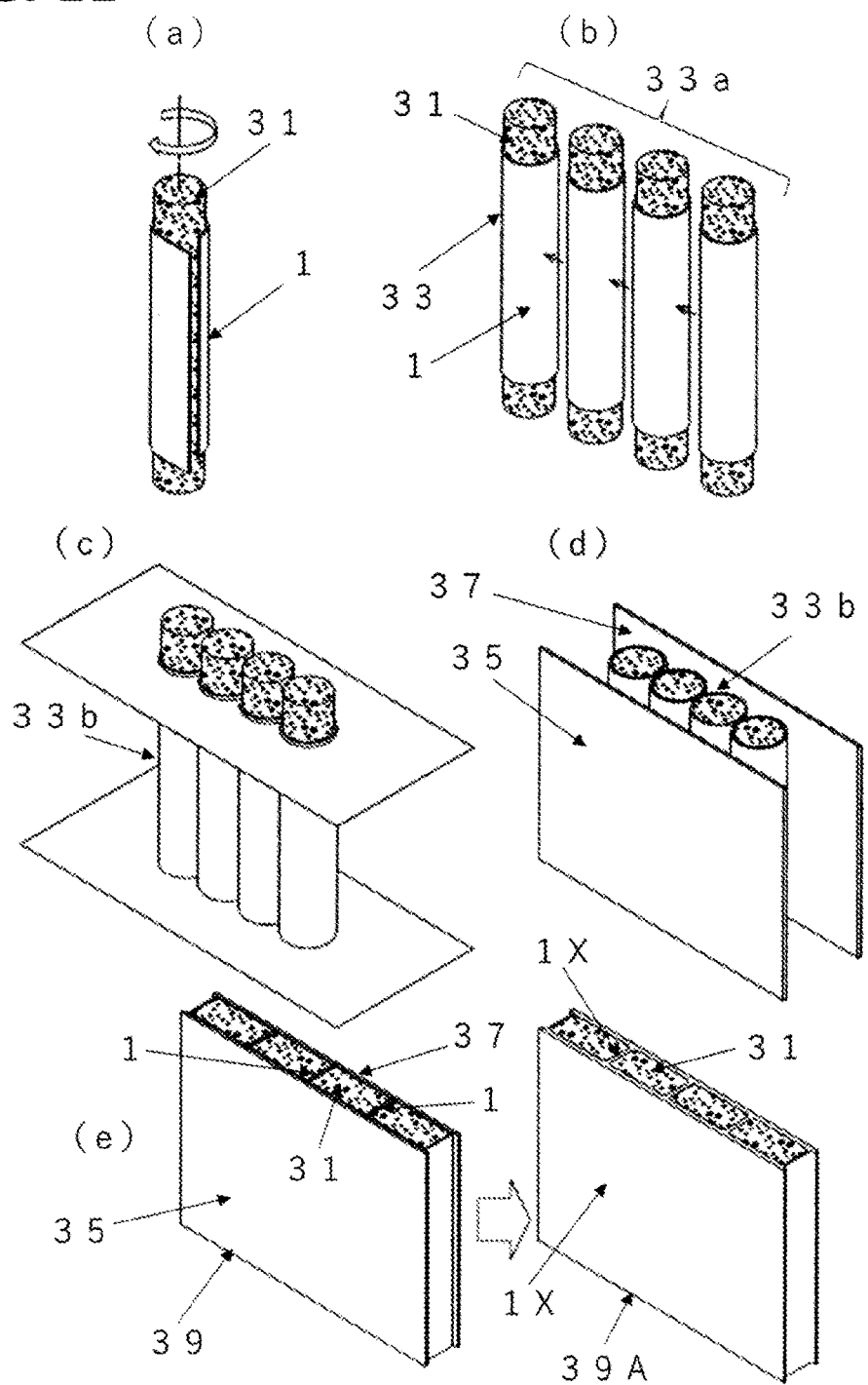
FIGS. 11(a) to 11(e) are views for explaining the second embodiment, particularly.
Figure 12:
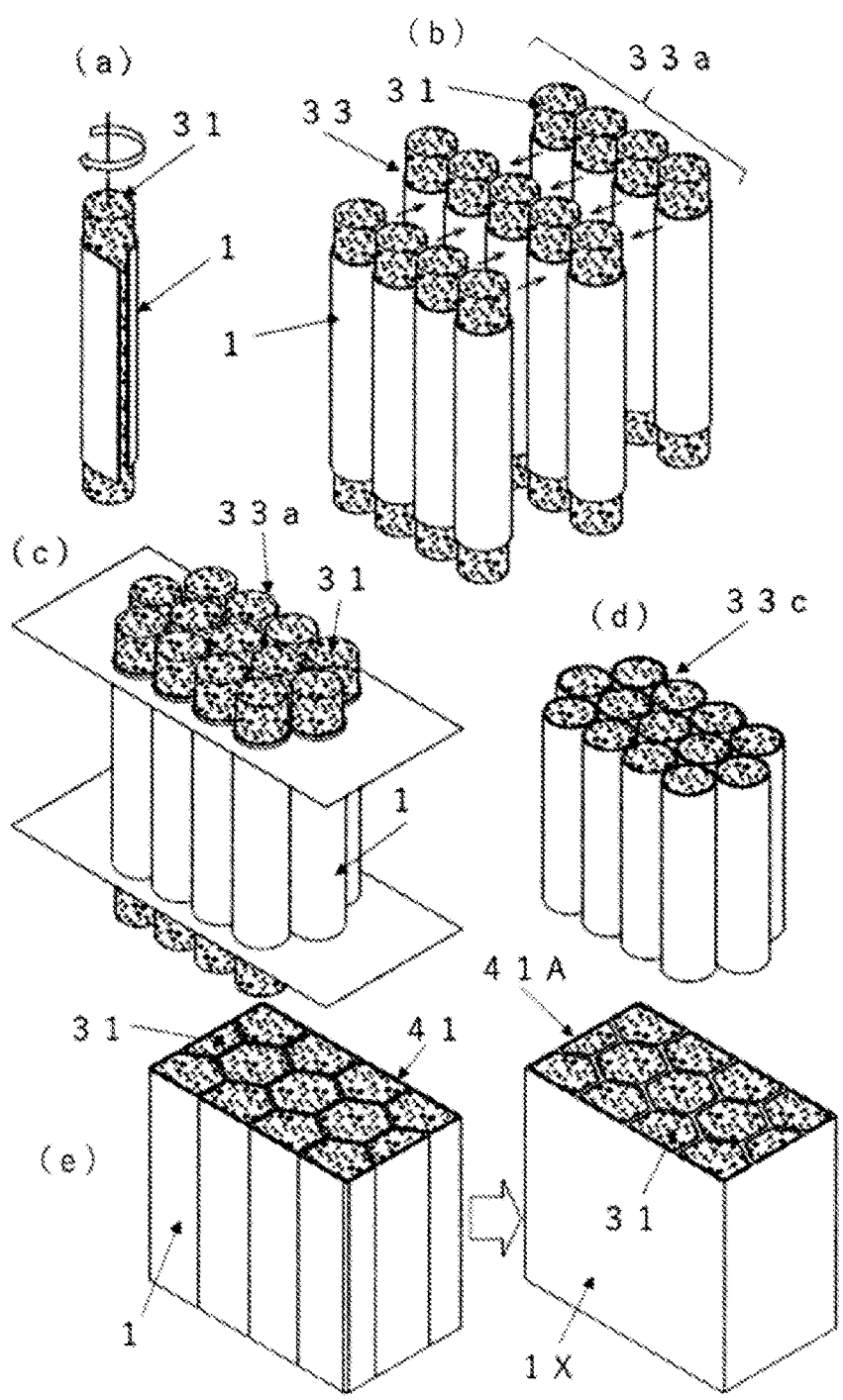
FIGS. 12(a), 12(b), 12(c), 12(d), and 12(e) are views for explaining the second embodiment, in particular.
Figure 13:
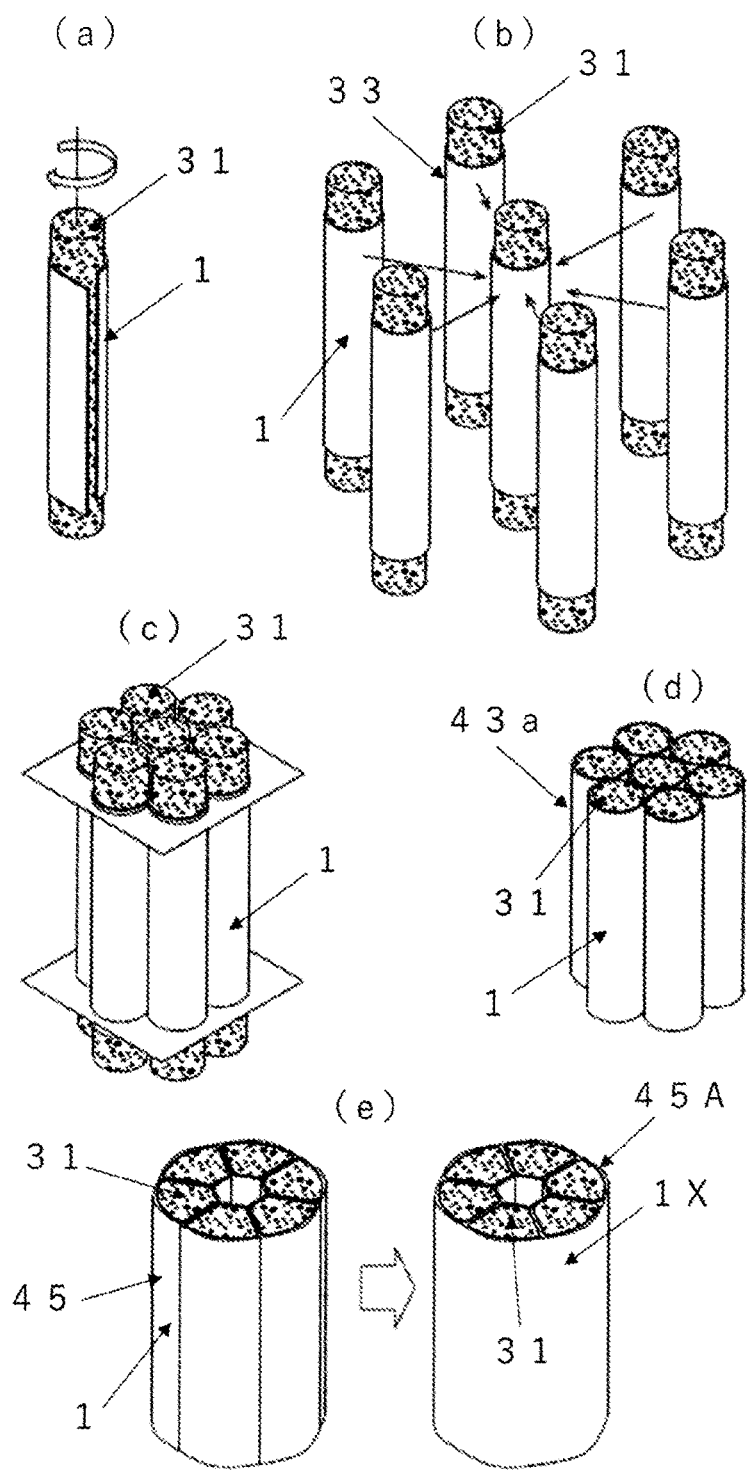
FIGS. 13(a) to 13(e) are views for explaining the second embodiment, and in particular.

The same reference numerals are given to the same portions as those of the first embodiment described above to omit or simplify the description.
<<1. Raw Material>>
Since the raw materials in the second embodiment are the same as those in the first embodiment, the description thereof is omitted.
<<2. Process>>
(2-1. Laminating Step)
In this laminating step, the fiber body and the flexible body are directly laminated. In this laminating step, fiber bodies and flexible bodies of various shapes and thicknesses can be used. Specifically, as shown in FIG. 11(a), FIG. 12(a), and FIG. 13(a), respectively, the fiber sheet 1 in an uncured state in which an energy curable resin is impregnated in advance and a columnar flexible body 31 serving as a core material are used. By directly winding the fiber sheet 1 around the flexible body 31, a cylindrical laminate 33 in which the fiber sheet 1 and the flexible body 31 are directly laminated is obtained. In the cylindrical laminate 33, the length of the flexible body 31 is longer than the longitudinal width of the fiber sheet 1, and both end portions of the flexible body 31 protrude from both ends in the longitudinal direction of the fiber sheet 1 which is wound around the flexible body 31 and has a cylindrical shape. It is needless to say that, as in the first embodiment, the fiber sheet 1 may be directly laminated on the flexible body 31 and then the energy-curable resin may be impregnated into the fiber sheet 1.
(2-2. Deformation Step)
In this deforming step, the uncured cylindrical laminate 33 which is easy to deform is variously deformed, and the deformation is not particularly limited, but the following patterns are exemplified.
(2-2-1. Pattern 1 of Deformation Step)
In the pattern 1, as shown in FIG. 10, a single cylindrical laminated body 33 is deformed to be bent in a curved shape. It is needless to say that the curvature is not particularly limited. In addition to bending in a curved shape such as an L-shape, a U-shape, an S-shape, or the like, a deformation of bending at a predetermined angle (e.g., 30 degrees or 90 degrees) according to a use or the like may be performed. This results in a bent cylindrical laminate 35 of a special shape bent into various shapes.
(2-2-2. Pattern 2 of Deformation Step)
In the pattern 2, as shown in FIG. 11(b), a cylindrical laminate group 33a in which a plurality of cylindrical laminates 33 are arranged in a line is obtained, and then, as shown in FIG. 11(c), a cutting step of cutting the vicinity of both ends of the flexible body 3 protruding from the fiber sheet 1 is performed, thereby obtaining a first cut cylindrical laminate group 33b in which both end surfaces of each cylindrical laminate 33 are flush with each other. The cutting step shown in FIG. 11(c) may be omitted. This is the same for the subsequent cutting steps.

Then, as shown in FIG. 11(d), the cut cylindrical laminate group 33b is sandwiched between the other pair of fiber sheets 35 and 37, and pressure is applied. As a result, as shown in FIG. 11(e), the cross-sectional shape of the fiber sheet 1 of the first cut cylindrical laminate group 33b is deformed into a hollow rectangular column shape, and the cross-sectional shape of each of the flexible bodies 31 positioned in the hollow portions is deformed into a rectangular column shape, thereby obtaining a special flat plate laminate 39 having a special shape deformed into a flat plate shape as a whole. The method of applying pressure may be performed by directly applying a load, or by reducing the pressure in a state where the first cut cylindrical stacked body group 33b is sealed, and is not particularly limited. This is the same for the subsequent deformation steps.

Although the pattern 2 is formed in a rectangular column shape, the present invention is not limited thereto, and a special flat plate laminate 39 having a pentagonal or hexagonal cross section may be obtained by adjusting the direction in which pressure is applied to the cylindrical laminate group 33a. Further, without using the other pair of fiber sheets 35 and 37, the pressure may be directly applied to the first cut cylindrical laminate group 33b or the pressure may be directly applied to the cylindrical laminate group 33a.

(2-2-3. Pattern 3 of Deformation Step)

In the pattern 3, as shown in FIG. 12(b), a plurality of cylindrical laminate groups 33a described in the pattern 2 of the above-described deforming step are prepared, and after these cylindrical laminate groups 33a are overlapped with each other in a parallel state, as shown in FIG. 12(c), a cutting step of cutting the vicinity of both end portions of the flexible body 3 protruding from the fiber sheet 1 is performed, whereby a second cut cylindrical laminate group 33c in which both end surfaces of the cylindrical laminate group 33a are flush with each other as shown in FIG. 12(d) is obtained.

Then, as shown in FIG. 12(e), by applying pressure to the second cut cylindrical laminate group 33c, the cross-sectional shape of the fiber sheet 1 of the second cut cylindrical laminate group 33c is deformed into a hollow hexagonal prism shape, and the cross-sectional shape of each of the flexible bodies 33 positioned in the respective hollows is deformed into a hexagonal prism shape, thereby obtaining a block-shaped special block laminate 41 as a whole. In the pattern 3, it is needless to say that the special block laminate 41 having various cross-sectional shapes can be obtained by adjusting the direction in which pressure is applied and the like, similarly to the pattern 2.

(2-2-4. Pattern 4 of Deformation Step)

In this pattern 4, as shown in FIG. 13(b), a cylindrical laminate bundle 43 is formed by bundling a plurality of cylindrical laminates 33 in a bundle, and as shown in FIG. 13(c), a cutting step is performed to cut the vicinity of both ends of the flexible body 3 protruding from the fiber sheet 1, whereby as shown in FIG. 13(d), a cut cylindrical laminate bundle 43a is formed by a bundle of cut cylindrical laminates 33d in which both end surfaces of each cylindrical laminate 33 are flush with each other.

Then, as shown in FIG. 13(e), by applying pressure to the cut cylindrical laminate bundle 43a, the respective fiber sheets 1 of the cut cylindrical laminate 33d surrounding the center cut cylindrical laminate 33d in the cut cylindrical laminate bundle 43a are deformed into a hollow pentagonal prism shape. Accordingly, the respective flexible bodies 33 positioned in the hollow of the cut cylindrical laminated body 33d are deformed into a pentagonal prism shape. Further, the central cylindrical laminate 33d is deformed into a hollow hexagonal prism shape, and the flexible body 33 positioned in the hollow is deformed into a hexagonal prism shape. As a whole, a special cylindrical laminate 45 having a special shape deformed into a cylindrical shape is obtained. In the pattern 4, it is needless to say that the special block laminate 45 having various cross-sectional shapes can be obtained by adjusting the direction in which pressure is applied or the like, similarly to the pattern 2. Further, in FIG. 13(e), in order to clearly show that the fiber sheet 1 of the central cut cylindrical laminate 33d has a hexagonal cross-sectional shape, the flexible body 33 in the hollow portion of the central cut cylindrical laminate 33d is removed, but the hollow portion is actually filled with the flexible body 33.

(2-3. Curing Step)

In this curing step, the energy curable resin impregnated in the sheet fibers is cured by applying energy to each of the bent cylindrical laminate 35, the special flat plate laminate 39, the special block laminate 41, and the second cylindrical laminate 41. As a result, the bent cylindrical laminate 35 becomes a first reinforcing fiber body (not shown), the special flat plate laminate 39 becomes a second reinforcing fiber body 39A (see FIG. 11(e)), the special block laminate 41 becomes a third reinforcing fiber body 41A (see FIG. 12(e)), and the special cylindrical laminate 45 becomes a fourth reinforcing fiber body 45A (see FIG. 13(e)). In each of the reinforcing fiber bodies 39A, 41A, and 45A, a removing step of removing the flexible body 33 may be performed by, for example, boring or melting the flexible body 33.

As described above, in the second embodiment, the uncured laminate obtained in the laminating step is easily deformed, and reinforced fibers having a desired special shape can be obtained by an extremely simple method of performing the curing step after being deformed into a desired special shape in this state.

The present invention is not limited to the second embodiment described above, and various modifications may be made without departing from the gist thereof. For example, in the cutting steps shown in FIG. 11(c), FIG. 12(c), and FIG. 13(c), as shown in FIG. 11(b), FIG. 12(b), and FIG. 13(b), respectively, the cylindrical stacked body 33 is formed into the cylindrical stacked body group 33a and the cylindrical stacked body bundle 43, but the present invention is not limited to this, and the cylindrical stacked body group 33a and the cylindrical stacked body bundle 43 may be formed, and then the cylindrical stacked body group 33a and the cylindrical stacked body bundle 43 may be formed and deformed by applying pressure as they are.

Summary of First to Second Embodiments

The first to second embodiments described above can be summarized as follows.

The invention (1-1) is a method of manufacturing a composite material including a reinforced fiber body and a flexible body, the method including a laminating step of directly laminating a fiber body impregnated with an energy-curable resin and a flexible body to obtain an uncured laminate or directly bringing the fiber body into contact with the flexible body and impregnating the fiber body with an energy-curable resin to obtain an uncured laminate, and a curing step of applying energy to the uncured laminate to cure the energy-curable resin contained in the fiber body constituting the uncured laminate.

The invention (1-2) is a method for producing the invention (1-1), wherein the flexible body is a foam.

The invention (1-3) is the method according to the invention (1-1) or (1-2), further comprising a winding step of winding the uncured laminate after the laminating step.

The invention (1-4) is the method according to any one of the inventions (1-1) to (1-3), further comprising a step of cutting the uncured laminate or the cured laminate cured by the curing step to be smaller than the cured laminate.

According to the present invention, it is possible to prevent breakage of a composite material (composite material of a reinforced fiber and a flexible body) due to deterioration of an adhesive or an adhesive.

The invention (2-1) is a method of manufacturing a reinforced fiber body, including a laminating step of directly laminating a fiber body impregnated with an energy-curable resin and a flexible body to obtain an uncured laminate or directly bringing the fiber body into contact with the flexible body and then impregnating the fiber body with an energy-curable resin to obtain an uncured laminate, a deforming step of deforming the uncured laminate, and a curing step of applying energy to the uncured laminate deformed in the deforming step and curing the energy-curable resin contained in the fiber body constituting the uncured laminate.

The invention (2-2) is a method for producing the invention (2-1), wherein the flexible body is a foam.

According to the present invention, the reinforcing fiber body having a special shape can be easily manufactured.

The composite material of the present invention (3-1) includes a first fiber body in which an impregnated energy-curable resin is cured, a second fiber body disposed in an upright state with respect to the first fiber body and in which the impregnated energy-curable resin is cured, and a flexible body in contact with the first fiber body and the second fiber body adjacent to each other, and an adhesive portion in which the energy-curable resin impregnated in at least one of the first and second fiber bodies is exuded and cured when energy is applied to the energy-curable resin impregnated in the first and second fiber bodies and the energy-curable resin is cured in the contact portion of the flexible body with the first fiber body and the second fiber body, the adhesive portion being formed of an energy-curable resin cured.

According to the present invention, it is possible to prevent the composite material from being damaged due to deterioration of an adhesive, an adhesive, or the like.

The invention (4-1) is a composite material. The composite material includes: a first cylindrical fiber body formed in a cylindrical shape and having an impregnated energy-curable resin cured; a second cylindrical fiber body formed in a cylindrical shape having a smaller diameter than the first cylindrical fiber body, disposed concentrically with the first cylindrical fiber body in a hollow portion of the first cylindrical fiber body, and having an impregnated energy-curable resin cured; an intervening fiber body interposed between the first and second cylindrical fiber bodies, extending along a longitudinal direction of the first and second cylindrical fiber bodies, in contact with an inner peripheral surface of the first cylindrical fiber body and an outer peripheral surface of the second cylindrical fiber body, respectively, and having an impregnated energy-curable resin cured; and a flexible body disposed in an inner space formed by a pair of intervening fiber bodies facing the first and second cylindrical fiber bodies, and in contact with an inner peripheral surface of the first cylindrical fiber body, an outer peripheral surface of the second cylindrical fiber body, and one surface of the intervening fiber body, respectively. A contact portion between the first and second cylindrical fiber bodies and the intervening fiber body in the foam is provided with an adhesive portion made of an energy-curable resin which is cured by an energy-curable resin impregnated in at least one of the first and second fiber bodies and the intervening fiber body when the energy-curable resin impregnated in the first and second cylindrical fiber bodies and the intervening fiber body is cured by applying energy.

According to the present invention, it is possible to prevent the composite material from being damaged due to deterioration of an adhesive, an adhesive, or the like.

Embodiments I to IV>

Next, embodiments I to IV will be described from a different viewpoint from the first to second embodiments. The embodiments I to IV may be considered to organize a fiber-reinforced resin structure, a manufacturing method thereof, and the like obtained by using, applying, changing, or the like the concept described in the second embodiment.

In embodiments I to IV, the members corresponding to the flexible bodies described in the first to second embodiments are described as being specified in the foam, but use of the flexible bodies other than the foam is not excluded.

The size of the fiber-reinforced resin structure, the thickness of the thick portion of the fiber-reinforced resin structure, the diameter of the communication hole H of the fiber-reinforced resin structure, and the like described below are not limited in any way, and can be appropriately adjusted according to the application.

Embodiment I

<<<Structure>>>

A fiber-reinforced resin structure 100-1 according to embodiment I is a cylindrical fiber-reinforced resin structure including at least a fiber body 10 and a resin 20 impregnated in the fiber body 10 (see FIG. 14(c)).

More specifically, the resin 20 impregnated in the cylindrical fiber body 10 becomes a thick portion, and a cylindrical fiber-reinforced resin structure 100-1 is formed as a whole.

In the fiber-reinforced resin structure 100-1, the foam 30 may be inserted into the cylinder. In the following embodiments and modifications, each fiber-reinforced resin structure may or may not include the foam 30.

<<<Raw Materials>>>
<<Fiber Body 10>>

The shape, size, and the like of the fiber body 10 are not particularly limited, but it is preferable that the fiber body 10 be, for example, a sheet-like fiber sheet. The fiber sheet is not particularly limited as long as it is a sheet in which fibers are aggregated, and examples thereof include woven fabrics (plain weave, twill weave, double weave, triple weave, and the like), non-woven fabrics, and unidirectional reinforcing materials (a UD material).

The thickness of the fiber sheet is not particularly limited and can be appropriately selected. If the fiber sheet is too thin, the mechanical properties such as the strength and elastic modulus of the fiber sheet may be reduced. Therefore, the thickness of the fiber sheet according to the present invention is preferably 20 μm to 500 μm, and more preferably 30 μm to 200 μm, for example. It is needless to say that a fiber sheet having a thickness of several mm such as a chopped strand mat or a core mat may be used.

The fibers forming the fiber sheet are not particularly limited, and known ones can be used, and at least one of metal fibers, inorganic fibers, and organic fibers can be included.

Examples of the fibers constituting the fiber body 10 include metal fibers such as stainless steel fibers, nickel fibers, copper fibers, aluminum fibers, silver fibers, gold fibers, and titanium fibers; The PET resin, the PVA resin, the polyolefin resin such as polyethylene and polypropylene, the polyvinyl chloride resin, the aramid resin, the acrylic resin, the polyimide resin, the PBO fiber, the cellulose, the vinolone, the nylon, the rayon, the aramid, the phenol-based fiber, the fluorine fiber, the pulp (fiber), the kenaf, the hemp, and the fiber are organic fibers. Inorganic fibers such as glass fibers, carbon fibers, silica fibers, rock-wells, slag-wells, alumina fibers, and ceramic fibers; Examples thereof include the above.

One or more of these fibers may be used in combination. For example, a two-layer non-crimp fiber (NCF) including carbon fibers and polyester fibers may be used.

The fiber is preferably a fiber having a Young's modulus higher than that of a resin or a matrix resin used for the sealing material, and more preferably a metal fiber or an inorganic fiber. The higher the Young's modulus of the fiber, the higher the rigidity of the fiber sheet can be made, and when embedded in the resin, the rigidity of the resin can be effectively improved. Therefore, it is possible to obtain a sealing material having high rigidity and being hardly broken.

The fiber sheet may be one in which fibers are knitted in a cylindrical shape.

The fiber sheet may be partially punched or the like to form pores within a range that does not inhibit the effects of the present invention.

The fiber sheet may be a bias sheet (biased sheet).

<Method of Manufacturing a Fiber Sheet>

A known method can be used as the method for producing the fiber sheet. For example, as a method of manufacturing a nonwoven fabric which is a preferable example, a dry method such as a carding method or an air-laid method, a wet-type manufacturing method which is formed by being embedded in paper, a fries forming method such as a spunbonding method or a meltblowing method; Examples thereof include a fleece bonding method such as a thermal bonding method, a chemical bond method, a needle punch method, a spunlace method (hydroentangling method), a stitch bonding method, and a steam jet method. Among them, the manufacturing method by the wet-type manufacturing method is suitable because it is possible to thin the fiber sheet and is excellent in uniformity.

When the fiber sheet is cylindrical, for example, the fiber sheet can be manufactured in the same manner as in the case of the assembly.

The method for producing a fiber sheet may include a step of performing bias cutting.

<<Resin 20>>

As the resin 20, a known resin used as a fiber-reinforced resin can be used, and a thermoplastic resin or the like can also be used, but in order to improve workability, an energy curable resin is preferably used.

<Energy Curable Resin>

Energy curable resin is a thermosetting resin, and may further include an energy ray curable resin or the like.

Examples of the thermosetting resin include epoxy resin, unsaturated polyester resin, polyvinyl ester resin, phenol resin, polyurethane resin, acrylic resin, melanin resin, melamine resin, urea resin, benzoguanamine resin, rosin-modified maleic acid resin, and rosin-modified fumaric acid resin. One of them may be used alone or two or more thereof may be used in combination.

Examples of the energy ray-curable resin include epoxy resin, acrylic resin, silicone resin, and polyester resin. One of them may be used alone or two or more thereof may be used in combination.

In the following description, the resin 20 is described as a thermosetting resin, but in a range where there is no contradiction, "thermosetting" can be read as "cured" in the following description.

<<Foam 30>>

The foam may be a closed cell foam, an open cell foam, or a foam containing both closed cells and open cells. Note that the closed cell foam shown here does not show only a foam in which all the bubbles are completely independent, but may be such that some bubbles communicate with adjacent bubbles, and each bubble is independent to the extent that it is understood as a closed cell foam as a whole.

Here, in the case where the foam contains closed cells and open cells, the average ratio of the closed cells and the open cells (hereinafter referred to as closed cell ratio) is not particularly limited, but for example, the closed cell ratio may be 0.1 to 99.9%, preferably 10.0 to 99.9%, more preferably 30.0 to 99.9%, and still more preferably 50.0 to 99.9%. A foam containing only closed cells is most preferable. In the case of containing a large amount of closed cells, since a large amount of sealed air layers exist in the foam, when the foam is heated, the sealed air layers thermally expand in addition to the thermal expansion of the resin itself, and the force of the foam pressing the fiber body can be increased. Therefore, when the foam is heated in a thermal curing step described later, thermal expansion occurs more strongly, and by pressing the fiber body, the moldability (without wrinkles or twisting, and the shape is set to a desired shape) can be made more excellent, and by shrinkage at the time of cooling after curing, the foam is easily removed from the laminate.

The closed cell ratio contained in the foam is obtained by observing the cross section of the foam using a microscope or a scanning electron microscope, counting the number of closed cells and the number of open cells per unit area in a captured image, dividing the number of closed cells by the number of the entire cells (all of the closed cells and the open cells), and multiplying the result by 100. The measurement of the closed cell rate is repeated at 10 points of a randomly selected cross section of the same foam, and the average value of the closed cell rates obtained is set as the closed cell rate of the foam.

The resin constituting the foam is not particularly limited, and may be appropriately selected depending on the use, such as an olefin resin, a urethane resin, a styrene resin, a phenol resin, and a silicone resin. In addition, natural rubber (NR), chloroprene rubber (CR), ethylene propylene diene rubber (EPDM), nitrile rubber (NBR), and the like may be used as the foam. Of these, an olefin-based resin can be preferably used. For the olefin resin, for example, the curing temperature of the fiber body and the degree of thermal expansion of the foam at the curing temperature of the fiber body can be easily adjusted by adjusting the compounding of polyethylene and polypropylene. That is, when the foam is heated in a thermal curing step described later and thermally expanded, the foam can be made excellent in moldability (without wrinkles or twisting, and the shape can be made a desired shape) by pressing the fiber body, but the degree of thermal expansion can be adjusted by changing the ratio of the blending of the olefin resin, for example, polyethylene and polypropylene, and the moldability can be made excellent in accordance with the shape of the fiber body. By adjusting the mixing ratio of polyethylene and polypropylene, the presence or absence of crosslinking, and the degree of crosslinking, the flexibility (hardness), thermal expansion, wettability (affinity), and softening point of the foam can be easily adjusted.

The resin constituting the foam can be freely selected in consideration of the affinity with the uncured resin contained in the fiber body. When the affinity between the resin constituting the foam and the uncured resin contained in the fiber body is high, the operation of winding the laminate around the foam becomes easy, and it may become difficult to remove the foam after heating and curing. Therefore, it is preferable to adjust the affinity of the resin constituting the foam and the uncured resin contained in the fiber body.

In order to adjust the affinity of the resin constituting the foam and the uncured resin contained in the fiber body, the wettability (for example, contact angle or surface energy) of the resin constituting the foam and the uncured resin contained in the fiber body may be adjusted, and in order to increase the affinity, the contact angle (or surface energy) of the resin constituting the foam and the uncured resin contained in the fiber body may be selected. When the affinity is increased, the contact angle (or surface energy) between the resin constituting the foam and the uncured resin contained in the fiber body may be set to a close value, and when the affinity is decreased, the contact angle and surface energy of the resin constituting the foam and the uncured resin contained in the fiber body may be set to a distant value.

The difference in contact angle between the resin constituting the foam and the uncured resin contained in the fiber body is not particularly limited, but may be more than 0° and less than 90°. When the difference in the contact angle between the resin constituting the foam and the uncured resin contained in the fiber body is within such a range, the fiber body is easily wound around the foam, and the foam can be removed after heating and curing.

The softening point of the resin constituting the foam is not particularly limited, and can be selected according to the curing temperature of the thermosetting resin used for the fiber body. For example, the softening point of the resin constituting the foam can be set to be 10° C. or more higher than the curing temperature of the thermosetting resin used in the fiber body. For example, when the thermosetting resin is epoxy resin, the softening point of the resin constituting the foam can be 60 to 200° C., preferably 80 to 160° C., and more preferably 100 to 150° C. When the softening point of the resin of the foam is in such a range, the foam has sufficient thermal expansion properties as the foam and sufficient strength (for example, tensile strength) during heating, so that excellent moldability (without wrinkles, twisting, etc., and the shape can be formed into a desired shape) during molding can be achieved.

The foam is preferably a solid body. It is preferable that the foam does not have a hole (through hole/hollow portion) having a diameter that is ½ or more, ⅓ or more, ¼ or more, ⅕ or more, ⅒ or more, 1/15 or more, or 1/20 or more of the outer diameter of the foam. That is, when the foam is a solid body or a hollow body, the ratio of the inner diameter/the outer diameter of the foam is preferably ½ or less, ⅓ or less, ¼ or less, ⅕ or less, ⅒ or less, 1/15 or less, or 1/20 or less. With such a configuration of the foam, buckling of the foam can be prevented when the foam is deformed/curved.

The foam may contain known additive components such as thickeners, plasticizers, lubricants, fillers, flame retardants, colorants, antioxidants, reinforcements, conductive materials, and the like.

The density of the foam is not particularly limited, but may be, for example, 1 kg/m³ or more, 2 kg/m³ or more, 3 kg/m³ or more, 4 kg/m³ or more, 5 kg/m³ or more, 10 kg/m³ or more, or 15 kg/m³ or more, and may be 800 kg/m³ or less, 700 kg/m³ or less, 600 kg/m³ or less, 500 kg/m³ or less, 250 kg/m³ or less, 100 kg/m³ or less, or 50 kg/m³ or less. The upper limit value and the lower limit value can be arbitrarily combined into a desired numerical value range. For example, 5 to 800 kg/m³, preferably 5 to 500 kg/m³, more preferably 10 to 250 kg/m³. When the density of the foam is in such a range, the foam has sufficient thermal expansion properties as the foam and sufficient strength (for example, tensile strength) during heating, so that excellent moldability (without wrinkles or twisting, and the shape can be formed into a desired shape) during molding can be achieved. The density of the foam is the apparent density measured according to JIS K7222: 2005 "Foamed Plastic and Rubber—How to determine apparent density". The reciprocal of the density of the foam may be expressed as the foaming magnification.

The foam has a tensile elongation at break at 25° C. of greater than 25% and less than 400%, preferably greater than 50% and less than 350%, more preferably greater than 80% and less than 300%. If the tensile elongation at break at 25° C. of the foam is in such a range, it is possible to sufficiently deform the laminate in the deformation step described later, and it is possible to further adjust the thermal expansion coefficient to a suitable range, and therefore, when the foam is heated in the heat curing step described later, it is possible to strongly press the fiber body, and it is possible to make the foam more excellent in moldability (without wrinkles, twisting, and the like, and making the shape a desired shape).

The tensile elongation at break at 25° C. of the foam is measured by processing the foam into a No. 3 dumbbell test piece according to JIS K6767 "Foamed Plastic-Polyethylene-Test Method".

The tensile strength of the foam at 25° C. is not particularly limited, but may be, for example, 0.05 MPa or more, preferably 0.1 MPa or more, and more preferably 0.2 MPa or more. The upper limit of the tensile strength of the foam at 25° C. is not particularly limited, but may be, for example, 20 MPa or less. When the tensile strength of the foam at 25° C. is in such a range, the foam has sufficient strength in the deformation step described later, and the foam can uniformly press the fibrous body. For this reason, when the foam is heated in the heat curing step, it is possible to strongly press the fiber body, and it is possible to make the moldability (to make the shape into a desired shape without wrinkles or twisting) more excellent.

The tensile strength of the foam at 25° C. can be measured by processing the foam into a No. 3 dumbbell test piece according to JIS K6767 "Foamed Plastic-Polyethylene-Test Method".

The tear strength of the foam at 25° C. is not particularly limited, but may be, for example, 0.5 N/mm or more, preferably 0.8 N/mm or more, and more preferably 1.0 N/mm or more. The upper limit of the tear strength of the foam at 25° C. is not particularly limited, but may be, for example, 50 N/mm or less. When the foam has a tear strength in the range of 25° C., the foam has sufficient strength in the deformation step described below, and the foam can uniformly press the fibrous body. For this reason, when the foam is heated in the heat curing step, it is possible to strongly press the fiber body, and it is possible to make the moldability (to make the shape into a desired shape without wrinkles or twisting) more excellent.

The tear strength of the foam at 25° C. can be measured according to JIS K6767 "Foamed Plastic-Polyethylene-Test Method".

The 25% compressive load (hardness) of the foam at 25° C. is not particularly limited, but may be, for example, 1 to 2000 kPa, preferably 5 to 1000 kPa, more preferably 10 to 500 kPa, and still more preferably 10 to 200 kPa. When the 25% compressive load of the foam is in such a range, it is easy to wind the fiber body around the foam, and it is possible to sufficiently deform the laminate in the deformation step described later, and further, in the heat curing step described later, the reaction force of the foam itself can act in addition to the thermal expansion. For this reason, when the foam is heated in the heat curing step, the fiber body can be strongly pressed, and the moldability (the shape is set to a desired shape without wrinkles or twisting) can be further improved.

The 25% compressive load of the foam at 25° C. can be determined by the D method described in JIS K6400-2: 2012 "Soft foam material-physical characteristics-second part: Method of determining hardness and compressive stress-strain characteristics".

The thermal conductivity of the foam is not particularly limited, but may be, for example, 0.01 W/m·K or more, preferably 0.02 W/m·K or more, and more preferably 0.03 W/m·K or more. The upper limit of the thermal conductivity of the foam is not particularly limited, but may be, for example, 0.2 W/m·K or less. In the case where the thermal conductivity of the foam is in such a range, the foam can be uniformly heated in a short period of time when the foam is heated in a thermal curing step described later, and therefore the foam can be uniformly thermally expanded. For this reason, the variation in the force of the foam pressing the fiber body is reduced, and the moldability (the shape is set to a desired shape without wrinkles or twisting) can be further improved.

The thermal conductivity of the foam can be measured by the method described in JIS A1412-1: 2016 "Measuring Method of Thermal Resistance and Thermal Conductivity of Thermal Insulating Material—First Part: Protective Thermal Plate Method (GHP Method)".

The linear thermal expansion coefficient of the foam is not particularly limited, but may be, for example, 0.01% or more, preferably 0.05% or more, more preferably 0.10% or more, and even more preferably 1.00% or more. The upper limit of the linear thermal expansion coefficient of the foam is not particularly limited, but may be 10.00% or less. In the case where the coefficient of linear thermal expansion of the foam is in such a range, the foam can strongly press the fiber body when heated in a heat curing step described later, and the moldability (the shape is set to a desired shape without wrinkles or twisting) can be further improved.

The linear thermal expansion coefficient of the foam can be measured by a method of processing the foam into width of 3 mm×length of 25 mm×thickness of 2 mm, raising the distance between chucks to 10 mm, a load of 5 g, and a temperature from 25 to 85° C. at 1° C./min. under a nitrogen atmosphere in a tensile mode, lowering the temperature from 85° C. to 25° C. at 1° C./min., and raising the temperature from 25° C. to 85° C. at 1° C./min. again, and measuring the linear thermal expansion coefficient at 85° C. at the time of the second temperature rise in this case using a TMA.

<Manufacturing Method of Foam>

The foam can be manufactured by known methods. Examples of the method for producing a foam include a raw material preparing step which is a step of obtaining a liquid raw material mixture containing at least an aqueous liquid dispersion medium and a water-dispersed resin, a foaming step of foaming the liquid raw material mixture to obtain a foamed mixture, and a drying step of evaporating the dispersion medium in the foamed mixture. Before or after the foaming step, the liquid raw material mixture or the foamed mixture may be applied using a doctor knife or a doctor roll, or the liquid raw material mixture or the foamed mixture may be extruded or injection molded. Further, a rubber sponge or the like may be molded into a desired shape, or a foam molded in a block shape may be formed into a desired shape such as a sheet shape, a string shape, or a cylindrical shape by slicing. A part or all of these steps may be simultaneously executed.

Examples of the foaming means in the foaming step include a method of forming bubbles by blending a foaming agent generating a gas by a chemical reaction into a liquid raw material mixture, a method of forming bubbles by dissolving an appropriate gas in the liquid raw material mixture under high pressure and then reducing the pressure or heating the gas, a method of forming bubbles by removing a soluble substance mixed in the liquid raw material mixture and forming bubbles as voids, and a method of mechanically stirring the liquid raw material mixture so that air or an appropriate gas is contained (mechanical floss).

The foaming conditions (temperature, time, etc.) in the foaming step and the drying conditions (temperature, time, etc.) in the drying step can be appropriately changed according to the raw material of the foam, the foaming means used, and the like.

In addition, the shape, size, and the like of the foam are not particularly limited, and a cylindrical foam, a columnar, a quadrangular prism, a hexagonal prism, or a foam having a star-shaped cross section or a semicircular cross section can be appropriately selected. In addition to the foam molded so as to have a desired shape, the foam may be molded by cutting or cutting a block-like foam, or may be wound into a sheet-like foam.

<<<Method of Manufacturing>>>

The method of manufacturing the fiber-reinforced resin structure 100-1 is, for example, a method including a preparation step of preparing the laminate 50 having the columnar foam 30 and the fiber body 10 covering at least a part of the side surface portion of the foam 30, the laminate 50 being impregnated with the thermosetting resin (uncured resin 25) in an uncured state in the fiber body 10, and a curing step of thermally curing the resin (uncured resin 25) impregnated in the fiber body 10 to obtain the resin 20.

The method of manufacturing the fiber-reinforced resin structure 100-1 may include a cutting step of cutting the foam 30, a cooling step of cooling the foam 30 and the resin 20 after the curing step, a removing step of extracting the foam 30 after the curing step, and the like.

Although not particularly described, the method of manufacturing the fiber-reinforced resin structure 100-1 may include a grinding step or a polishing step of processing the surface of the fiber-reinforced resin structure 100-1 after the curing step.

<<Preparation Step>>

The preparation step is a step of preparing a laminate 50 having a columnar foam 30 and a fiber body 10 covering at least a part of a side surface portion of the foam 30, and in which the fiber body 10 is impregnated with an uncured thermosetting resin (uncured resin 25).

The preparation step may be performed by purchasing the stacked body 50 from the outside or the like.

The preparation step may also include an impregnation step and a lamination step.

<Impregnation Step>

In the impregnation step, the uncured resin 25 and the fiber body 10 are brought into contact with each other to impregnate the fiber body 10 with the uncured resin 25.

The impregnation method is not particularly limited, and may be roll coating, hand-up molding, infusion molding, VaRTM molding, RTM molding, or the like, or may be a method (dipping) of immersing the fiber body 10 in a tank containing the uncured resin 25.

The impregnation conditions can be adjusted according to the types of the fiber body 10 and the uncured resin 25. In the case where the fiber body 10 is hardly impregnated with the uncured resin 25, the impregnation time may be increased or the impregnation may be performed while pressurizing.

Regarding the volume ratio of the uncured resin 25 and the fiber body 10, the volume fraction (fiber fraction) of the fiber body 10 can be 15 to 85% by volume, preferably 25 to 85% by volume, and more preferably 45 to 80% by volume, when the volume of the laminate 50 is 100% by volume. In the case where the volume fraction (fiber fraction) of the fiber body 10 is in such a range, the fiber-reinforced resin structure after curing has few defects, is less likely to be destroyed such as buckling, and has excellent mechanical strength.

<Lamination Step>

In the laminating step, at least a part of the side surface of the foam 30 is covered with the fiber body 10 (see FIGS. 14(a) and 14(c)).

The method of covering the side surface of the foam 30 with the fiber body 10 is not particularly limited. For example, when the fiber body 10 is a fiber sheet, the fiber body 10 may be wound around the foam 30. The number of turns is preferably one turn or more, and may be two turns or more.

In addition, in the laminating step, the fiber body 10 after covering the foam body 30 may be temporarily fastened. For example, when the fiber body 10 is impregnated with the uncured resin 25, the fiber body 10 can be temporarily adhered to the side surface of the foam body 30 by the adhesiveness of the uncured resin 25.

Figure 14:
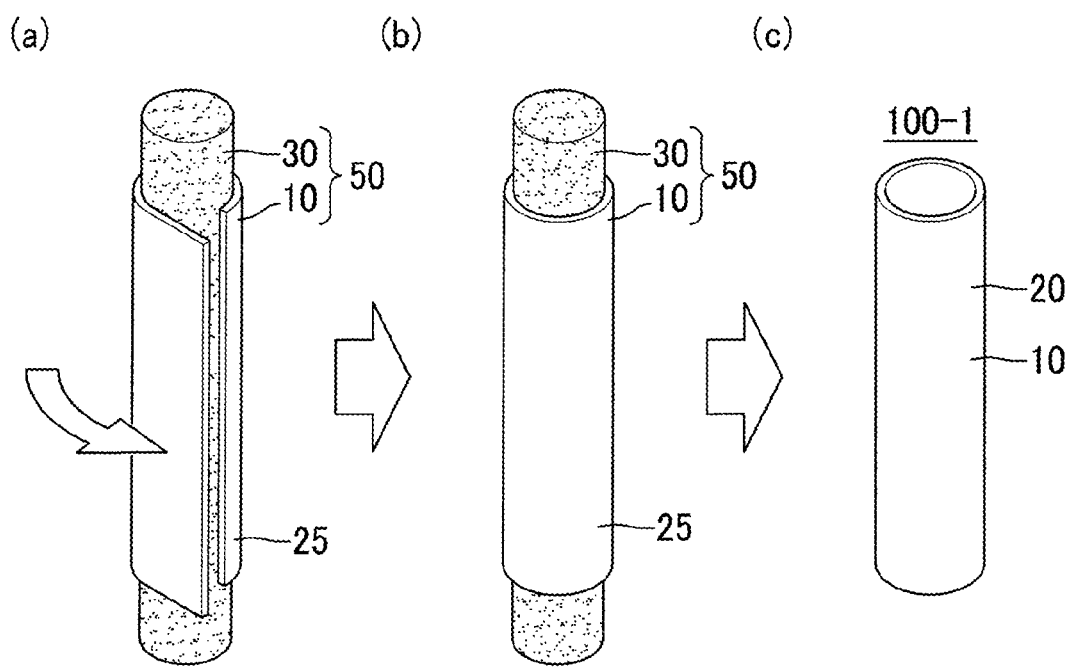
FIG. 14 is a perspective view showing a fiber-reinforced resin structure and a method of manufacturing the same according to embodiment I.

In the laminating step, as shown in FIG. 14, it is not necessary to cover the entire side surface from the upper end to the lower end of the foam 30 with the fiber body 10, but it is also possible to cover the entire side surface of the foam 30 with the fiber body 10.

In the laminating step, the thickness of the fiber body 10 can be adjusted. For example, when the fiber body 10 is a fiber sheet, the thickness of the fiber body 10 can be increased by increasing the number of winding times of the fiber body 10. The fiber sheet may be a single sheet, or a plurality of sheets may be stacked, and is not particularly limited. Two or more types of fiber bodies 10 may be used in combination. When the fiber body 10 is a woven fabric or a UD material, the winding may be performed while adjusting the orientation (bias) of the fiber in consideration of thermal expansion of the foam or deformation step, and bending step in another embodiment. Further, when the fiber body 10 is formed by adjusting the orientation of the fiber, the fiber body 10 may be formed so that the orientation of the fiber is adjusted over the entire fiber body 10, or the fiber body 10 may be formed so that the orientation of the fiber is adjusted only in a partial region of the fiber body 10 (for example, the fiber body 10 may be formed so that the orientation of the fiber is adjusted only in a region that is easily deformable).

In the case where the fiber body 10 is long, the fiber body 10 can be wound around the side surface of the foam body 30 while moving in the axial direction of the foam body 30, thereby performing the lamination process. For example, the lamination step may be performed based on a filament winding method, a braiding method, or the like.

Alternatively, the fiber body 10 may be configured in a cylindrical shape in advance, and the foam body 30 may be inserted into the cylinder.

In the laminating step, the side surface of the foam 30 is covered with the fiber body 10, but the foam 30 is flexibly deformed even when the fiber body 10 is arranged on the side surface of the foam 30. For this reason, for example, when the fiber body 10 is a fiber sheet and the fiber body 10 is wound around the foam 30, the deformation of the foam 30 absorbs strain or the like that may be generated in the fiber body 10, and the fiber body 10 can be held in a state of being natural to some extent.

Here, the impregnation step may be performed before the lamination step, simultaneously with the lamination step, or after the lamination step. In the case where the fiber body 10 is a fiber sheet, in order to reliably impregnate the fiber body 10, it is preferable to impregnate the fiber body 10 with a resin (uncured resin 25) before the lamination step and to perform the lamination step in a state where the fiber body 10 is impregnated with the uncured resin 25. In the description of each embodiment, the preparation step is described as a step of performing the lamination step after performing the impregnation step, but the present invention is not limited thereto.

<<Curing Step>>

By performing the curing step, the uncured resin 25 impregnated in the fiber body 10 is cured to obtain the resin 20 (see FIG. 14(c)).

In the curing step, the curing method and the curing conditions may be selected so that the uncured resin 25 is sufficiently cured according to the type of the resin (the uncured resin 25) to be used. For example, in the case of a thermosetting resin, the uncured resin 25 can be cured by applying heat to the uncured resin 25.

In order to enhance the shape retention of the laminate 50 (the foam 30), the curing step may be performed in a state in which the laminate 50 is fitted into a mold or a shrink tape is disposed around the laminate 50.

<<Cooling Step>>

The cooling step is a step of cooling the resin 20 and the foam 30 obtained by heat curing before performing the foam removing step and the like.

It is considered that the foam 30 thermally expands by performing thermal curing in the curing step, and a force in a direction to push and spread the fiber body 10 is generated. It is considered that the foam body 30 contracts by cooling the foam body 30 after the uncured resin 25 is thermally cured, and the separation between the resin 20 and the foam body 30 is promoted, and the removal step described later can be easily performed.

The cooling method is not particularly limited, and may be performed by any method such as natural cooling, air blowing, or leaving in a cold air atmosphere. The temperature after cooling may be set to any one of room temperature or more, room temperature, and room temperature or less. As an example, the cooling step can be performed by cooling the temperature at the time of thermal curing to 10° C. or more, 20° C. or more, 30° C. or more, 40° C. or more, or 50° C. or more.

<<Cutting Step>>

The cutting step may be a step of cutting only the foam 30 protruding from the fiber body 10, or may be a step of cutting the foam 30 and the fiber body 10 simultaneously. For example, the laminate 50 may be adjusted to a desired length by a cutting step.

The cutting step may be performed before the curing step or after the curing step.

<<Removal Step>>

By removing the foam 30 included in the laminate 50, a hollow fiber-reinforced resin structure 100-1 not including the foam 30 can be obtained (see FIG. 14(c)).

The uncured resin 25 is cured in a state in which the foam 30 and the uncured resin 25 are in contact with each other by performing a preparation step (for example, a lamination step, an impregnation step) and a curing step. In the case where the foam 30 is made of foam or the like, the uncured resin 25 may intrude into bubbles existing on the surface of the foam. The foam and the resin 20 can be fixed by performing the curing step in this state. Therefore, in the case of performing the removing step, the material of the foam and the density of the foam (the expansion ratio) may be adjusted so that the foam and the resin 20 are not easily fixed, or the foam may be easily removed even if the foam and the resin 20 are fixed.

The removing step may be performed by dissolving the foam 30 in addition to physically removing the foam 30.

Modification of the Embodiment I

The fiber-reinforced resin structure 100-1 is not limited to a cylindrical one. Hereinafter, a fiber reinforced resin structure 100-1 other than a cylindrical structure will be described as a modification of the embodiment I.

<<Structure>>

The fiber-reinforced resin structure 100-1 may have a polygonal tubular structure (a tubular structure in which a cross section perpendicular to the tubular axis is polygonal) instead of the cylindrical structure shown in FIG. 14. For example, the fiber-reinforced resin structure 100-1 may have a rectangular tube shape as shown in FIG. 15(c) or a hexagonal tube shape as shown in FIG. 16(c). The polygonal tube shape of the fiber body 10 may be a triangular tube shape or a polygonal tube shape having a hexagonal tube shape or more.

In the fiber-reinforced resin structure 100-1, the outer shape (the shape of the outer side surface of the cylinder) and the inner shape (the shape of the inner side surface of the cylinder) do not have to match each other in shape. For example, the fiber-reinforced resin structure 100-1 may have a configuration in which the outer shape is a prism shape and the inner shape is a cylindrical shape.

<<Method of Manufacturing>>

The method of manufacturing the fiber-reinforced resin structure 100-1 according to the modification is a method including, for example, a preparation step of preparing the laminate 50 having the columnar foam 30 and the fiber body 10 covering at least a part of the side surface portion of the foam 30, the laminate 50 being impregnated with the thermosetting resin (uncured resin 25) in an uncured state in the fiber body 10, a deformation step of applying an external force to the laminate 50 to deform the cross-sectional shape of the foam 30, and a curing step of thermally curing the resin (uncured resin 25) impregnated in the fiber body 10 to obtain the resin 20.

The preparation step, the curing step, and the like are as described above. As described above, the cooling step, the cutting step, and the removing step may be performed.

<Deformation Step>

In the deforming step, an external force is applied to the laminate 50 to deform the cross-sectional shape of the foam 30 (see FIGS. 15(a), 15(b), 16(a), and 16(b)). More specifically, for example, the stacked body 50 can be deformed into a prismatic shape by applying an external force to the side surface portion of the stacked body 50.

Although the foam body 30 and the fiber body 10 are deformed by applying an external force to the side surface portion of the laminate 50, the fiber body 10 is not crushed by the foam body 30, and a predetermined shape (for example, a cylindrical shape) can be maintained.

The deforming step can be performed by fitting the stacked body 50 into a mold or the like having a predetermined shape, for example.

In the deformation process, the shape of the stacked body 50 can be freely changed by adjusting the direction in which the external force is applied or the position in which the external force is applied.

For example, as shown in FIG. 15(a), when an external force is evenly applied to the side surface of the laminate 50 (foam 30) from four directions, the laminate 50 can be formed in a rectangular tube shape, and as shown in FIG. 16(a), when an external force is evenly applied to the side surface of the laminate 50 (foam 30) from six directions, the laminate 50 can be formed in a hexagonal tube shape.

In addition, by making the external force applied to one surface of the stacked body 50 different from the external force applied to the other surface, or changing the direction and strength of the external force applied to the upper side of the stacked body 50 and the lower side of the stacked body 50, the stacked body 50 which is asymmetrical with respect to the vertical direction (axial direction) of the stacked body 50, or with respect to the horizontal and longitudinal directions (directions perpendicular to the axis) of the stacked body 50 can be formed.

The fiber-reinforced resin structure 100-1 may be formed into a fiber-reinforced resin structure 100-1 having another shape by changing the outer diameter of the foam 30 in accordance with the axial direction (for example, by providing a taper).

It is to be noted that the fiber-reinforced resin structure 100-1 having a polygonal cylindrical shape can be obtained by performing the same manufacturing method as that of the embodiment I after forming the foam 30 in a prismatic shape in advance, but in such a case, a load is easily applied to the fibers and the strength may be deteriorated.

Embodiment II

<<<Structure>>>

As shown in FIG. 17(d), the fiber-reinforced resin structure 100-2 according to the embodiment II is a fiber-reinforced resin structure that includes at least a fiber body 10 and a resin 20 impregnated in the fiber body 10, and the fiber body 10 has a curved cylindrical shape (or the cylinder axis B is curved).

In other words, the fiber-reinforced resin structure 100-2 has the curved portion 60 formed by bending at least a part of the structure of the fiber-reinforced resin structure 100-2. Further, the fiber-reinforced resin structure 100-2 has a tubular structure held in the curved portion 60. When the fiber-reinforced resin structure 100-2 has the curved portion 60 and the non-curved portion, the curved portion 60 and the non-curved portion are smoothly connected. In addition, the fiber-reinforced resin structure 100-2 may have the same shape in the curved portion 60 and the non-curved portion when a cross section perpendicular to the cylinder axis B is observed.

The fiber-reinforced resin structure 100-2 may have a plurality of curved portions 60. In this case, the direction of the curve, the degree of the curve, and the like can be designed for each curved portion 60.

The degree of curvature of the cylinder axis B or the curvature of the curved portion 60 is not particularly limited. The degree of curvature of the cylinder axis B or the curvature of the curved portion 60 may be curved in a curved shape such as an L-shape, a U-shape, an S-shape, or an arcuate shape, or may be curved at a predetermined angle (e.g., 30 degrees, 45 degrees, or 90 degrees) depending on the application or the like.

The fiber body 10 is not limited to a cylindrical shape, and may be a polygonal cylindrical shape.

The structure according to the fiber-reinforced resin structure 100-2 can be expressed as a structure in which the fiber-reinforced resin structure 100-1 is curved in a predetermined direction while the cross-sectional shape along the axis is maintained.

<<<Method of Manufacturing>>>

The method of manufacturing the fiber-reinforced resin structure 100-2 is, for example, a method including a preparation step of preparing a laminate 50 having a columnar foam 30 and a fiber body 10 covering at least a part of a side surface portion of the foam 30, the laminate 50 being impregnated with a thermosetting resin (uncured resin 25) in an uncured state in the fiber body 10, a bending step of bending the laminate 50 so that a column axis A of the foam is bent, and a curing step of curing the resin (uncured resin 25) impregnated in the fiber body 10 to obtain the resin 20.

The preparation step, the curing step, and the like are as described above. As described above, the cutting step, the cooling step, and the removing step may be performed.

<<Bending Step>>

In the bending step, an external force is applied to the laminate 50 so that the column axis A of the foam 30 is bent. As a result, since the entire axis of the laminate 50 is curved by the column axis A of the foam 30 being curved, the cylinder axis B of the fiber body 10 is also similarly curved when the laminate 50 includes the cylindrical fiber body 10.

Although the foam body 30 and the fiber body 10 are deformed by applying an external force to the side surface portion of the laminate 50, the fiber body 10 is not crushed by the foam body 30, and a predetermined shape (for example, a cylindrical shape) can be maintained.

Figure 17:
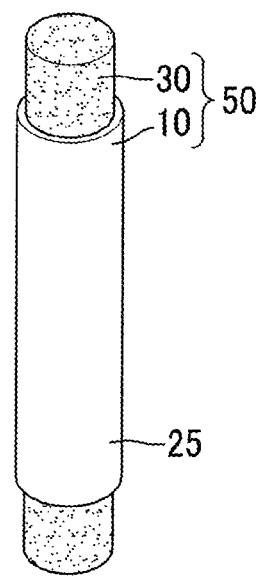
FIG. 17 is a perspective view showing a fiber-reinforced resin structure and a method of manufacturing the same according to embodiment II.
Figure 17:
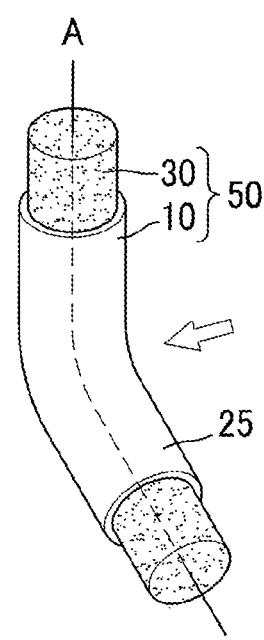
Figure 17:
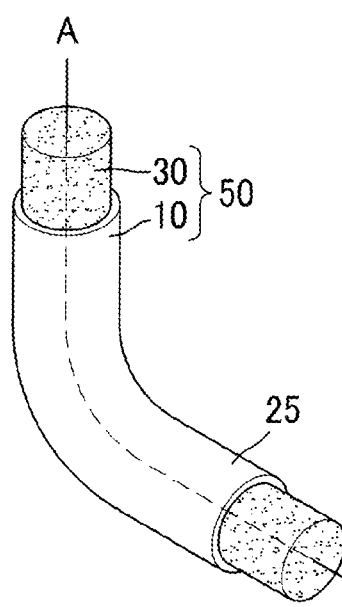
Figure 17:
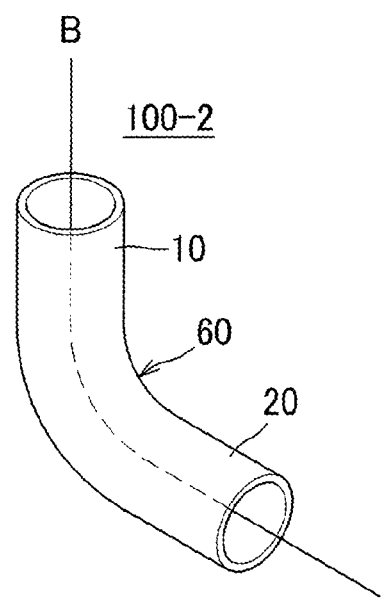

As a method of bending, an external force may be applied to the stacked body 50 from a predetermined direction (see FIGS. 17(*b*) and 17(*c*)). The magnitude of the external force may be appropriately set in consideration of the material of the stacked body 50, the degree of curvature, and the like.

The bending step can be performed by fitting the stacked body 50 into a predetermined mold having a bending structure, for example. When a complicated curved shape is desired, the mold may be divided.

The laminate 50 includes a fiber body 10 and a foam 30. Therefore, the stacked body 50 is difficult to break even if the bending occurs. In particular, when the fiber body 10 is a fiber sheet and the foam body 30 is a foam body, the fiber sheet and the foam body are flexibly deformed, so that a smoothly curved (hardly having a buckled portion) laminate 50 can be obtained.

In the case of bending, the density of the fiber bodies 10 becomes dense in the compressed portion, and the density of the fiber bodies 10 becomes sparse in the pulled portion. In consideration of this point, the thickness or the like of the fiber body 10 at a position where the curved portion 60 can be formed may be adjusted in advance in the lamination process.

In the case of the fiber reinforced resin structure 100-2 having a plurality of curved portions, a mold having a shape having a plurality of curved portions may be used, or the bending step may be performed a plurality of times.

Modification of the Embodiment II

Figure 18:
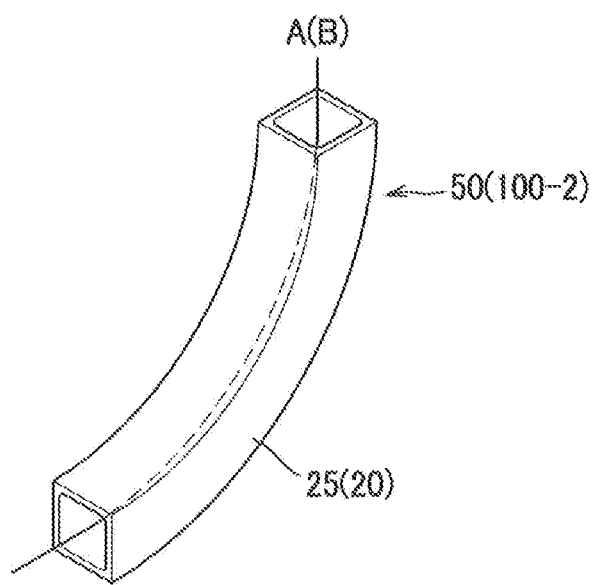
FIG. 18 is a perspective view showing a fiber reinforced resin structure and a method of manufacturing the same according to a modification of embodiment II.

In the embodiment II, as shown in FIG. 17, the fiber-reinforced resin structure 100-2 having a generally cylindrical shape is described, but the fiber-reinforced resin structure 100-2 may be configured to have a generally polygonal cylindrical shape as shown in FIG. 18.

The structure according to the modification of the fiber-reinforced resin structure 100-2 may be expressed as a structure in which the structure according to the modification of the fiber-reinforced resin structure 100-1 is curved in a predetermined direction while the cross-sectional shape along the axis is maintained.

The fiber-reinforced resin structure 100-2 according to the modification of the embodiment II can be manufactured by performing the above-described deformation step and the above-described bending step on the laminate 50 (see FIG. 18). In FIG. 18, the foam 30 is not shown for simplicity.

The cross-sectional shape of the stacked body 50 (the foam 30) is deformed into a prismatic shape by the deformation step, and the column axis A of the stacked body 50 is curved by the bending step.

In these steps, although the foam body 30 and the fiber body 10 are deformed by applying an external force to the side surface portion of the laminate 50, the fiber body 10 is not crushed by the foam body 30, and a predetermined shape (for example, a cylindrical shape) can be maintained.

The deformation step and the bending step may be performed in a state where the laminate 50 includes the foam 30 and before the resin is cured (in other words, in a state where the laminate 50 includes the uncured resin 25), and may be any of a mode in which the bending step is performed after the deformation step, a mode in which the deformation step is performed after the bending step, and a mode in which the deformation step and the bending step are performed simultaneously.

When the deforming step and the bending step are simultaneously performed, for example, the deformation step and the bending step can be performed by fitting the stacked body 50 into a mold having a predetermined bending structure and a predetermined cross-sectional shape.

Figure 19:
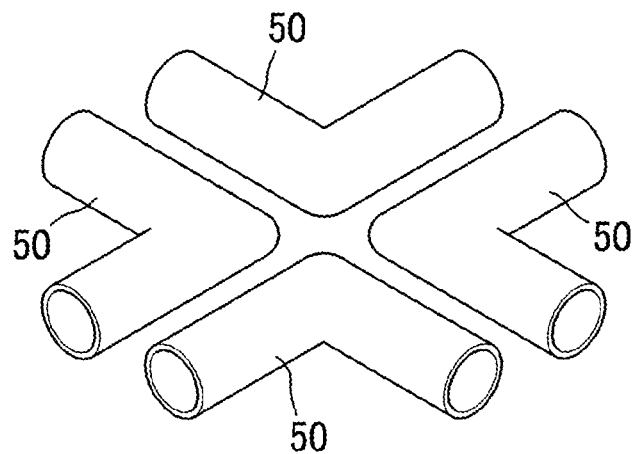
FIG. 19 is a perspective view showing a fiber-reinforced resin structure and a method of manufacturing the same according to a modification of embodiment II.
Figure 19:
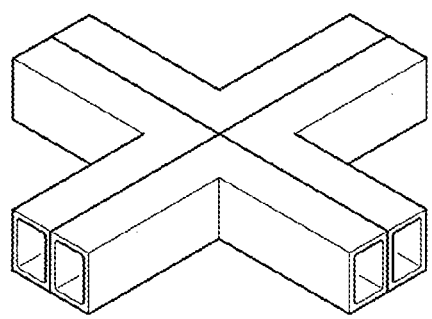
Figure 19:
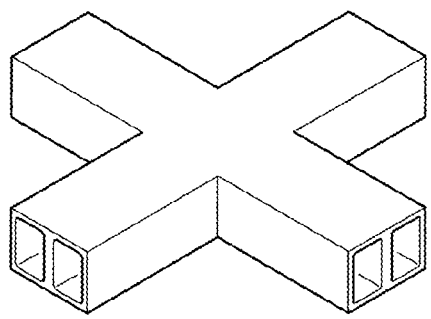

Further, when manufacturing the fiber-reinforced resin structure 100-2, as shown in FIG. 19, the method may further include a step of providing a step of bringing the plurality of laminated bodies 50 into contact with each other in a state before the resin is cured (a state in which the laminated body 50 includes the uncured resin 25) (see FIG. 19(*b*)).

For example, in the manufacturing method shown in FIG. 19, a plurality of laminates 50 each having a curved structure obtained by performing a bending process are prepared (see FIG. 19(*a*)), the plurality of laminates 50 are arranged so as to be in contact with each other, the deformation process is performed in this state (see FIG. 19(*b*)), and the fiber reinforced resin structure 100-2 having a plurality of communication holes and in which the communication holes are not parallel to each other can be manufactured.

In FIGS. 19(*a*) and 19(*b*), the foam body 30 is omitted for the sake of simplicity.

The contact step, the deformation step, and the bending step may be performed in any order, and a part or all of them may be performed simultaneously.

When the contact step, the deformation step, and the bending step are simultaneously performed, for example, the plurality of stacked bodies 50 can be fitted into a mold having a predetermined bending structure, a predetermined cross-sectional shape, and a plurality of stacked bodies 50 can be arranged at predetermined positions.

In this manner, in a state before the resin is cured (a state in which the stacked body 50 includes the uncured resin 25), other members including the uncured resin 25 are brought into contact with the plurality of stacked bodies 50, and then the resin is cured, thereby obtaining a structure integrated by the resin 20. The concept of bringing a plurality of stacked bodies 50 and the like into contact with each other and integrating them in a state before the resin is cured can be similarly applied to all embodiments. That is, a structure in which the respective structures are integrated via a resin in all combinations of the structures described in the respective embodiments and in all combinations of the structures described in the respective embodiments and known structures is understood to be within the scope of the present invention.

Embodiment III

<<<Structure>>>

The fiber-reinforced resin structure 100-3 according to the embodiment III is, for example, a fiber-reinforced resin structure including at least a fiber body 10 and a resin 20 impregnated in the fiber body 10, at least a first communication hole H, a second communication hole H parallel to the first communication hole H, and a wall portion defining the first communication hole H and the second communication hole H, and the wall portion includes the fiber body 10.

The fiber-reinforced resin structure 100-3 includes a plurality of communication holes H arranged in parallel with each other so that the hole axes C are arranged vertically with respect to a predetermined direction (for example, a certain straight line). The number of the communication holes H of the fiber-reinforced resin structure 100-3 may be two or more. For example, FIG. 20(*f*) shows a structure having four communication holes H, FIG. 21(*f*) shows a structure having 13 communication holes H, FIG. 22(*f*) shows a structure having 12 communication holes H, and FIG. 23(*f*) shows a structure having 7 communication holes H.

The first communication hole H and the second communication hole H are provided so as to be parallel to each other. The fact that the first communication hole H and the second communication hole H are parallel indicates that the hole axis C of the communication hole H on one side and the hole axis C of the communication hole H on the other side are regularly arranged to such an extent that they are not parallel to each other in the overall view.

The wall portion (for example, the resin 20 having a large thickness) defining each communication hole H includes the fiber body 10. It is preferable that the fiber body 10 is present in the entire wall portion around each communication hole H, in other words, the fiber body 10 is provided so as to continuously surround the periphery of the communication hole H by one or more turns.

In the present embodiment, the fiber body 10 is included in a wall portion (a wall portion existing between a certain communication hole H and another communication hole H) that partitions the certain communication hole H and another communication hole H. With this configuration, the strength of the fiber-reinforced resin structure 100-3 in the thickness direction (direction perpendicular to the direction in which the communication holes H are arranged) can be increased.

Figure 20:
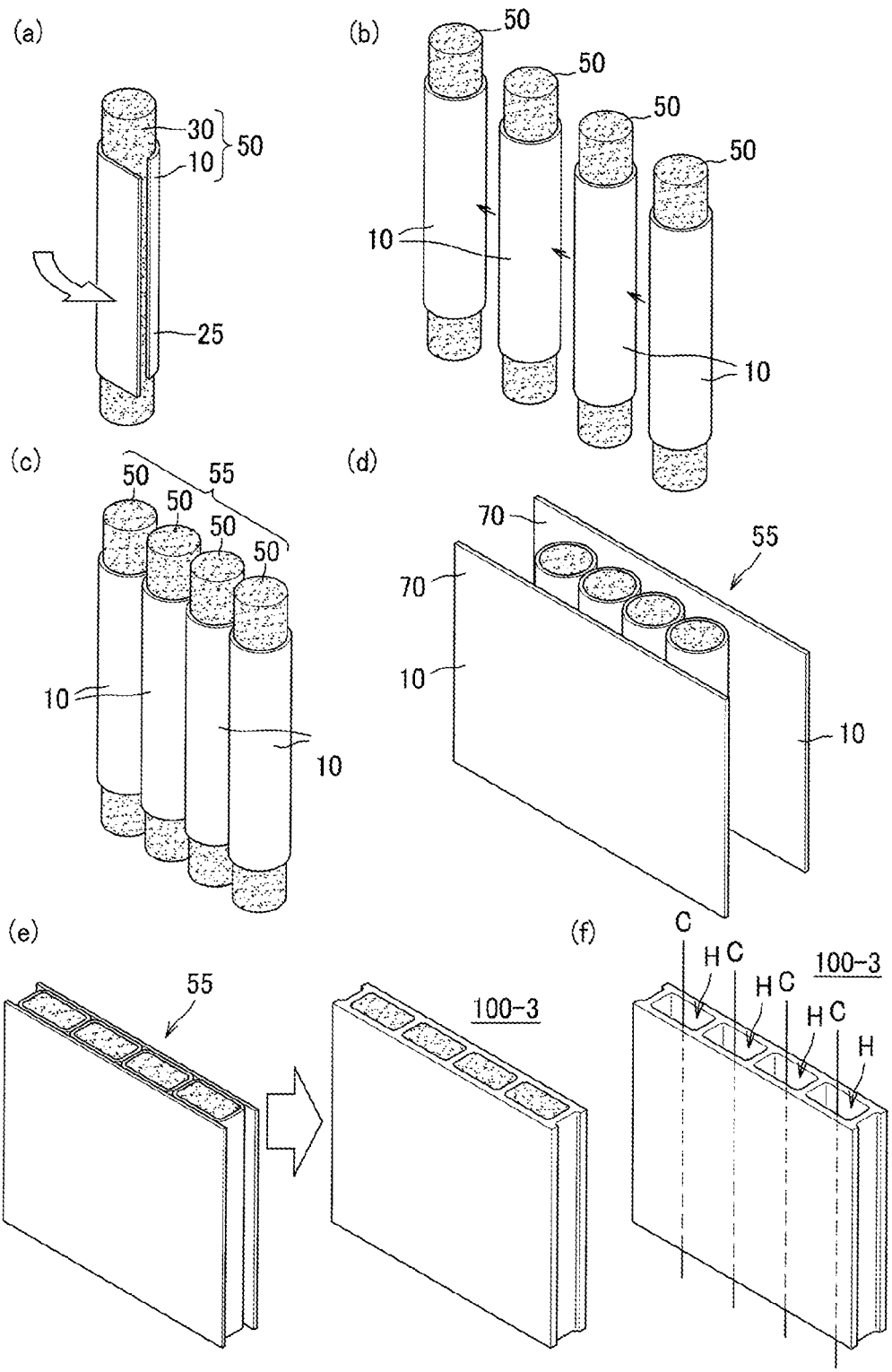
FIG. 20 is a perspective view showing a fiber-reinforced resin structure and a method of manufacturing the same according to embodiment III.

In the fiber-reinforced resin structure 100-3, the foam 30 may be inserted into a part or all of the communication holes (see FIG. 20(*e*) and the like).

Figure 21:
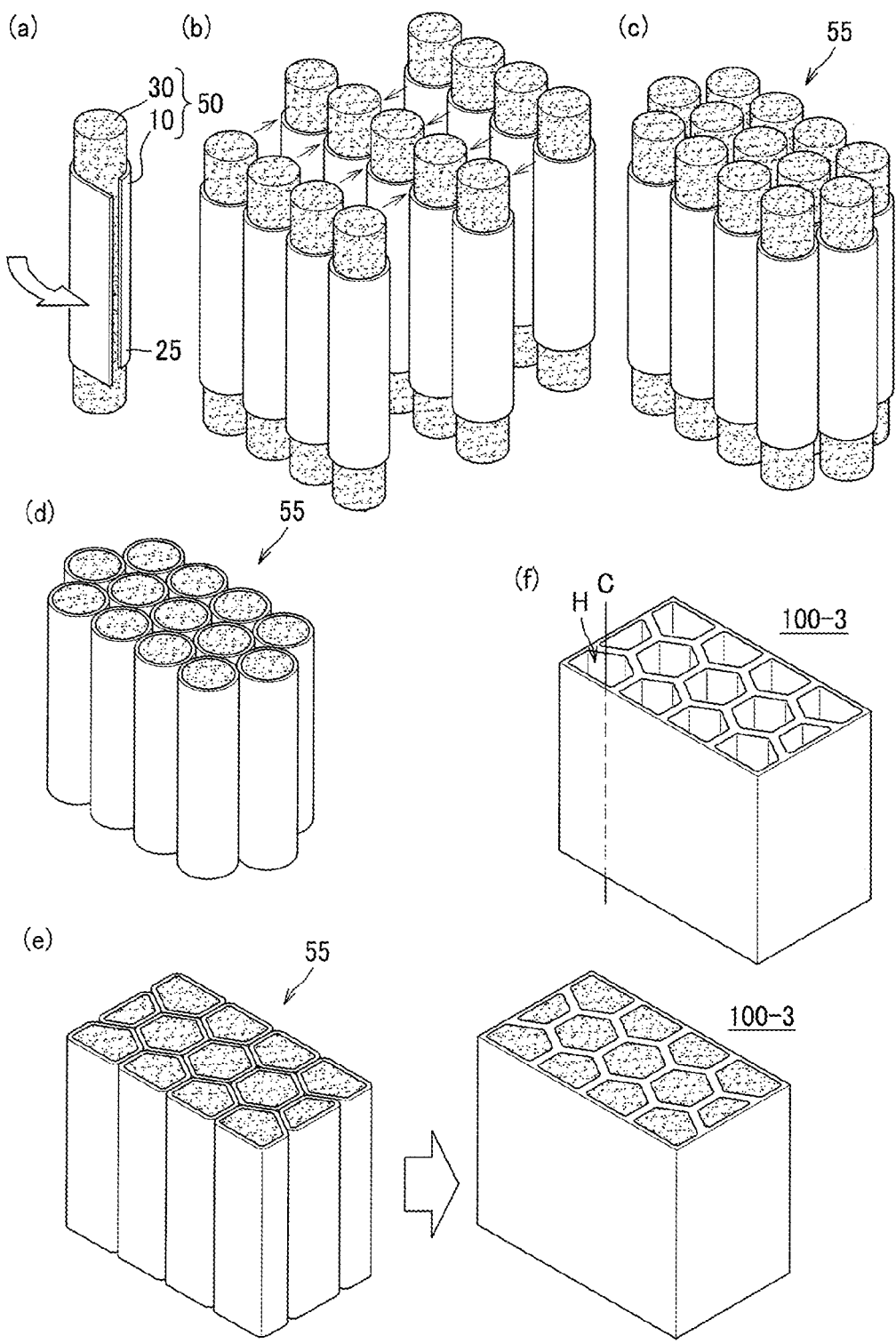
FIG. 21 is a perspective view showing a fiber-reinforced resin structure and a method of manufacturing the same according to embodiment III.

The fiber-reinforced resin structure 100-3 may be a structure as shown in FIG. 20(*c*), in which a plurality of cylindrical fiber bodies 10 are arranged and cured in a state where the fiber bodies 10 are close to each other via a resin. On the other hand, as shown in FIG. 21(*f*), the fiber-reinforced resin structure 100-3 may be a structure in which a plurality of polygonal cylindrical fiber bodies 10 are arranged and cured in a state in which the fiber bodies 10 are close to each other via a resin. The fiber-reinforced resin structure 100-3 may be obtained by combining the cylindrical fiber body 10 and the polygonal cylindrical fiber body 10.

According to another expression, the fiber-reinforced resin structure 100-3 according to the embodiment III is a fiber-reinforced resin structure including at least a fiber body 10 and a resin 20 impregnated in the fiber body 10, and the fiber body 10 includes at least a first cylindrical fiber body 10 and a second cylindrical fiber body 10 which are polygonal cylindrical fiber bodies, and a plane portion constituting an outer surface of the first cylindrical fiber body and a plane portion constituting an outer surface of the second cylindrical fiber body are in contact with or close to each other.

From this viewpoint, the fiber-reinforced resin structure 100-3 includes a plurality of polygonal cylindrical fiber bodies 10. The plurality of fiber bodies 10 are regularly arranged so that the side surfaces of the plurality of fiber bodies 10 are in contact with or close to each other.

The number of polygonal cylindrical fiber bodies 10 included in the fiber-reinforced resin structure 100-3 is not particularly limited, and may be two or more.

In the fiber-reinforced resin structure 100-3, the foam 30 may be inserted into all the cylinders of each cylindrical fiber body (for example, the first cylindrical fiber body and the second cylindrical fiber body), the foam 30 may not be inserted into all the cylinders, or the foam 30 may be inserted into a part of the cylinders while the foam 30 may not be inserted into the remaining cylinders.

Figure 22:
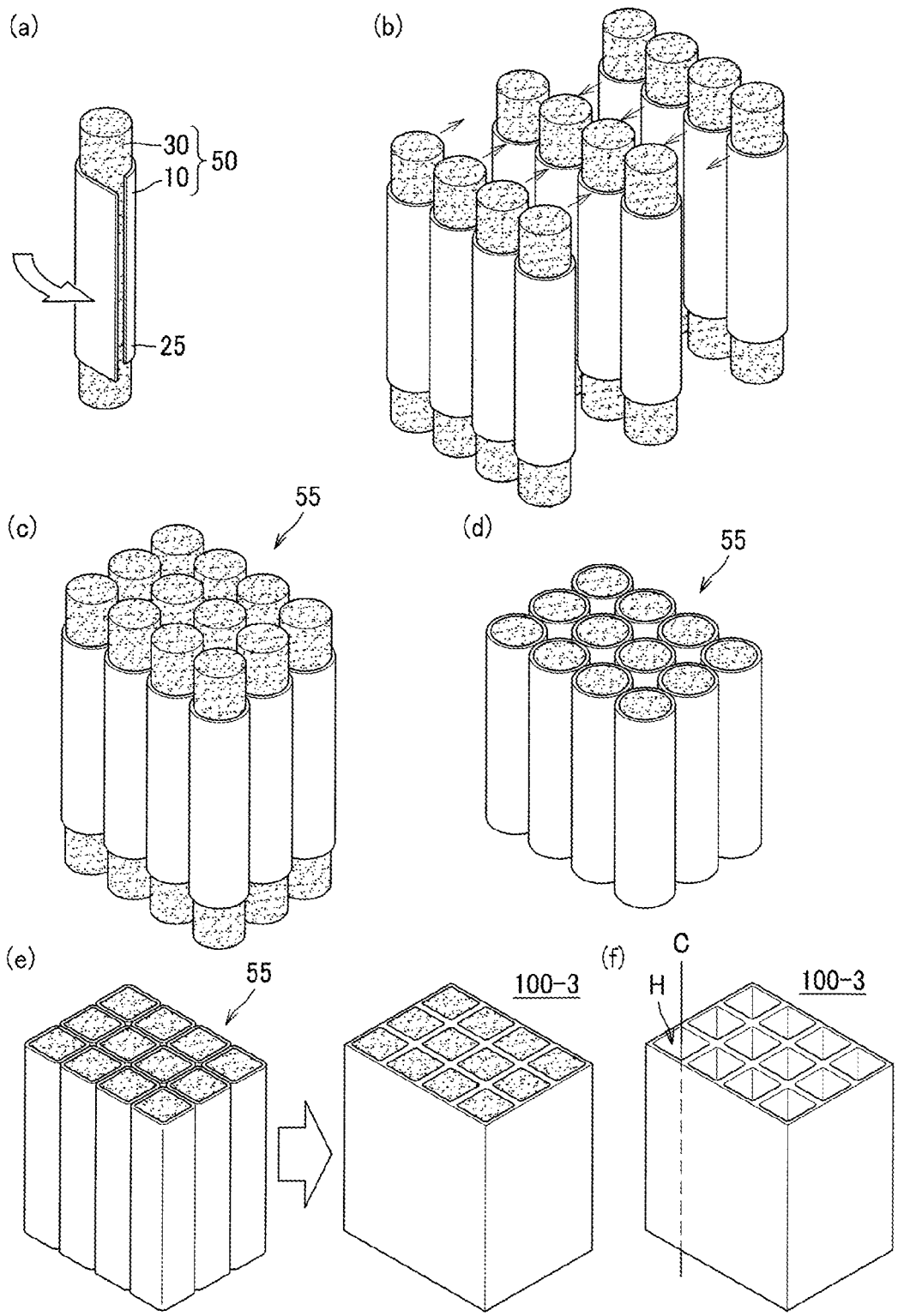
FIG. 22 is a perspective view showing a fiber-reinforced resin structure and a method of manufacturing the same according to embodiment III.
Figure 23:
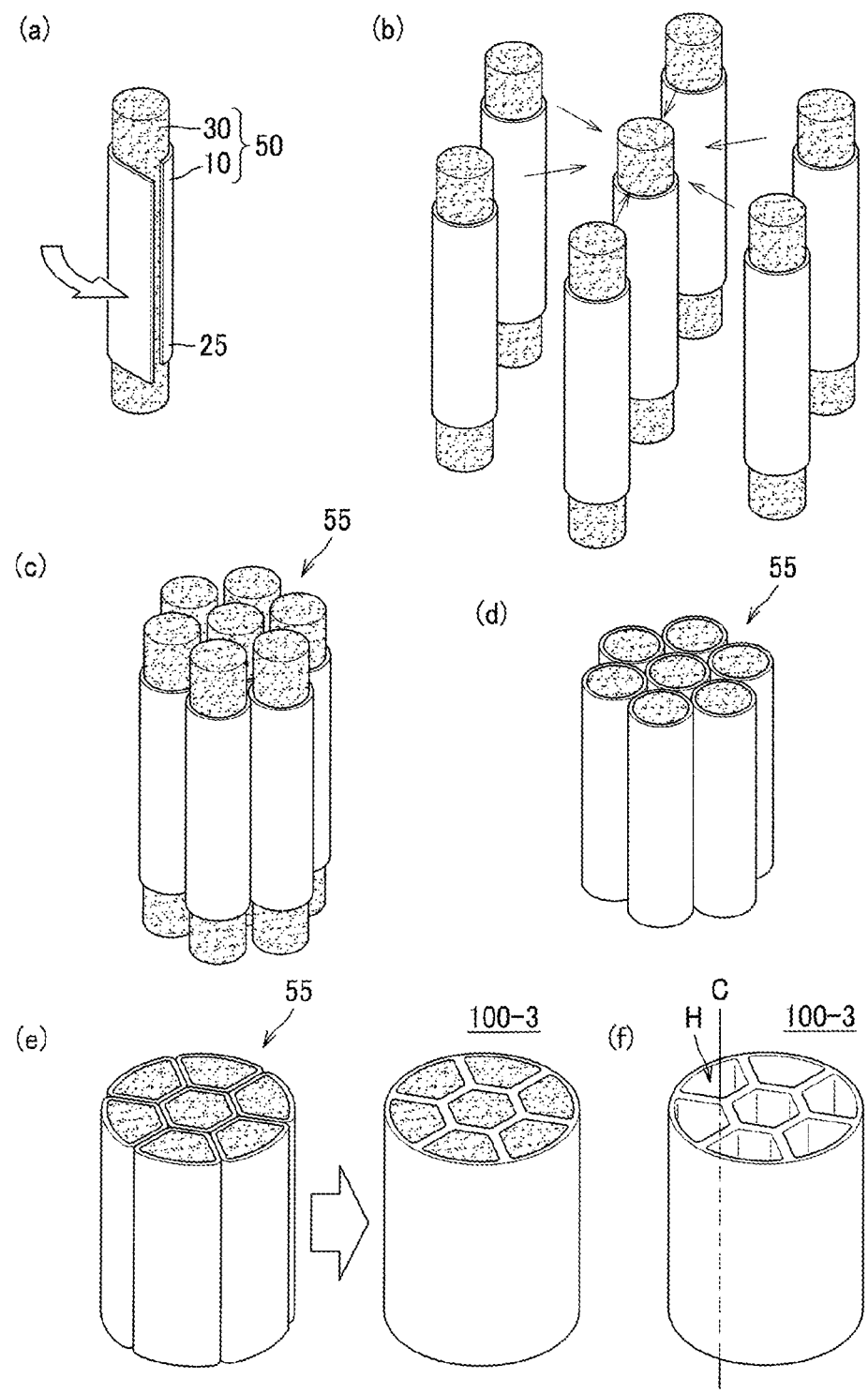
FIG. 23 is a perspective view showing a fiber-reinforced resin structure and a method of manufacturing the same according to embodiment III.

Examples of the method of arranging the communication holes H (or the fiber bodies 10) include a method of arranging the plurality of communication holes H (or the plurality of fiber bodies 10) in a single layer as shown in FIG. 20, a method of arranging a layer in which the plurality of communication holes H (or the plurality of fiber bodies 10) are arranged in a honeycomb shape in a plurality of stages as shown in FIG. 21, a method of arranging a layer in which the plurality of communication holes H (or the plurality of fiber bodies 10) are arranged in a lattice shape in a plurality of stages as shown in FIG. 22, and a method of arranging the plurality of communication holes H (or the plurality of fiber bodies 10) in a circular shape as shown in FIG. 23.

As shown in FIG. 24, the fiber-reinforced resin structure 100-3 may have a plurality of layers in which a plurality of communication holes H (or a plurality of fiber bodies 10) are arranged, and may be arranged such that the direction of the hole axis C of the communication hole H (or the cylinder axis direction of the fiber body 10) is different between one layer and another layer.

The wall portion defining the communication hole H (or the cylindrical shape of the fiber body 10) is not particularly limited, and may be a rectangular tube shape, a pentagonal tube shape or more, or a combination of a plurality of shapes (for example, a combination of a pentagonal tube shape and a hexagonal tube shape as shown in FIG. 21).

Figure 25:
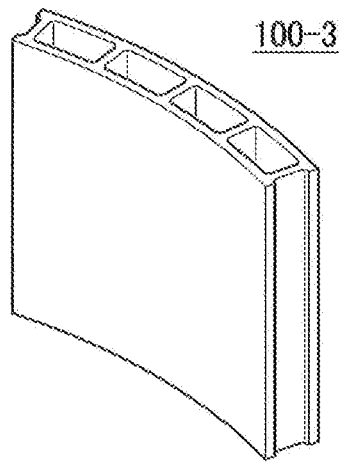
FIG. 25 is a perspective view showing a fiber-reinforced resin structure and a method of manufacturing the same according to embodiment III.
Figure 25:
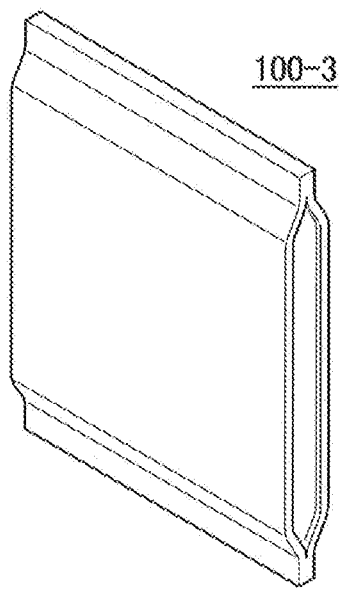

In the fiber-reinforced resin structure 100-3, as shown in FIG. 25(1), a plurality of communication holes H (or a plurality of fiber bodies 10) may be arranged in parallel with each other so that the hole axes are arranged perpendicular to a certain curve.

In the fiber-reinforced resin structure 100-3, as shown in FIG. 25(2), the end portion (opening surface) of the communication hole H may be sealed (or may be crushed). For example, the fiber-reinforced resin structure 100-3 may have a shape in which the upper end portion and/or the lower end portion are crushed. The end portion crushed in this manner can be used as a surface on which a fixing member such as a screw is installed.

In the fiber-reinforced resin structure 100-3, only one end portion (opening surface) of the communication hole H may be sealed (or crushed), and both end portions (opening surfaces) of the communication hole H may be sealed (or crushed).

In this case, the fiber-reinforced resin structure 100-3 may include the foam 30 or may not include the foam 30.

Similarly, the fiber-reinforced resin structure described in each embodiment may have a structure in which the end of the communication hole H is sealed (or crushed).

Figure 26:
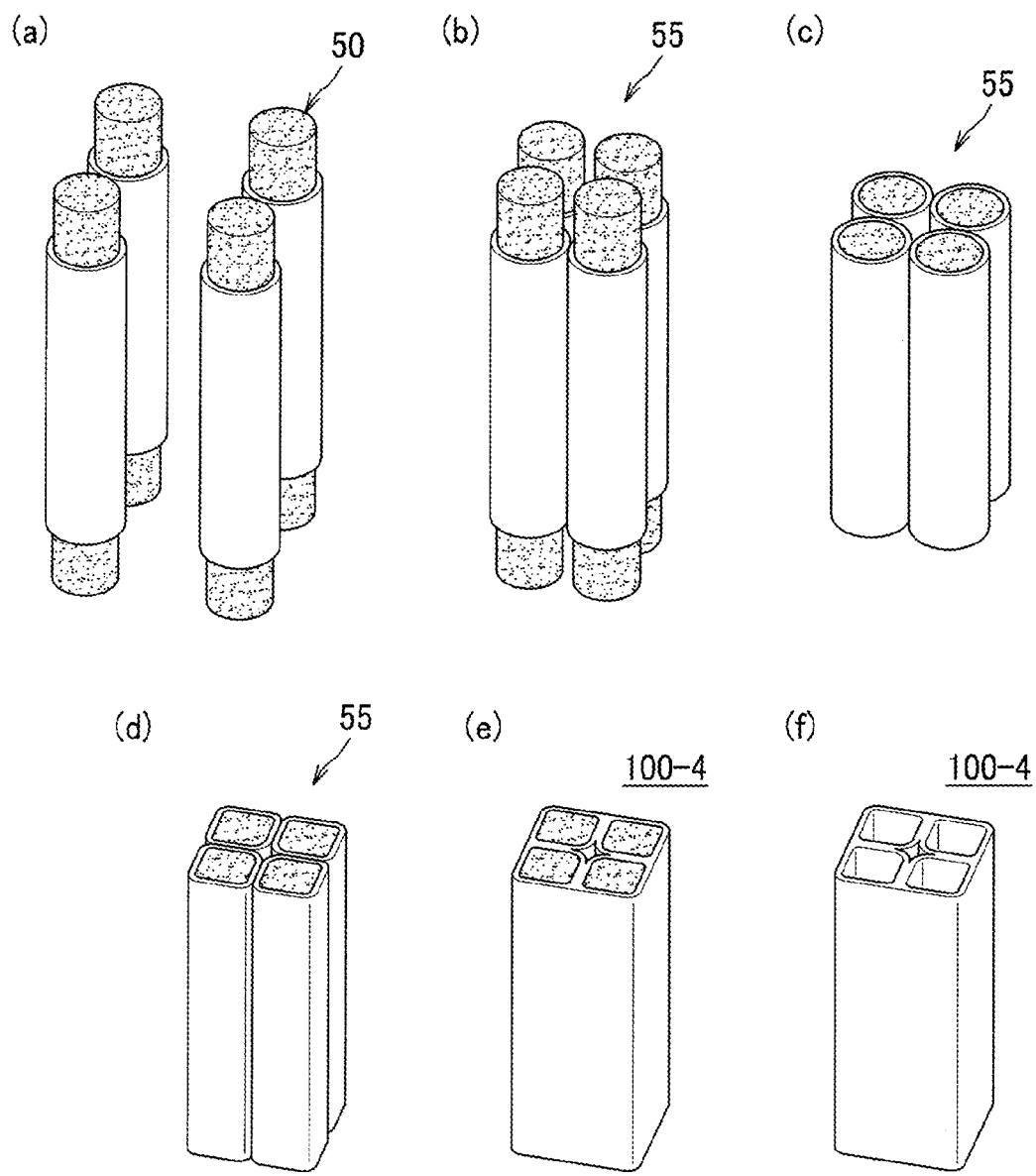
FIG. 26 is a perspective view showing a fiber-reinforced resin structure and a method of manufacturing the same according to embodiment III.

As shown in FIGS. 26(*f*) and 31(*f*), the fiber-reinforced resin structure 100-3 may have holes in the places where the plurality of communication holes H (or the plurality of fiber bodies 10) are close to each other.

Figure 27:
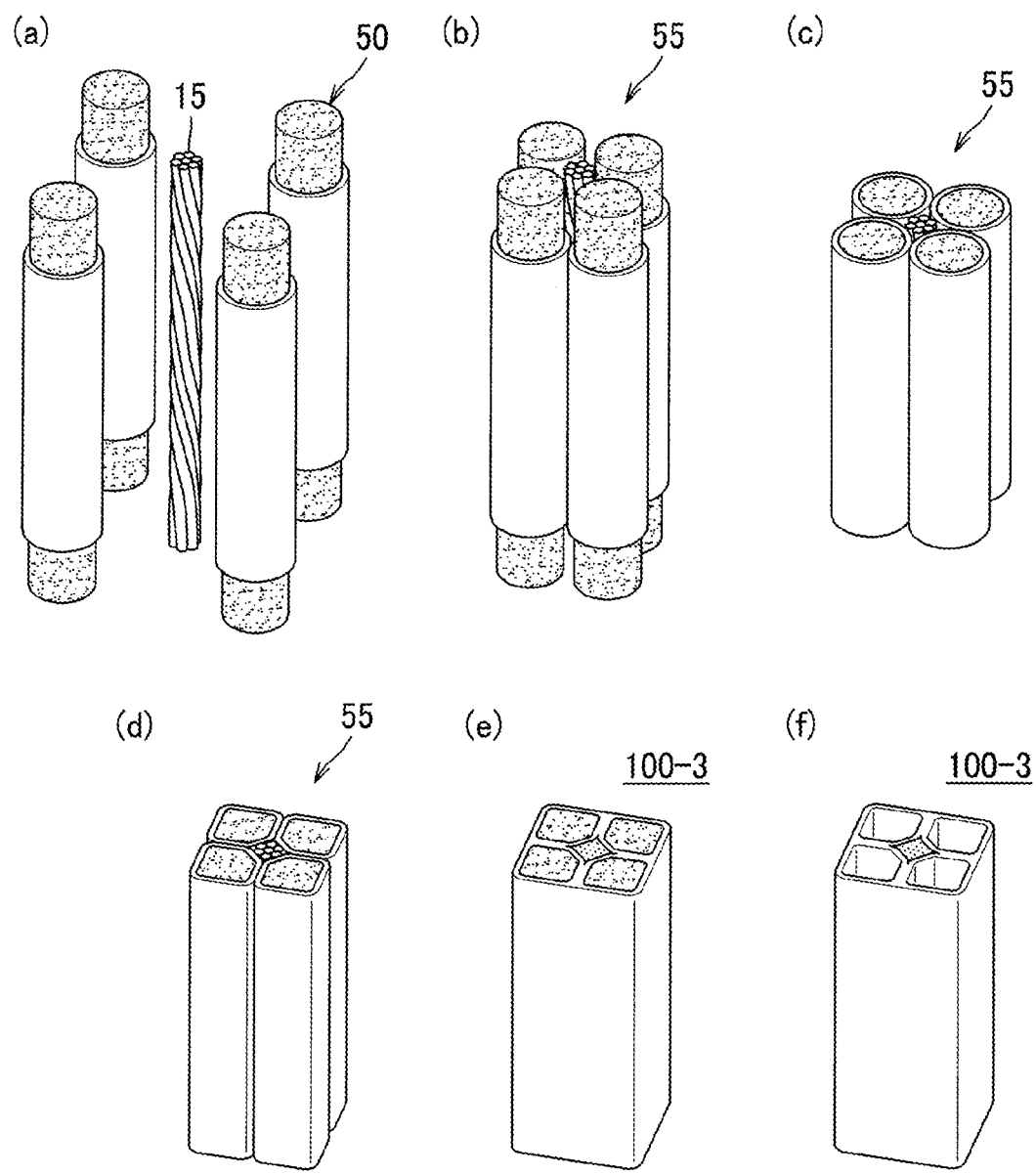
FIG. 27 is a perspective view showing a fiber-reinforced resin structure and a method of manufacturing the same according to embodiment III.

The fiber-reinforced resin structure 100-3 may include a reinforcing member 15 as shown in FIG. 27(*f*). The reinforcing member 15 is impregnated with a resin (the resin 20) and integrated as a fiber reinforced resin structure 100-3. The reinforcing member 15 reinforces the fiber body 10 and improves the strength of the fiber reinforced resin structure 100-3.

The reinforcing member 15 may be disposed at a position where the fiber body 10 may be insufficient to cause insufficient strength. For example, the reinforcing member 15 may be arranged at a position where the plurality of communication holes H (or the plurality of fiber bodies 10) are close to each other or at an end of the fiber reinforced resin structure 100-3 as shown in FIG. 27.

The material of the reinforcing member 15 is not particularly limited, but may be the same as the material of the fibers constituting the fiber body 10. In other words, the reinforcing member 15 may be formed of fibers. The shape of the reinforcing member 15 is not limited to the above-described shape, and may be an appropriate shape. For example, a unidirectional reinforcing material (a UD material) or a material obtained by twisting the UD material may be used as the reinforcing member 15. The content of the reinforcing member 15 can be appropriately used in accordance with the strength of the desired fiber-reinforced resin structure 100-3.

Figure 28:
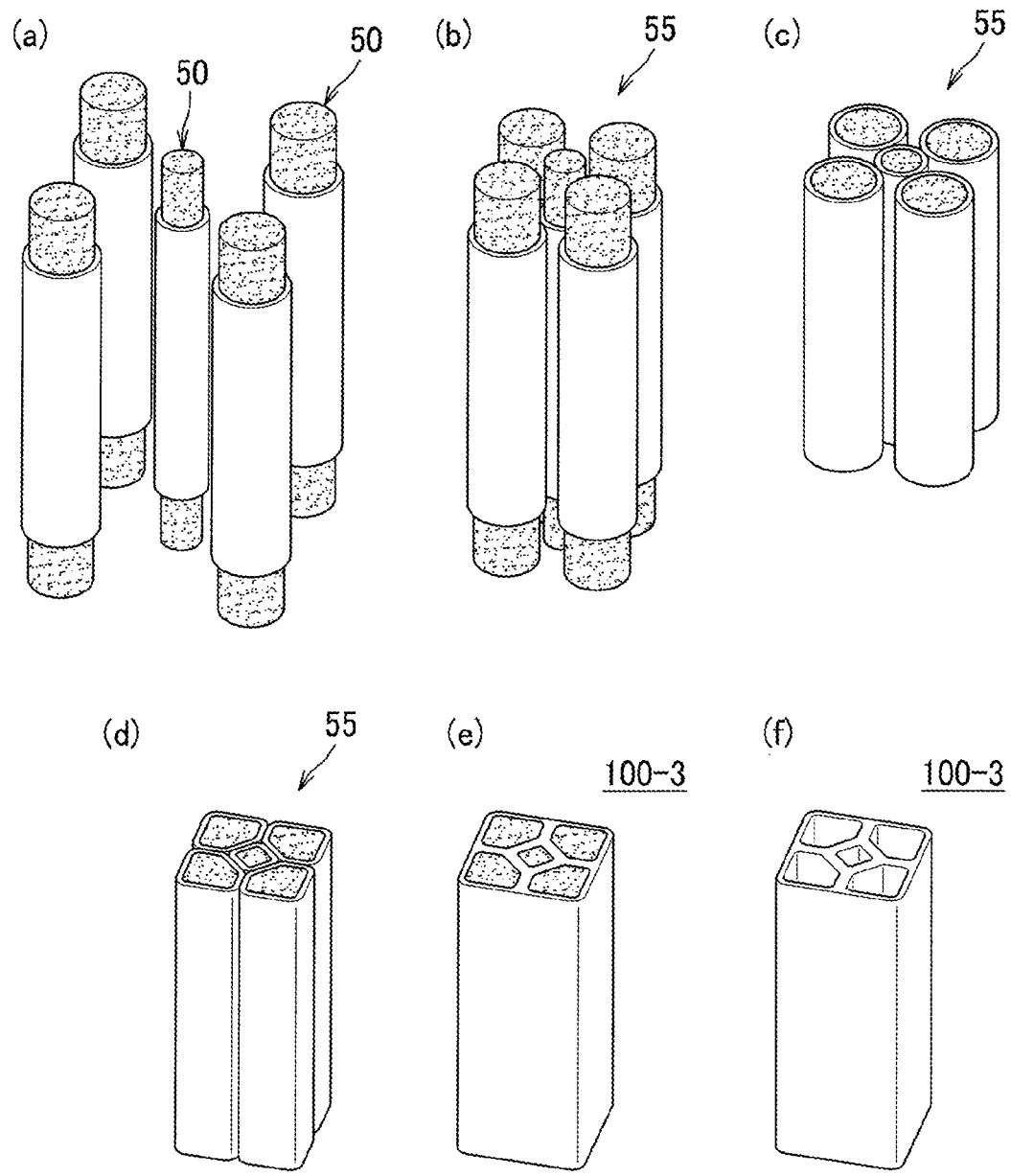
FIG. 28 is a perspective view showing a fiber-reinforced resin structure and a method of manufacturing the same according to embodiment III.

In the fiber-reinforced resin structure 100-3, as shown in FIG. 28(*f*), the hole diameters of the plurality of communication holes H (or the cylinder inner diameters of the plurality of fiber bodies 10) may be different from each other.

Figure 29:
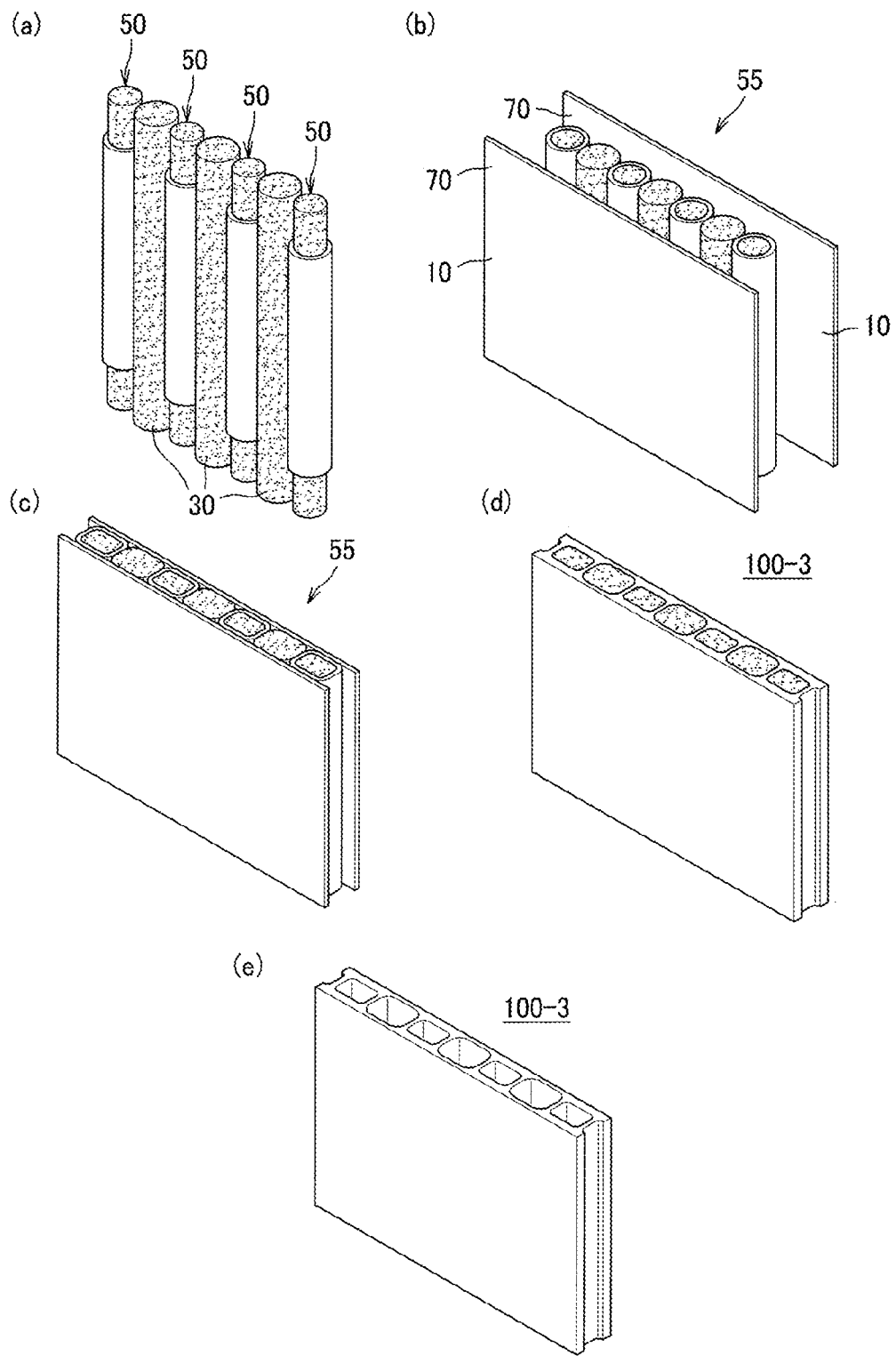
FIG. 29 is a perspective view showing a fiber-reinforced resin structure and a method of manufacturing the same according to embodiment III.

In the fiber-reinforced resin structure 100-3, as shown in FIGS. 29(*e*) and 30(*e*), the thickness of the wall portion surrounding the periphery of the communication hole H (or the thickness of the cylindrical fiber body 10 and the resin 20), in particular, the fiber thickness of the fiber body 10 (or the cylindrical fiber body 10) may be different for each communication hole H. Further, in this case, as shown in FIGS. 29(*e*) and 30(*e*), the hole diameter of the plurality of communication holes H (or the cylinder inner diameter of the plurality of fiber bodies 10) may be different for each communication hole H.

The structure according to the fiber-reinforced resin structure 100-3 may be expressed as a structure in which the structure according to the fiber-reinforced resin structure 100-1 and/or the structure according to the modification of the fiber-reinforced resin structure 100-1 are regularly arranged and integrated via a resin.

<<<Method of Manufacturing>>>

The method of manufacturing the fiber-reinforced resin structure 100-3 is, for example, a method including a preparation step of preparing an aggregate 55 having at least a first foam 30 in a columnar shape, a fiber body 10 covering at least a part of a side surface portion of the first foam 30, a second foam 30 in a columnar shape adjacent to the first foam 30 via the fiber body 10, the aggregate 55 being impregnated with an uncured thermosetting resin (uncured resin 25) in the fiber body 10, and a curing step of thermally curing the thermosetting resin (uncured resin 25) included in the aggregate 55.

The curing step and the like are as described above. As shown in FIG. 20(*e*), by performing the curing step, the plurality of fiber bodies 10 and the like included in the aggregate 55 are integrated via the thermosetting resin.

As described above, the cooling step, the cutting step, and the removing step may be performed.

Further, the method for manufacturing the fiber-reinforced resin structure 100-3 may include a sealing step (crushing step) of crushing the end portion (opening surface) of the aggregate 55 before the curing step.

When the sealing step (crushing step) is performed, the length of the fiber body 10 may be set to be longer than the length of the foam body 30 (the fiber body 10 may protrude from the foam body 30).

The sealing step (crushing step) may be performed on only one end portion (opening surface) of the assembly 55, or may be performed on both end portions (opening surfaces) of the assembly 55.

When the sealing step (crushing step) is performed, the removing step may be performed or the removing step may not be performed. The sealing step (crushing step) is preferably performed in a state where the assembly 55 includes the foam 30.

The sealing step (crushing step) may be performed so that the end portion (opening surface) of the assembly 55 is completely closed, or may be performed in a range where the end portion of the assembly 55 has an opening.

<<Preparation Step>>

In the preparation step, an aggregate 55 is prepared which has at least a fiber body 10 covering at least a part of a side surface portion of a first foam body 30 and a columnar second foam body 30 adjacent to the first foam body 30 via the fiber body 10, and in which the fiber body 10 is impregnated with an uncured thermosetting resin (uncured resin 25).

More specifically, in the preparing step, the assembly 55 is prepared in which the plurality of stacked bodies 50 are arranged so as to be in contact with or close to each other (see FIGS. 20(*a*) to 20(*c*) and the like). According to another expression, the foam 30 included in the laminate 50 is arranged so as to be close to each other via the fiber body 10.

The number of the laminates 50 included in the aggregate 55 and the arrangement of the laminates 50 are not particularly limited, and may be adjusted according to the desired structure of the fiber-reinforced resin structure 100-3.

Examples of the aggregate 55 include a structure in which a plurality of stacked bodies 50 are arranged in a single layer as shown in FIG. 20, a structure in which a plurality of layers in which a plurality of stacked bodies 50 are arranged are arranged in a honeycomb form as shown in FIG. 21, a structure in which a plurality of layers in which a plurality of stacked bodies 50 are arranged are arranged in a lattice form as shown in FIG. 22, and a structure in which a plurality of stacked bodies 50 are arranged in a circular form as shown in FIG. 23.

As shown in FIG. 24, the assembly 55 may be one in which the plurality of laminates 50 are arranged so as to have one layer in which the plurality of laminates 50 are arranged so that the hole axes C of the communication holes H (or the plurality of fiber bodies 10) face in one direction and another layer in which the plurality of laminates 50 are arranged so that the hole axes C of the communication holes H (or the plurality of fiber bodies 10) face in another direction.

Here, as shown in FIG. 20(*d*), the assembly 55 may have a plate-like outer peripheral body 70 provided so as to be in contact with the side portion of the stacked body 50.

The outer peripheral body 70 includes, for example, fibers similar to the fibers constituting the fiber body 10 and the uncured resin 25. By using such an outer peripheral body 70, the strength of the fiber-reinforced resin structure can be improved.

The thickness and the like of the outer peripheral body 70 can be appropriately used in accordance with the strength and the like of the desired fiber reinforced resin structure 100-3.

The shape of the outer peripheral body 70 is not particularly limited, but may be, for example, a flat plate shape.

Further, the outer peripheral body 70 may be configured to go around the entire side surface of the assembly 55 by one or more turns. In the case of such a configuration, since the cured outer peripheral body 70 becomes the outer wall of the fiber-reinforced resin structure 100-3, the strength of the fiber-reinforced resin structure 100-3 is easily improved.

The outer peripheral body 70 may be provided so as to be in contact with the plurality of stacked bodies 50. When the outer peripheral body 70 comes into contact with the plurality of stacked bodies 50, the stacked bodies 50 are arranged along the outer peripheral body 70.

Other members may be present or no other members may be present between the respective stacked bodies 50. For example, as shown in FIG. 27, the assembly 55 may include a reinforcing member 15. In the fiber-reinforced resin structure 100-3, the reinforcing member 15 is integrated with the fiber body 10 and the like via the resin 20. Therefore, it is preferable that the uncured resin 25 is impregnated into the reinforcing member 15 at any timing. The uncured resin 25 contained in the stacked body 50 may be moved to the reinforcing member 15 by bringing the stacked body 50 containing the uncured resin 25 into contact with the reinforcing member 15 not containing the uncured resin 25, or the impregnation step may be performed on the aggregate 55 after forming the aggregate 55 containing the stacked body 50 and the reinforcing member 15 not containing the uncured resin 25, but the uncured resin 25 is preferably impregnated into the reinforcing member 15 in advance.

The shapes, materials, and the like of the foam 30 and the fiber body 10 may be different between one laminate 50 and another laminate 50. For example, as shown in FIG. 28, the assembly 55 may include a plurality of foams 30 (laminates 50) having different diameters.

Figure 30:
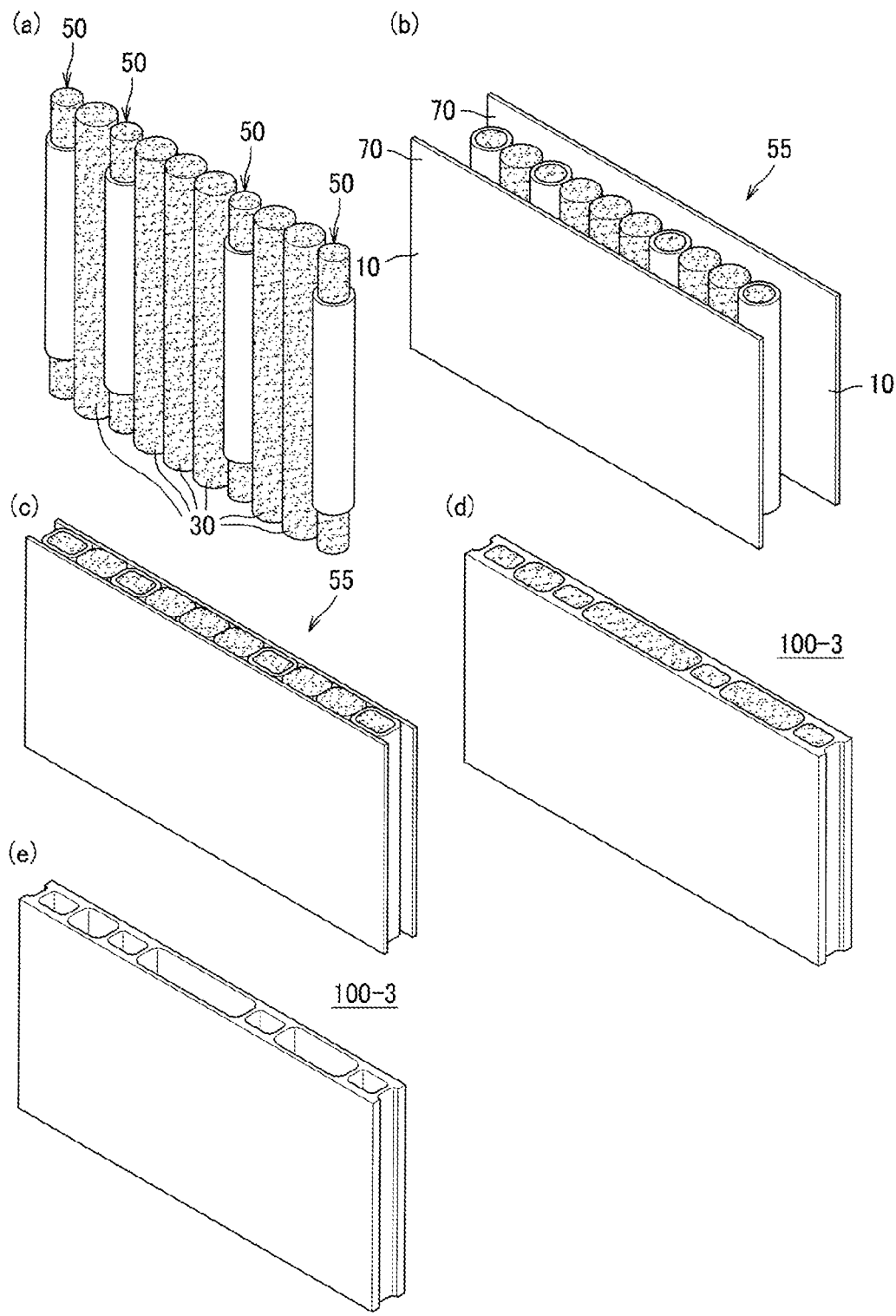
FIG. 30 is a perspective view showing a fiber-reinforced resin structure and a method of manufacturing the same according to embodiment III.
Figure 31:
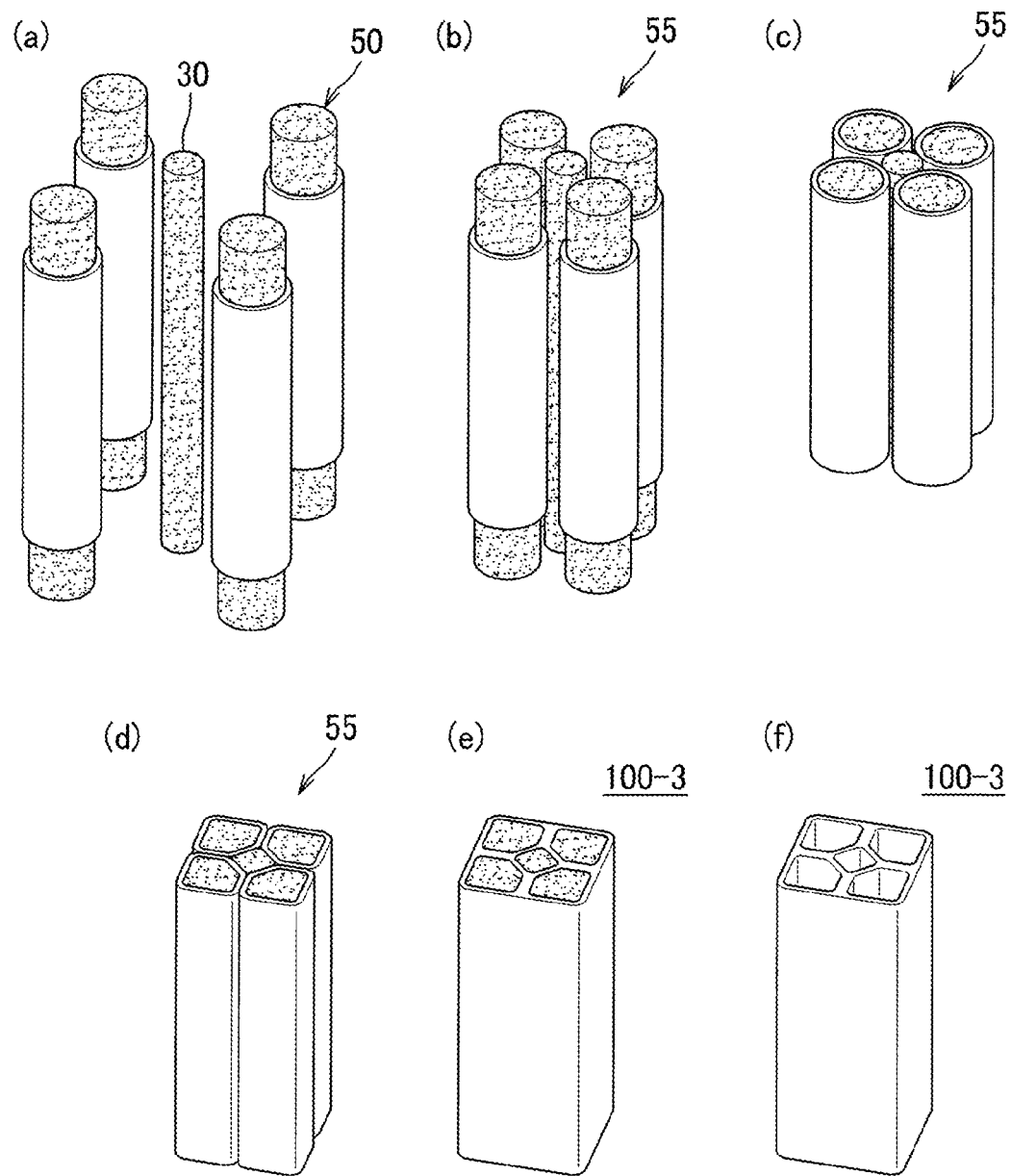
FIG. 31 is a perspective view showing a fiber-reinforced resin structure and a method of manufacturing the same according to embodiment III.

Further, as shown in FIGS. 29, 30, and 31, the assembly 55 may be formed by arranging a plurality of stacked bodies 50 and one or more foams 30 (foams 30 which are not covered with the fiber bodies 10 in advance). In the case of such a configuration, the thickness of the fiber body 10 contained in the wall portion of the obtained fiber reinforced resin structure 100-3 may vary depending on the location. In addition, in the case of such a configuration, the diameter of the communication hole H of the fiber-reinforced resin structure 100-3 may greatly differ depending on the location. Further, in the case of such a configuration, the pitch between the walls (the density/non-density of the communication holes H) can be adjusted. As described above, such a method can be employed when it is desired to adjust the necessary thickness of the wall portion (the amount of the fiber body 10), the size of the communication hole H, and the like in consideration of the design property, the strength, the cost, the weight, and the like, and further when it is desired to design a specific region to have a high strength.

<<Deformation Step>>

In the deforming step, an external force is applied to the plurality of stacked bodies 50 in a state where the plurality of stacked bodies 50 are arranged as the aggregate 55.

In addition, since the laminate 50 includes the foam 30, the axis of the laminate 50 (the column axis A of the foam 30) is not easily displaced when the deformation process is performed. Therefore, the manner of the overall arrangement of the plurality of stacked bodies 50 (in particular, the manner of the arrangement of the column axis A of the foam body 30) is kept substantially unchanged before and after the deformation process. As a result, in the fiber-reinforced resin structure 100-3 obtained, the hole axes C of the communication holes H can be made parallel to each other.

Further, since the laminate 50 includes the foam 30, in a state where the side surfaces of the laminate 50 are in contact with or close to each other or in a state where the side surface of the laminate 50 is in contact with another surface (for example, a fixed surface such as an inner surface of a predetermined mold or the outer peripheral body 70), an external force is applied to the laminate 50, whereby a compressive force and a repulsive force act on the foam 30. As a result, the side surfaces of the stacked body 50 are deformed so as to be flattened, and the stacked body 50 having a prismatic shape is formed. In the case where the fiber body 10 is provided in a cylindrical shape in the laminate 50, a fiber-reinforced resin structure can be formed such that a plane portion constituting an outer side surface of a certain cylindrical fiber body 10 and a plane portion constituting an outer side surface of another cylindrical fiber body 10 are in contact with or close to each other (that is, such plane portions are parallel to each other).

The method of applying an external force in the deforming step is not particularly limited.

The application of the external force can be performed, for example, by fitting the assembly 55 into a predetermined mold frame.

The external force may be applied by sandwiching the assembly 55 with the outer peripheral body 70. In addition, the fiber-reinforced resin structure 100-3 having the outer peripheral body 70 as an outer shell can be manufactured by performing the curing step while the assembly 55 is sandwiched by the outer peripheral body 70. When two outer peripheral bodies 70 are used to sandwich the assembly 55 from the front and rear, the stacked body 50 existing at the left end and the right end has an open side without the adjacent member (the stacked body 50 or the outer peripheral body 70). When the deforming step is performed in the presence of such open side surfaces, there is no force to press the deformation in the lateral direction of the aggregate 55, so that the end side surfaces of the aggregate 55 (the side surfaces of the laminate 50 present at the end portions) can form a curved structure along the expansion of the foam 30.

When the outer peripheral body 70 is applied to the assembly 55, the outer peripheral body 70 may be first cured, the cured outer peripheral body 70 may be brought into contact with the assembly 55, and the uncured resin included in the assembly 55 may be cured, but it is preferable that the outer peripheral body 70 including the uncured resin is brought into contact with the assembly 55, and the uncured resin included in the assembly 55 and the outer peripheral body 70 is cured simultaneously.

The application of the external force may be performed by attaching the entire assembly 55 with a string or the like.

The application of the external force is preferably carried out by packaging the entire assembly 55 or a part thereof in a flexible material such as a bag shape, sealing the assembly 55, and then sucking air in the flexible material into a reduced pressure atmosphere. In this case, the uncured resin in the fiber body 10 included in the aggregate 55 is subjected to the action of the suction force by which air is sucked and the compression force by the pressure reduction, and is closely filled into the fiber body 10. Therefore, the fiber-reinforced resin structure after curing can form a dense heavy-point structure, and defects are significantly reduced. As a result, physical characteristics such as mechanical strength of the fiber-reinforced resin structure are improved. In the thermal curing step, there are an effect of uniformly pressing the fiber body 10 against the outer peripheral body 70 by a pressure difference from atmospheric pressure and an effect of strongly pressing the fiber body 10 against the outer peripheral body 70 by further expanding the foam. The condition of the pressure reduction is not particularly limited, and may be a condition of the degree of normal execution.

When an external force is applied, the fiber-reinforced resin structure 100-3 having various structures can be obtained by adjusting the direction of application of the external force or the like.

By applying an external force to the assembly 55 from the front-back direction (or the front-back direction and the left-right direction), a fiber-reinforced resin structure 100-3 having a rectangular parallelepiped shape as a whole as shown in FIG. 20(f) and the like can be obtained.

By applying an external force to the aggregate 55 substantially uniformly from the circumferential direction of the aggregate 55, a fiber-reinforced resin structure 100-3 having a cylindrical shape as a whole as shown in FIG. 23(f) and the like can be obtained.

When an external force is applied, the shape of the surface (for example, the inner surface of the mold to be used) in contact with the aggregate 55 is changed, whereby a fiber-reinforced resin structure 100-3 can be obtained in which a plurality of communication holes H (or a plurality of fiber bodies 10) are arranged in parallel with each other so that the hole axes are arranged vertically with respect to a certain curve, as shown in FIG. 25(1).

In the deformation process, the degree of deformation of the foam body 30 and the degree of deformation of the laminate 50 can be adjusted by adjusting the external force. For example, when the external force to the assembly 55 is weakened, deformation of the stacked body 50 is suppressed, and a region (void region) in which the external force does not sufficiently contribute to the stacked body 50 can be formed. As a result, as shown in FIG. 26, the curved surface shape can be maintained at a position corresponding to the corner portion of the stacked body 50. Similarly, when a mold is used when an external force is applied, a region (non-following region) in which the deformation of the stacked body 50 does not follow the corners of the mold or the like can be formed. When it is not preferable to have such a void region or a non-following region, it is preferable to dispose the reinforcing member 15 in advance at a position corresponding to these regions.

In the method shown in FIG. 20, a laminate 50 including a foam 30, a fiber body 10, and an uncured resin 25 is prepared (FIG. 20(a)), a plurality of laminates 50 are arranged so that the fiber body 10 is in contact with or close to each other (FIG. 20(b)), a plurality of laminates 50 arranged by two outer peripheral bodies 70 are sandwiched to form an aggregate 55 (FIG. 20(c)), an external force is applied to the aggregate 55 to compress the whole of the aggregate 55 to deform a cross-sectional shape perpendicular to the axis of the laminate 50 (foam 30), and then the aggregate 55 is cured to form a fiber-reinforced resin structure 100-3 (FIG. 20(e)), and the foam 30 is removed from the fiber-reinforced resin structure 100-3 (FIG. 20(f)).

In the method shown in FIGS. 21 and 22, a laminate 50 including a foam 30, a fiber body 10, and an uncured resin 25 is prepared (FIGS. 21(a) and 22(a)), a plurality of laminates 50 are arranged in one row so that the fiber bodies 10 are in contact with or close to each other, and the plurality of laminates 50 are arranged in a plurality of rows to form an aggregate 55 (FIGS. 21(b) to 21(d) and FIGS. 22(b) to 22(d)), and an external force is applied to the aggregate 55 to compress the whole of the aggregate 55 to deform the cross-sectional shape perpendicular to the axis of the laminate 50 (foam 30), and then the aggregate 55 is cured, thereby forming a fiber-reinforced resin structure 100-3 (FIGS. 21(e) and 22(e)), and the foam 30 is removed from the fiber-reinforced resin structure 100-3 (FIGS. 21(f) and 22(f)).

In the method shown in FIG. 23, a laminate 50 including a foam 30, a fiber body 10, and an uncured resin 25 is prepared (FIG. 23(a)), the laminates 50 are arranged so as to surround the periphery of the laminate 50 with a plurality of laminates 50 and so that the fiber bodies 10 are in contact with or close to each other to form an aggregate 55 (FIGS. 23(b)B to 23(d)), an external force is applied to the aggregate 55 to compress the whole of the aggregate 55 to deform a cross-sectional shape perpendicular to the axis of the laminate 50 (foam 30), and then the aggregate 55 is cured to form a fiber-reinforced resin structure 100-3 (FIG. 23(e)), and the foam 30 is removed from the fiber-reinforced resin structure 100-3 (FIG. 23(f)).

In the method shown in FIG. 24, a laminate 50 including a foam 30, a fiber body 10, and an uncured resin 25 is prepared (FIG. 24(a)), a plurality of laminates 50 are arranged in one row so that the fiber bodies 10 are in contact with or close to each other, the rows of the plurality of laminates 50 are overlapped so that the orientations of the laminates 50 are different from each other to form an aggregate 55 (FIGS. 24(b) to 24(d)), an external force is applied to the aggregate 55 to compress the whole of the aggregate 55 to deform the cross-sectional shape perpendicular to the axis of the laminate 50 (foam 30), and then the aggregate 55 is cured to form a fiber-reinforced resin structure 100-3 (FIG. 24(e)), and the foam 30 is removed from the fiber-reinforced resin structure 100-3 (FIG. 24(f)).

In the method shown in FIG. 26, a laminate 50 including a foam 30, a fiber body 10, and an uncured resin 25 is prepared (FIG. 26(a)), a plurality of laminates 50 are arranged so that the fiber bodies 10 are in contact with or close to each other (FIGS. 26(b) to 26(c)), an external force is applied to an assembly 55, the whole is compressed until the portions where the end portions of three or more laminates 50 are assembled are not in close contact with each other (FIG. 26(d)), a cross-sectional shape perpendicular to the axis of the laminate 50 (foam 30) is deformed, and then the laminate 50 is cured to form a fiber-reinforced resin structure 100-3 (FIG. 26(e)), and the foam 30 is removed from the fiber-reinforced resin structure 100-3 (FIG. 26(f)).

In the method shown in FIG. 27, the laminate 50 including the foam 30, the fiber body 10, and the uncured resin 25 and the reinforcing member 15 are prepared (FIG. 27(a)), the plurality of laminates 50 are arranged so that the fiber body 10 is in contact with or close to each other, the reinforcing member 15 is arranged between the plurality of laminates 50 (FIGS. 27(b) to 27(c)), an external force is applied to the assembly 55 to compress the entire laminate 50, the cross-sectional shape perpendicular to the axis of the laminate 50 (foam 30) is deformed (FIG. 27(d)), and then the laminate 50 is cured to form a fiber-reinforced resin structure 100-3

(FIG. 27(e)), and the foam 30 is removed from the fiber-reinforced resin structure 100-3 (FIG. 27(f)).

In the method shown in FIG. 28, a relatively large-diameter laminate 50 including a foam 30, a fiber body 10, and an uncured resin 25 and a relatively small-diameter laminate 50 including a foam 30, a fiber body 10, and an uncured resin 25 are prepared (FIG. 28(a)), a plurality of relatively large-diameter laminates 50 are arranged so as to surround the relatively small-diameter laminate 50 (FIGS. 28(b) to 28(c)), an external force is applied to the assembly 55 to compress the entire laminate 50, a cross-sectional shape perpendicular to the axis of the laminate 50 (foam 30) is deformed (FIG. 28(d)), and then the laminate 50 is cured to form a fiber-reinforced resin structure 100-3 (FIG. 28(e)), and the foam 30 is removed from the fiber-reinforced resin structure 100-3 (FIG. 28(f)).

In the method shown in FIG. 29, the laminate 50 including the foam body 30, the fiber body 10, and the uncured resin 25, and the foam body 30 on which the fiber body 10 is not disposed are prepared, the laminate bodies 50 and the foam bodies 30 are alternately disposed (FIG. 29(a)), the laminate bodies 50 and the foam bodies 30 disposed on the two outer peripheral bodies 70 are sandwiched to form an assembly 55 (FIG. 29(b)), the entire assembly 55 is compressed by applying an external force to the assembly 55 to deform the cross-sectional shape perpendicular to the axis of the laminate body 50 (foam body 30) (FIG. 29(c)), and then the assembly 55 is cured to form a fiber reinforced resin structure 100-3 (FIG. 29(d)), and the foam body 30 is removed from the fiber reinforced resin structure 100-3 (FIG. 29(e)).

In the method shown in FIG. 30, the laminate 50 including the foam body 30, the fiber body 10, and the uncured resin 25, and the foam body 30 on which the fiber body 10 is not disposed are prepared, the laminate 50 and the foam body 30 are disposed so as to be arranged side by side and the foam body 30 is continuously disposed (FIG. 30(a)), the laminate 50 and the foam body 30 disposed on the two outer peripheral bodies 70 are sandwiched to form an assembly 55 (FIG. 30(b)), an external force is applied to the assembly 55 to compress the whole of the laminate 50 (foam body 30) to deform the cross-sectional shape perpendicular to the axis of the laminate 50 (foam body 30) (FIG. 30(c)), and then the foam body 30 is cured to form a fiber reinforced resin structure 100-3 (FIG. 30(d)).

In the method shown in FIG. 31, the laminate 50 of the foam 30, the fiber body 10, and the uncured resin 25, and the foam 30 in which the fiber body 10 is not disposed are prepared (FIG. 31(a)), a plurality of laminates 50 are arranged so as to surround the foam 30 (FIGS. 31(b) to 31(c)), an external force is applied to the assembly 55 to compress the entire laminate 50 and deform the cross-sectional shape perpendicular to the axis of the laminate 50 (foam 30) (FIG. 31(d)), and then the laminate 50 is cured to form a fiber reinforced resin structure 100-3 (FIG. 31(e)), and the foam 30 is removed from the fiber reinforced resin structure 100-3 (FIG. 31(f)).

Embodiment IV

<<<Structure>>>

A fiber-reinforced resin structure 100-4 according to the embodiment IV is a fiber-reinforced resin structure including at least a fiber body 10 and a resin 20 impregnated in the fiber body 10, and at least a first communication hole H, a second communication hole H parallel to the first communication hole H, and a wall portion defining the first communication hole H and the second communication hole H, wherein a hole axis C of the first communication hole H and the second communication hole H is curved, and the wall portion includes the fiber body 10.

The first communication hole H and the second communication hole H may have a polygonal cross-sectional shape in a cross section perpendicular to the hole axis C.

The number of the communication holes H included in the fiber-reinforced resin structure 100-4 may be two or more.

The fiber-reinforced resin structure 100-4 has a plurality of communication holes H, and has a plurality of communication holes H in which the hole axis C is curved, and the communication holes H are arranged so as to be parallel to each other. As described above, the fiber-reinforced resin structure 100-1 can be used as a fiber-reinforced resin structure including the characteristic of the modification and the characteristic of the fiber-reinforced resin structure 100-3. Therefore, all the items described for the respective embodiments can be fitted to the fiber-reinforced resin structure 100-4.

According to another expression, the fiber-reinforced resin structure 100-4 according to the embodiment IV is a fiber-reinforced resin structure including at least a fiber body 10 and a resin 20 impregnated in the fiber body 10, the fiber body 10 including at least a first cylindrical fiber body 10 and a second cylindrical fiber body 10, the first cylindrical fiber body 10 having a curved polygonal cylindrical structure in which a cylinder axis B is curved and having an outer surface parallel to the cylinder axis B, the second cylindrical fiber body having a curved polygonal cylindrical structure in which the cylinder axis B is curved and having an outer surface parallel to the cylinder axis B, and the outer surface of the first cylindrical fiber body and the outer surface of the second cylindrical fiber body are in contact with or close to each other.

In yet another expression, the fiber reinforced resin structure 100-4 includes a plurality of polygonal tubular fiber bodies 10 arranged regularly and provided in contact with or in proximity to each other, and has a curved portion 60 curved in a predetermined direction and present across the plurality of fiber bodies 10.

The degree of curvature of the hole axis C of the communication hole H (or the curvature of the curved portion of the fiber body 10) can be arbitrarily designed. In addition, the degree of curvature may be the same or different in the plurality of communication holes H.

The direction in which the fiber-reinforced resin structure 100-4 is curved is not particularly limited. For example, as shown in FIG. 32(g), the fiber-reinforced resin structure 100-4 may be curved in the front direction, in other words, in a direction perpendicular to a virtual plane formed by arranging the plurality of communication holes H (or the plurality of fiber bodies 10), or as shown in FIG. 33(g), the fiber-reinforced resin structure 100-4 may be curved in the side direction, in other words, in the same direction as the direction in which the plurality of communication holes H (or the plurality of fiber bodies 10) are arranged.

Figures 2, 33:
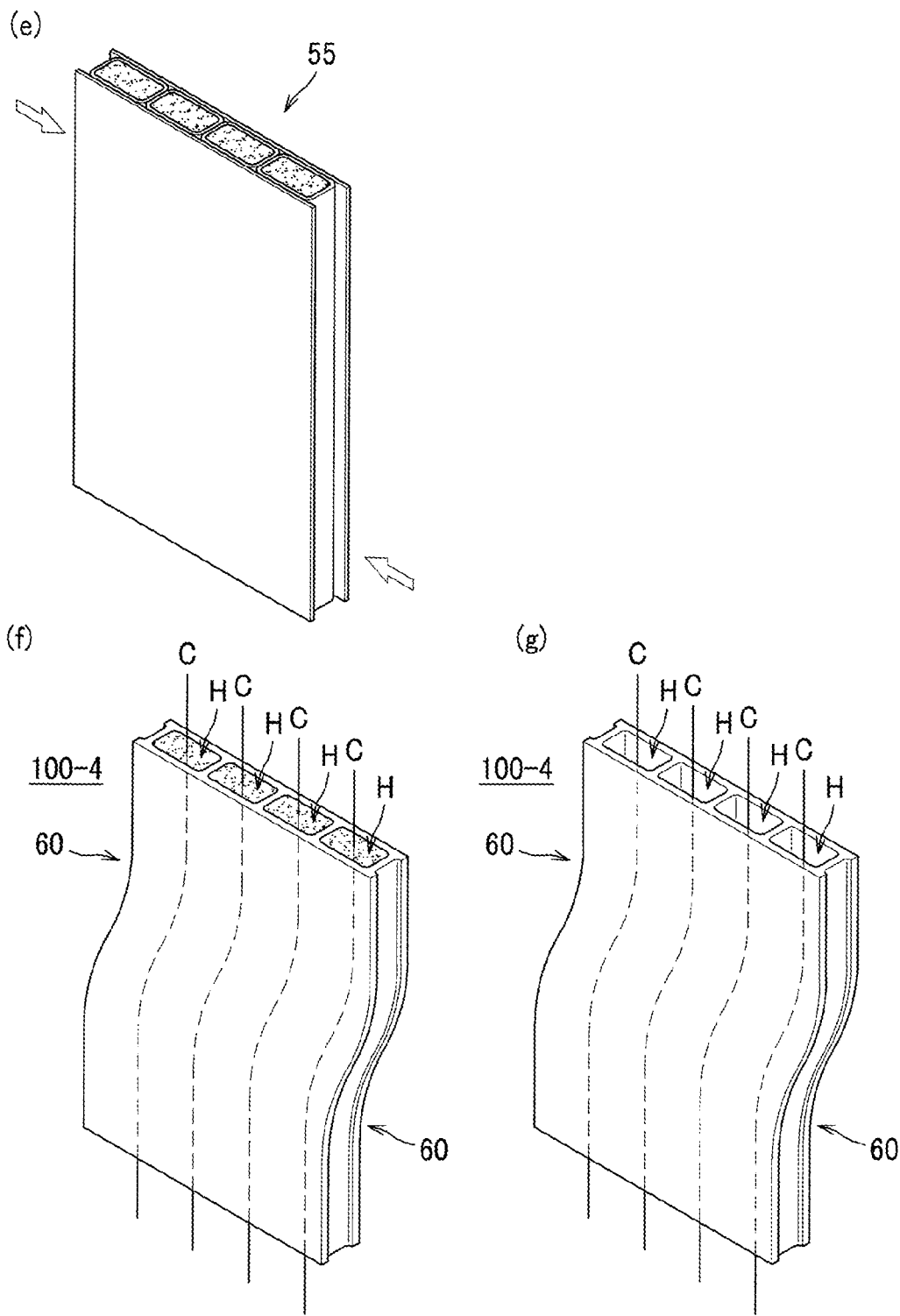

As illustrated in FIG. 33, the fiber-reinforced resin structure 100-4 may include a plurality of curved portions 60.

Figure 34:
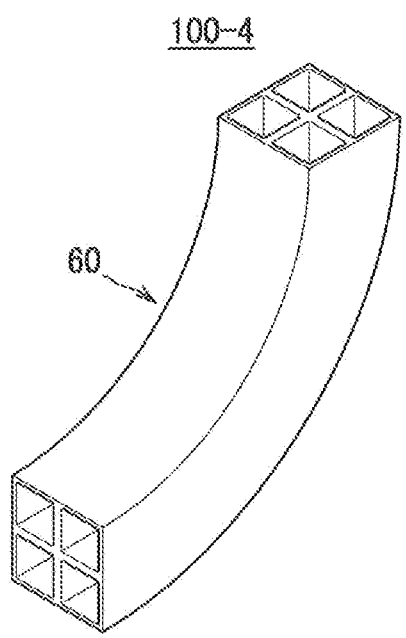
FIG. 34 is a perspective view showing a fiber-reinforced resin structure and a method of manufacturing the same according to embodiment IV.

As shown in FIG. 34, the fiber-reinforced resin structure 100-4 may have a form in which a plurality of communication holes H (or a plurality of fiber bodies 10) are arranged in a plurality of rows.

Forms in which the entire fiber-reinforced resin structure 100-4 is twisted are also within the scope of the present invention.

The structure according to the fiber-reinforced resin structure 100-4 may be expressed as having a structure in which the fiber-reinforced resin structure 100-2 and/or the structure according to the modification of the fiber-reinforced resin structure 100-2 are regularly arranged and integrated via a resin. Further, the structure according to the fiber-reinforced resin structure 100-4 can be expressed as a structure in which the structure according to the fiber-reinforced resin structure 100-3 is curved in a predetermined direction as a whole while the cross-sectional shape along the axis is maintained.

<<<Method of Manufacturing>>>

The method of manufacturing the fiber-reinforced resin structure 100-4 is, for example, a method including a preparation step of preparing an assembly 55 having a first foam body 30 in a columnar shape, a fiber body 10 covering at least a part of a side surface portion of the first foam body 30, and a second foam body 30 in a columnar shape adjacent to the first foam body 30 via the fiber body 10, the assembly 55 being impregnated with a thermosetting resin (uncured resin 25) in an uncured state in the fiber body 10, a deformation step of applying an external force to the assembly 55 and deforming a cross-sectional shape of the first foam body 30 and the second foam body 30, a bending step of bending the assembly 55 so that a column axis A of the foam body 30 is bent, and a curing step of thermally curing the thermosetting resin (the uncured resin 25) included in the assembly 55.

The method of manufacturing the fiber-reinforced resin structure 100-4 may be a method of not performing the deforming step and performing the bending step on the aggregate 55 as shown in FIG. 20(c). That is, the method of manufacturing the fiber-reinforced resin structure 100-4 preferably further includes a deforming step of applying an external force to the aggregate 55 to deform the cross-sectional shapes of the first foam 30 and the second foam 30.

The preparation step can be performed in the same manner as the method of manufacturing the fiber-reinforced resin structure 100-3.

Regarding the bending step, the above-described contents can be referred to except that the object to be bent is changed from the stacked body 50 to the assembly 55. That is, in the bending step, an external force is applied to the plurality of stacked bodies 50 so that the column axes A of the plurality of foams 30 included in the assembly 55 are bent in a state where the plurality of stacked bodies 50 are arranged as the assembly 55. As a method of applying the external force, as described above, the assembly 55 can be fitted into the mold.

Regarding the modification step, the above-described contents can be referred to. That is, in the deforming step, an external force is applied to the plurality of stacked bodies 50 in a state where the plurality of stacked bodies 50 are arranged as the aggregate 55, and the cross-sectional shape of the plurality of foam bodies 30 is deformed. As a method of applying the external force, as described above, the assembly 55 can be fitted into the mold.

As described above, the deforming step and the bending step may be performed simultaneously or separately.

The curing step is as described above. As shown in FIG. 32(f), by performing the curing step, the plurality of fiber bodies 10 and the like included in the aggregate 55 are integrated via the thermosetting resin.

As described above, the cooling step, the cutting step, and the removing step may be performed.

Figures 2, 32:
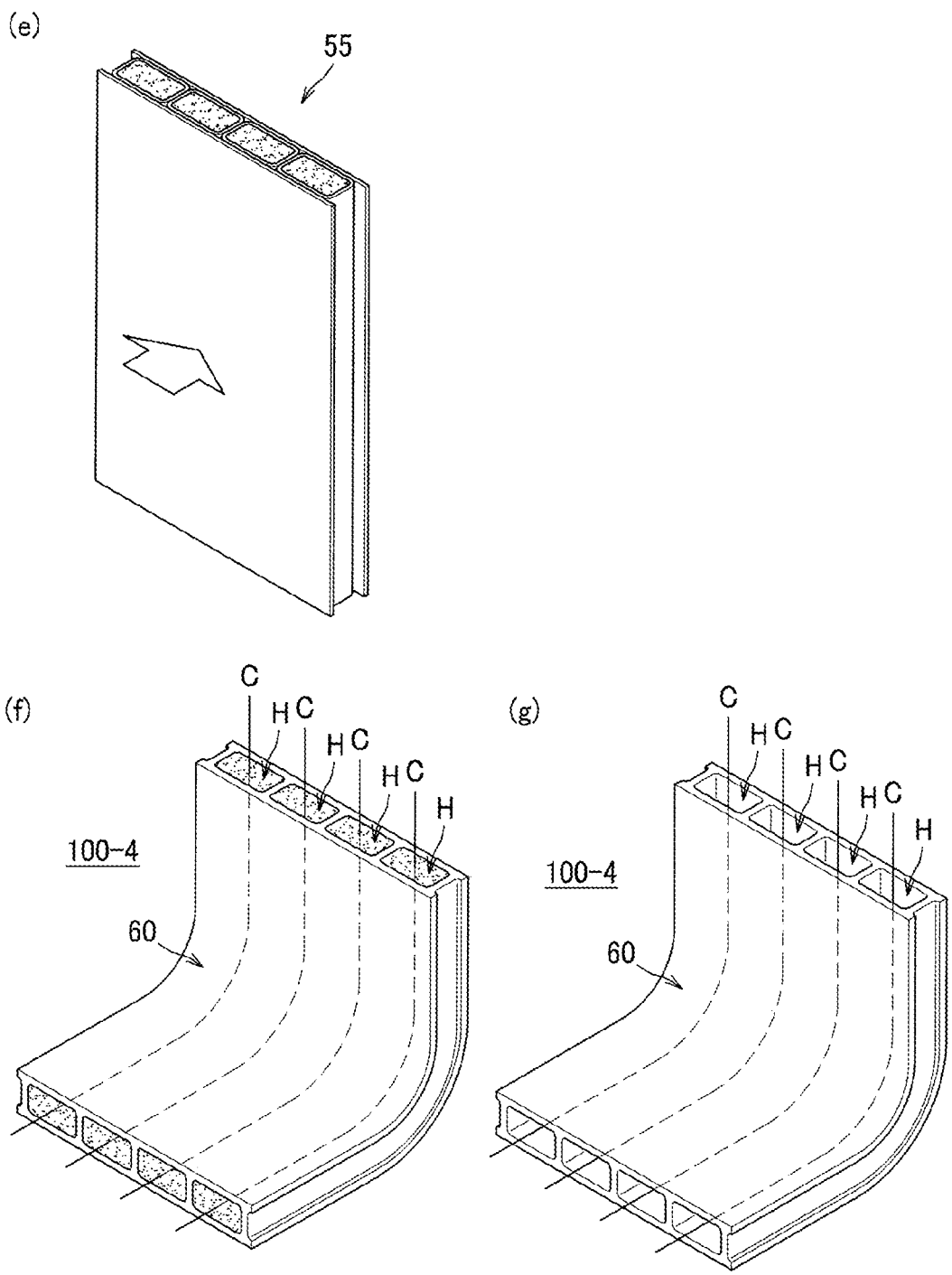

In the method shown in FIGS. 32 and 33, a laminate 50 including a foam 30, a fiber body 10, and an uncured resin 25 is prepared (FIGS. 32(a) and 33(a)), a plurality of laminates 50 are arranged such that the fiber bodies 10 are in contact with or close to each other, and a plurality of laminates 50 arranged by two outer peripheral bodies 70 are sandwiched to form an aggregate 55 (FIGS. 32(b) to 32(d) and FIGS. 33(b) to 33(d)), an external force is applied to bend the axis of the laminate 50 (foam 30) from the side surface portion of the aggregate 55 (FIG. 32(e), FIG. 33(e)), and then the aggregate 55 is cured to form a fiber-reinforced resin structure 100-4 having a bent portion 60 (the hole axis C of the communication hole H is bent) (FIG. 32(f), FIG. 33(f), and the foam 30 is removed from the fiber-reinforced resin structure 100-4 (FIG. 32(g), FIG. 33(g)).

In the method shown in FIG. 34, although not shown in detail, a laminate 50 including a foam 30, a fiber body 10, and an uncured resin 25 is prepared, a plurality of laminates 50 are arranged in one row so that the fiber bodies 10 are in contact with or close to each other, the plurality of laminates 50 are arranged in a plurality of rows to form an aggregate 55, an external force is applied to the aggregate 55 to compress the whole of the aggregate 55 to deform a cross-sectional shape perpendicular to the axis of the laminate 50 (the foam 30), an external force is applied to bend the axis of the laminate 50 (the foam 30) from the side surface portion of the aggregate 55, and then curing is performed, thereby forming a fiber-reinforced resin structure 100-4 having a bent portion 60 (the hole axis C of the communication hole H is bent), and the foam 30 is removed from the fiber-reinforced resin structure 100-4.

In each embodiment, since it can be considered that the column axis A, the cylinder axis B, and the hole axis C are located at substantially the same position, the column axis A, the cylinder axis B, and the hole axis C can be read and described.

Next, modifications of the above-described embodiments will be described with reference to FIGS. 35 to 45.

In describing the modification of the fiber-reinforced resin structure shown in FIGS. 35 to 45, the same reference numerals are given to the same components as described above, and the description thereof will be omitted or simplified. The fiber-reinforced resin structure described in various modifications hereinafter includes a structure manufactured in the same manner as any one of the manufacturing methods described in the above-described embodiment. For this reason, the manufacturing method of the above-described embodiment is appropriately cited.

First, modifications of the fiber reinforced resin structure shown in FIGS. 35 to 40 will be described.

In the following description, the fiber reinforced resin structure shown in FIGS. 35(a), 36(a), 37(a), 38(a), and 39(a) is referred to as a fiber reinforced resin structure A, and the fiber reinforced resin structure shown in FIGS. 35(b), 36(b), 37(b), 38(b), 39(b), and 40(c) is referred to as a fiber reinforced resin structure B.

A method of manufacturing a fiber-reinforced resin structure A is a method of manufacturing a fiber-reinforced resin structure including a laminate 50 having a columnar foam body 30 and a fiber body 10 wound around a side surface portion of the foam body 30 by one turn or more, the method including the steps of preparing the laminate 50 impregnated with an uncured thermosetting resin (uncured resin) in the fiber body 10, curving the laminate 50 so that a column axis A of the foam body 30 is curved, and thermally curing the thermosetting resin contained in the laminate 50 by applying an external force to the laminate 50, wherein a 25% compression load measured in accordance with JIS K6400-2: 2012 of the foam body is 1 to 2000 kPa (except for the method of using a secondary foamable foam as the foam 30, and a covering body having an uncured thermosetting resin (uncured resin) and a bleed hole through which gas can seep and covering the laminate 30).

A method of manufacturing a fiber-reinforced resin structure B is a method of manufacturing a fiber-reinforced resin structure, comprising the steps of preparing a laminate 50 having a columnar foam 30 and a fiber body 10 wound around one or more sides of the foam 30, preparing the laminate 50 impregnated with a thermosetting resin (uncured resin) in an uncured state in the fiber body 10, bending the laminate 50 so that a column axis A of the foam 30 is bent, thermally curing the thermosetting resin included in the laminate 50 by applying an external force to the laminate 50, thermally curing the laminate 50, cooling the laminate 50 to contract the foam 30, and removing the foam 30 included in the laminate 50 after contracting the foam 30, wherein a 25% compression load measured in accordance with JIS K6400-2: 2012 of the foam is 1 to 2000 kPa (except for the method of using a secondary foamable foam as the foam 30, and a covering body having an uncured thermosetting resin (uncured resin) and a bleed hole through which gas can seep and covering the laminate 30).

The fiber-reinforced resin structure A includes at least a columnar foam 30, a fiber body 10 surrounding the foam 30, and a resin 20 impregnated in the fiber body 10, the foam 30 is preferably a solid body extending at least from one end to the other end of the fiber body 10, and the fiber body 10 is a fiber-reinforced resin structure in which a part or all of the fiber body 10 is curved.

The fiber-reinforced resin structure B includes at least a fiber body 10 and a resin 20 impregnated in the fiber body 10, and the fiber body 10 is a fiber-reinforced resin structure.

Comparing the fiber-reinforced resin structure A with the fiber-reinforced resin structure B, the fiber-reinforced resin structure A mainly differs in that the fiber-reinforced resin structure A includes the foam 30 and the fiber-reinforced resin structure B does not include the foam 30.

In the following description, the step of preparing the laminate 50 is referred to as a "preparing step", the step of bending the laminate 50 is referred to as a "bending step", the step of curing the uncured resin impregnated in the fiber body 10 is referred to as a "curing step", the step of cooling the laminate 50 after the curing step to contract the foam 30 is referred to as a "cooling step", and the step of removing the foam 30 included in the laminate 50 after the cooling step is referred to as a "removing step". Although not described here, each manufacturing method can further perform the above-described modification step (see, for example, FIG. 38(b)).

In the fiber-reinforced resin structure A, the foam 30 extends from one end to the other end of the fiber body 10, but the present invention is not limited thereto, and the foam 30 may extend from one end to just before the other end of the fiber body 10. That is, the foam 30 may extend from one end of the fiber body 10 and may not reach the other end of the fiber body 10. Similarly, the foam body 30 may extend only between a first position separated by a predetermined distance from one end of the fiber body 10 to the center side and a second position separated by a predetermined distance from the other end of the fiber body 10 to the center side.

Modified Example 1

Figure 35:
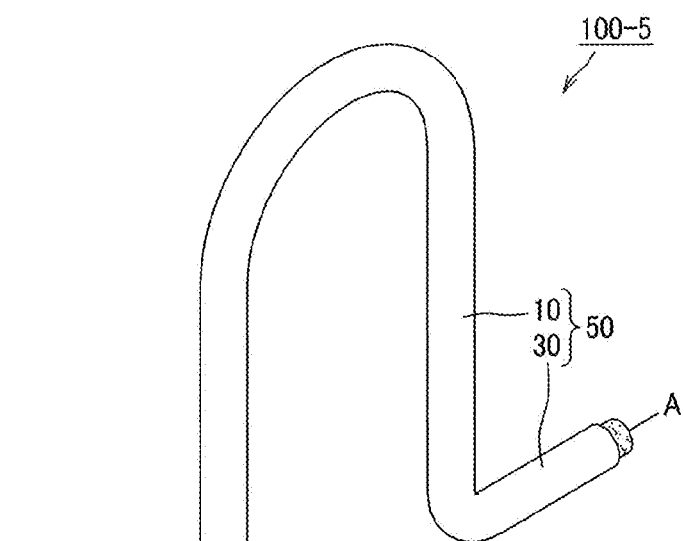
FIG. 35 is a perspective view showing a fiber-reinforced resin structure according to modification 1.
Figure 35:
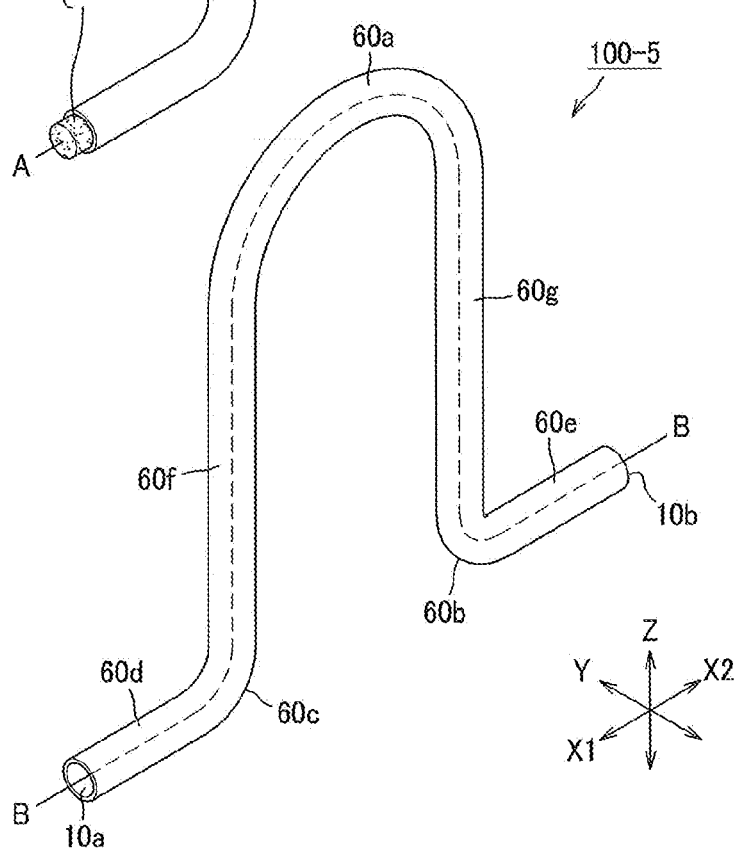

FIG. 35 is a perspective view showing a fiber-reinforced resin structure according to the modified example 1. As shown in FIG. 35(a), a fiber-reinforced resin structure 100-5 according to the modified example 1 is manufactured by the method described in FIG. 17. Here, FIG. 17 illustrates a fiber-reinforced resin structure having one curved portion, but the modified example 1 illustrated in FIG. 35 illustrates a fiber-reinforced resin structure having a plurality of curved portions.

In the method of manufacturing the fiber-reinforced resin structure 100-5 according to the modified example 1, the bending step includes a plurality of steps. Specifically, the method includes the steps of bending the stacked body 50 at a first position spaced apart from one end of the stacked body 50 toward the center side by a predetermined distance, bending the stacked body 50 at a second position spaced apart from the other end of the stacked body 50 toward the center side by a predetermined distance, and bending the stacked body 50 so that the column axis A of the foam body 30 existing between the first position and the second position has a predetermined shape (for example, a V shape or a rectangular shape). In the modified example 1, the stacked body 50 is curved such that the column axis A of the foam body 30 existing between the first position and the second position is U-shaped or inverted U-shaped.

In the fiber-reinforced resin structure 100-5 according to the modified example 1, the cylindrical fiber body 10 has an opening 10a, an opening 10b, a plurality of curved portions 60a to 60c, and a plurality of non-curved portions 60d to 60g.

The opening 10a is open in the X1 direction, and the opening 10b is open in the X2 direction. The direction in which the openings 10a and 10b are opened can be arbitrarily set. For example, both the directions in which the openings 10a and 10b are opened can be set to the X1 direction.

The curved portion 60a is bent in an inverted U shape in a front view (viewed in the Y direction). Similarly, when viewed from the front (viewed in the Y direction), the curved portion 60b is bent in an L shape, and the curved portion 60c is bent in an L-shaped mirror image shape. The fiber body 10 may have at least one of the curved portions 60a to 60c.

The non-curved portion 60d linearly extends in the X2 direction from the opening 10a to the curved portion 60c. The non-curved portion 60e linearly extends in the X1 direction from the opening 10b to the curved portion 60b. The non-curved portion 60f linearly extends in the Z direction so as to connect the curved portion 60c and the curved portion 60a. The non-curved portion 60g linearly extends in the Z direction so as to connect the curved portion 60b and the curved portion 60a.

Modified Example 2

Figure 36:
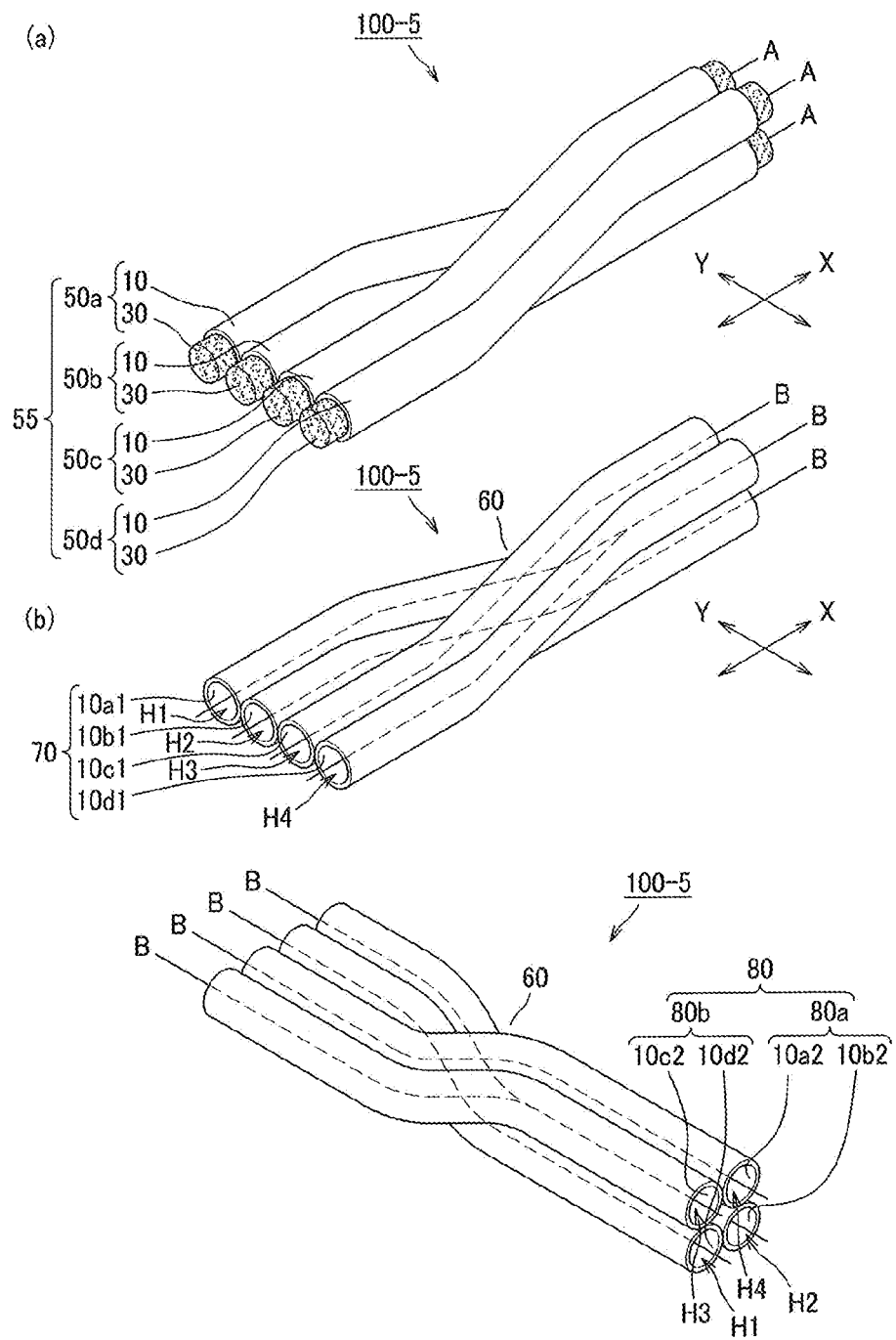
FIG. 36 is a perspective view showing a fiber reinforced resin structure according to modification 2.

FIG. 36 is a perspective view showing a fiber-reinforced resin structure according to the modified example 2. As shown in FIG. 36(a), the fiber-reinforced resin structure according to the second modification has a plurality of laminated bodies 50. Here, FIG. 17 illustrates a fiber-reinforced resin structure in which one laminate 50 is curved, but the modified example 2 illustrates a fiber-reinforced resin structure in which a plurality of (for example, four) laminates 50 are collected and curved.

The method of manufacturing the fiber-reinforced resin structure 100-5 according to the modified example 2 includes an arrangement step of assembling a plurality of laminates (laminates 50a to 50d) into an assembly (also referred to as a laminate group), and the bending step is a step of bending a part of the assembly. The bending step is also referred to as a twisting step.

The arrangement step is a step of arranging the plurality of stacked bodies 50 so that the column axis A of the foam body 30 extends in the X direction to form the aggregate 55. At this time, the plurality of stacked bodies 50 are aligned in the Y direction. Specifically, the stacked body 50b, the stacked body 50c, and the stacked body 50d are aligned so as to be adjacent to the stacked body 50a, the stacked body 50b, and the stacked body 50c, respectively.

The bending step is a step of bending a predetermined position located between one end and the other end of the aggregate 55. In the example shown in FIG. 36(a), the predetermined position is curved by changing the arrangement state of the stacked bodies at one end (right side in the drawing) of both ends of the aggregate 55. More specifically, one ends of the stacked body 50c and the stacked body 50d are lifted upward and stacked on one ends of the stacked body 50a and the stacked body 50b, thereby bending the predetermined position. The bending step may be a step of bending at least one of the one end and the other end of the aggregate 55. That is, one end and/or the other end of the aggregate 55 may be curved.

As shown in FIG. 36(b), a fiber-reinforced resin structure 100-5 according to the modified example 2 includes a plurality of fiber bodies 10 (fiber bodies 10a to 10d), and the plurality of fiber bodies 10 each have a curved portion 60 (twisted portion 60) and a non-curved portion (non-twisted portion). The non-curved portions of the fiber bodies 10a to 10d extend linearly in the X direction.

The fiber-reinforced resin structure 100-5 according to the modified example 2 has an end portion 70, an end portion 80, and communication holes H1 to H4.

The end portion 70 has four openings 10a1, 10b1, 10c1, and 10d1. The openings 10a1 to 10d1 are arranged in a line in the Y direction along a plane perpendicular to the X direction.

The end portion 80 has four openings 10a2, 10b2, 10c2, and 10d2. The four openings 10a2 to 10d2 are arranged in two rows in the Y direction along a plane perpendicular to the X direction. Specifically, the opening 10a2 and the opening 10b2 are arranged in the first row of the lower layer of the two rows, and the opening 10c2 and the opening 10d2 are arranged in the second row of the upper layer. In other words, the end portion 80 has a lower layer 80a constituted by the opening 10a2 and the opening 10b2, and an upper layer 80b constituted by the opening 50c2 and the opening 50d2.

The communication hole H1 communicates the opening 10a1 and the opening 10a2 of the fiber body 10a. The communication hole H2 communicates the opening 10b1 and the opening 10b2 of the fiber body 10b. The communication hole H3 communicates the opening 10c1 and the opening 10c2 of the fiber body 10c. The communication hole H4 communicates the opening 10d1 and the opening 10d2 of the fiber body 10d.

The communication holes H1 to H4 linearly extend in the X direction from the end portion 70 to a position before the bending portion 60, and are bent at the bending portion 60. The communication holes H1 and H2 extend linearly in the X direction to the lower layer 80a of the end portion 80 after being curved in the curved portion 60. On the other hand, the communication holes H3 and H4 extend linearly in the X direction to the upper layer 80b of the end portion 80 after being curved in the curved portion 60.

The bending process (twisting process) in the modified example 2 is different from the bending process described above in that the column axis of the foam included in the stacked body or the aggregate is bent in a plurality of directions (two directions of the Y direction and the Z direction in FIG. 36(a)).

Modified Example 3

Figure 37:
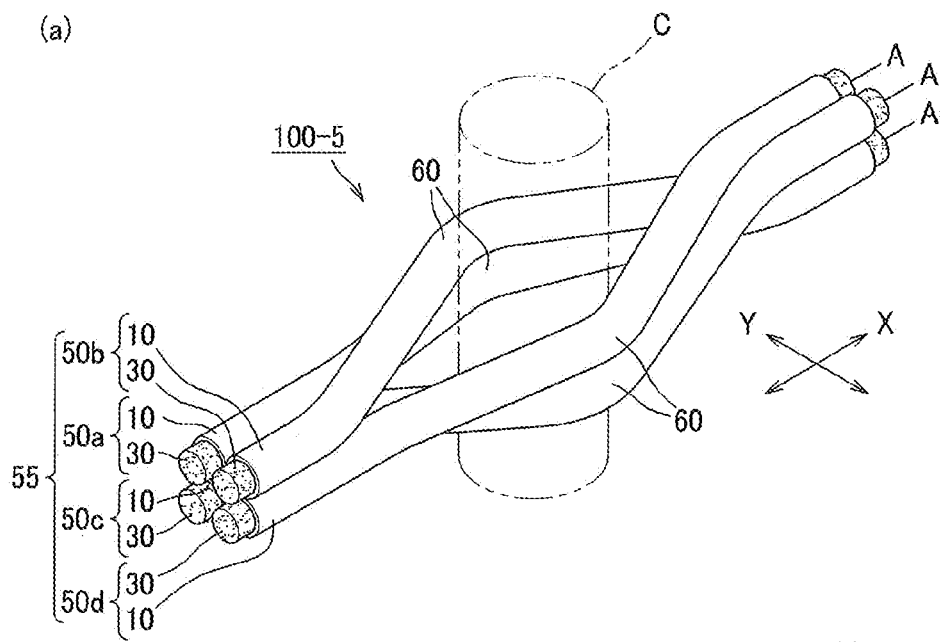
FIG. 37 is a perspective view showing a fiber-reinforced resin structure according to modification 3.
Figure 37:
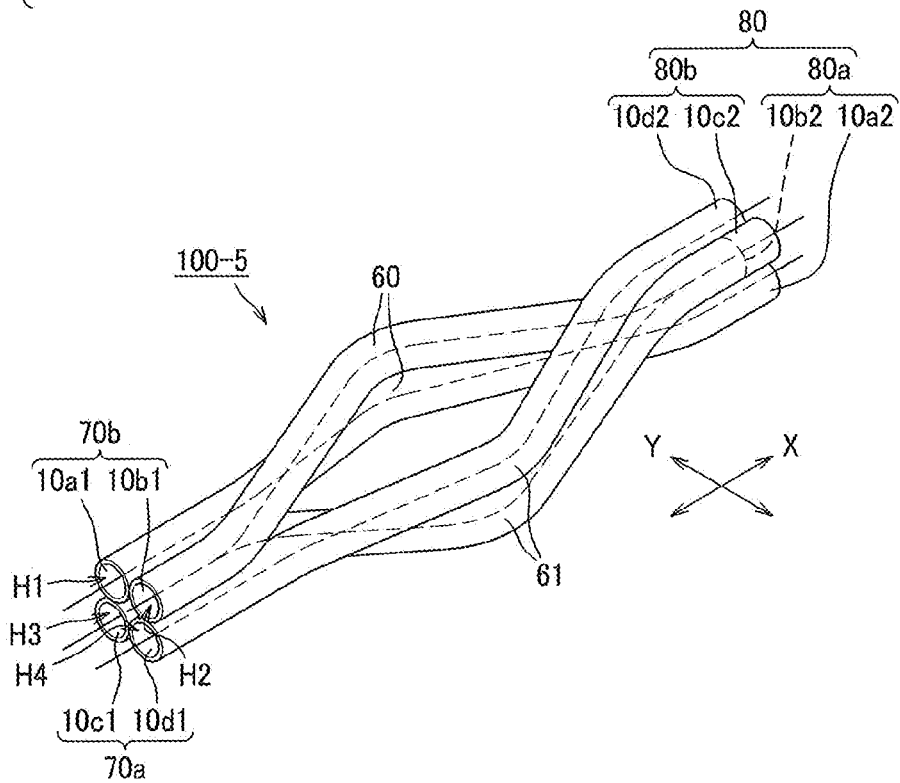

FIG. 37 is a perspective view showing a fiber-reinforced resin structure according to the modified example 3. As illustrated in FIG. 37(a), in the fiber reinforced resin structure according to the modified example 3, similarly to the second modification, a plurality of stacked bodies 50 are collected to form an aggregate 55, and the aggregate 55 is curved.

Comparing the fiber-reinforced resin structure according to the modified example 3 with the fiber-reinforced resin structure according to the second modification, the shape of the one end and the shape of the curved portion are mainly different. Therefore, in describing the fiber-reinforced resin structure according to the modified example 3, the differences from the fiber-reinforced resin structure according to Modification 2 described above will be described, and the common points will not be described as appropriate.

In the method of manufacturing a fiber-reinforced resin structure according to the modified example 3, the disposing step includes three steps. Specifically, the method includes a step of forming a single first assembly of the stacked bodies 50a and 50b adjacent to each other so that the column axis A of the foam 30 extends in the X direction, a step of forming a single second assembly of the stacked bodies 50c and 50d adjacent to each other so that the column axis A of the foam 30 extends in the X direction, and a step of forming a two-layer assembly 55 by placing the second assembly on the first assembly.

In the method of manufacturing a fiber-reinforced resin structure according to the modified example 3, the bending step includes two steps. Specifically, the process includes a step of twisting the aggregate 55 by rotating the other end by 180 degrees with respect to the one end with the column axial direction (X direction) of the foam 30 as a rotation axis so that a predetermined portion positioned between the one end and the other end of the aggregate 55 becomes the curved portion 60, and a step of interposing the cylindrical guide member C in the curved portion 60.

In the bending process, when the guide material C is interposed, the guide material C is interposed between the first assembly and the second assembly such that the first assembly constituted by the stacked bodies 50a and 50b and the second assembly constituted by the stacked bodies 50c and 50d are separated from each other in the bending portion 60.

After the bending step, the uncured resin impregnated in the fiber body 10 is cured with the guide material C interposed between the first assembly and the second assembly. Thereafter, the assembly 55 is cooled and the guide material C is removed to obtain a fiber reinforced resin structure 100-5 shown in FIG. 37(a). When the foam 30 is removed from the fiber-reinforced resin structure 100-5 shown in FIG. 37(a), a fiber-reinforced resin structure 100-5 shown in FIG. 37(b) is obtained.

In the bending process of the third modification, the other end is rotated by 180 degrees to twist the assembly 55, but the rotation angle can be arbitrarily set. For example, the other end may be rotated by 45 degrees or 360 degrees with respect to one end.

Further, in the manufacturing method of the modified example 3, the curved portion 60 has the opening portion opened in the Z direction by interposing the cylindrical guide member C between the first assembly and the second assembly, but the present invention is not limited to this configuration, and the curved portion 60 may have a configuration without the opening portion. That is, in the manufacturing method of the modified example 3, the cylindrical guide member C is not interposed between the first assembly and the second assembly. Thereafter, the other end is rotated by a predetermined angle (for example, 1 to 360 degrees or 360 degrees or more) with respect to the one end to twist the assembly 55.

The fiber reinforced resin structure according to the third modification has an end portion 70, an end portion 80, and communication holes H1 to H4.

The end portion 70 has four openings 10a1, 10b1, 10c1, and 10d1. The openings 10a1 to 10d1 are arranged in two rows in the Y direction along a plane perpendicular to the X direction. Specifically, the opening 10c1 and the opening 10d1 are arranged in the first row of the lower layer of the two rows, and the opening 10a1 and the opening 10b1 are arranged in the second row of the upper layer. In other words, the end portion 70 has a lower layer 70a constituted by the opening 10c1 and the opening 10d1, and an upper layer 70b constituted by the opening 10a1 and the opening 10b1.

The end portion 80 has four openings 10a2, 10b2, 10c2, and 10d2. The four openings 10a2 to 10d2 are arranged in two rows in the Y direction along a plane perpendicular to the X direction. Specifically, the opening 10b2 and the opening 10a2 are arranged in the first row of the lower layer of the two rows, and the opening 10c2 and the opening 10d2 are arranged in the second row of the upper layer. In other words, the end portion 80 has a lower layer 80a constituted by the opening 10b2 and the opening 10a2, and an upper layer 80b constituted by the opening 10c2 and the opening 10d2.

The communication hole H1 communicates the opening 10a1 and the opening 10a2 of the fiber body 10a. The communication hole H2 communicates the opening 10b1 and the opening 10b2 of the fiber body 10b. The communication hole H3 communicates the opening 10c1 and the opening 10c2 of the fiber body 10c. The communication hole H4 communicates the opening 10d1 and the opening 10d2 of the fiber body 10d.

The communication holes H1 and H2 linearly extend in the X direction from the upper layer 70b of the end portion 70 to a position before the curved portion 60, are curved by the curved portion 60, and then linearly extend in the X direction to the lower layer 80a of the end portion 80. On the other hand, the communication holes H3 and H4 linearly extend in the X direction from the lower layer 70a of the end portion 70 to a position before the curved portion 60, are curved by the curved portion 60, and then linearly extend in the X direction to the upper layer 80b of the end portion 80.

Modified Example 4

FIG. 38(a) is a perspective view illustrating a fiber reinforced resin structure according to the modified example 4. The fiber reinforced resin structure 100-5 according to the fourth modification shown in FIG. 38(c) is manufactured by the method described with reference to FIG. 19, but the difference from the method described with reference to FIG. 19 is mainly described here.

Figures 2, 38:
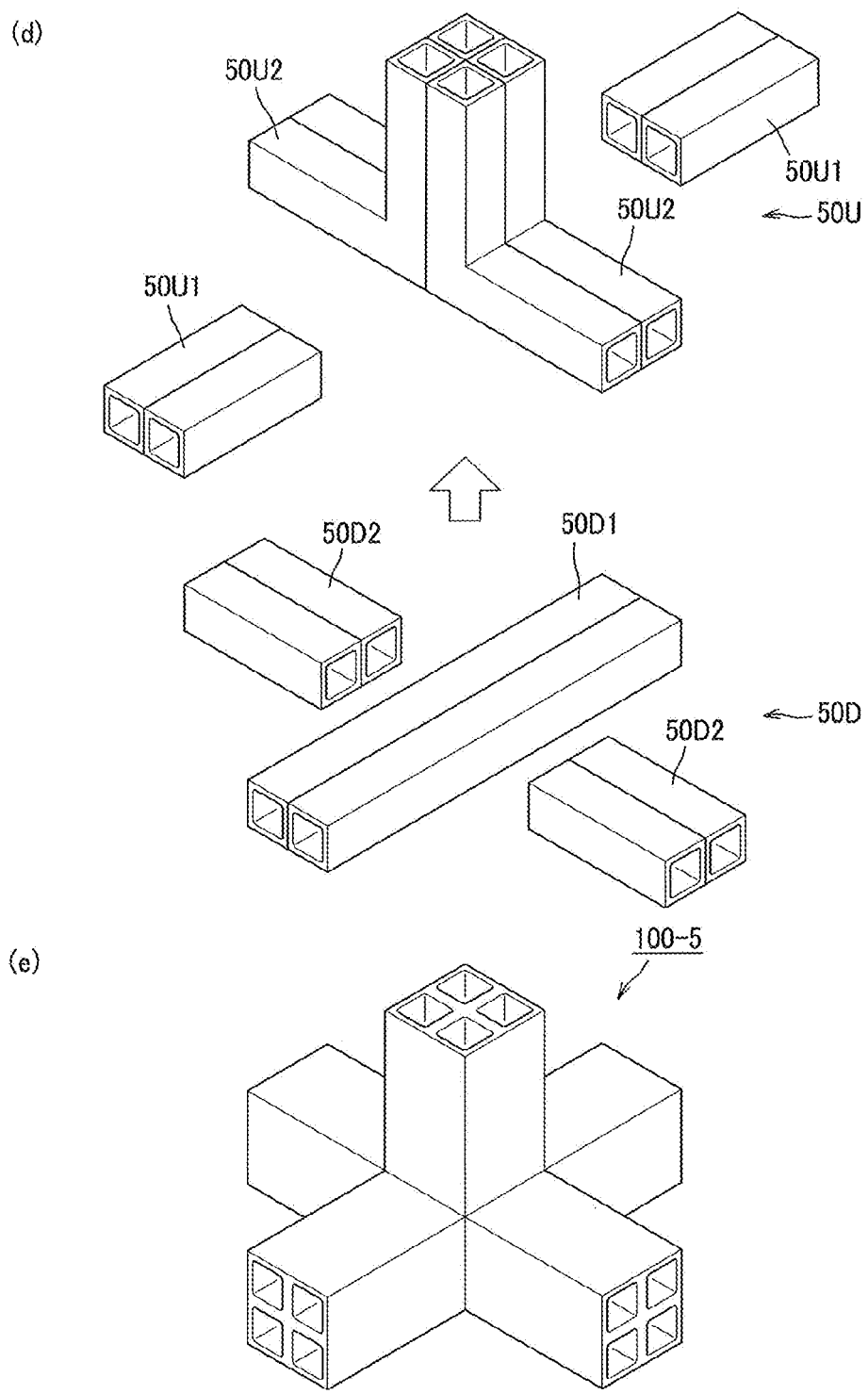

First, as shown in FIG. 38-1(a), a plurality of stacked bodies 50 (formed in an L-shape) having a curved structure obtained by performing a curving step and a plurality of cylindrical stacked bodies 50 are prepared. In the L-shaped stacked body 50, one side portion of the L-shape is provided, and the other side portion of the L-shape is erected, and the erected side portions of the respective L-shaped stacked bodies 50 are arranged so as to be in contact with each other. Further, one end face of the columnar laminated body 50 is arranged so as to be joined to the side face side of the L-shaped laminated body 50. In FIGS. 38-1(a) and 38(b), the stacked bodies 50 are slightly separated from each other so that the shapes of the stacked bodies 50 can be easily understood, but actually, the stacked bodies 50 are in contact with each other as described above.

As shown in FIG. 38-1(b), the deformation step is performed in a state where the L-shaped laminate 50 and the cylindrical laminate 50 are in contact with each other, and the portion which has been the L-shaped laminate 50 becomes a plurality of communication holes (a plurality of communication holes having an L-shaped cross section) which are not parallel to each other, and the portion which has been the cylindrical laminate 50 becomes a plurality of bottomed holes which extend in a straight line, by finally curing (see FIG. 38-1(c)). In FIGS. 38-1(a) and 38-1(b), the foam body 30 is omitted for simplicity.

Modified Example 4-1

The fiber-reinforced resin structure 100-5 may be, for example, a fiber-reinforced resin structure 100-5 shown in FIG. 38-1(e), in addition to the structure shown in FIG. 38-1(c) (this is referred to as the modified example 4-1). Specifically, as described with reference to FIG. 38-1(a), the erected side portions of the respective L-shaped stacked bodies 50 are arranged so as to be in contact with each other, and one end surface of the columnar stacked body 50 is arranged so as to be joined to the side surface side of the L-shaped stacked body 50, so as to form an upper portion (see reference numeral 50U in FIG. 38-2(d)). Further, under the upper portion 50U, a plurality of cylindrical laminates (see reference numeral 50D1 in FIG. 38-2(d)) and a lower portion (see reference numeral 50D in FIG. 38-2(d)) arranged so as to join one end face of each of a plurality of other cylindrical laminates (see reference numeral 50D2 in FIG. 38-2(d)) are prepared on a side face of the cylindrical laminate 50. With the upper surface of the lower portion in contact with the lower surface of the upper portion, the deformation process is performed as described above, and finally, the upper portion 50U and the lower portion 50D are integrated as shown in FIG. 38-2, and the fiber reinforced resin structure 100-5 shown in FIG. 38-2(e) is obtained. In FIG. 38-2(b), for the sake of simplicity, illustration of the cylindrical laminate 50 and the like shown in FIG. 38-1(a) is omitted, and only the fiber-reinforced resin structure 100-5 shown in FIG. 38-2(e) and FIG. 38-2(d) in which the fiber-reinforced resin structure 100-5 is disassembled are shown.

In the modified example 4-1, the upper surface of 50D1, which was a plurality of cylindrical laminates before curing in the lower portion 50D, and the lower surface of 50U1, which was a plurality of cylindrical laminates before curing in the upper portion 50U, are brought into contact with each other and cured, so that the strength of these 50D1 and 50U1 can be improved. In addition, since the upper surface of 50D2, which is a plurality of cylindrical laminates before curing, of the lower portion 50D and the lower surface of 50U2, which is an L-shaped laminate before curing, of the upper portion 50U are cured in contact with each other, the strength of these 50D2 and 50U2 can be improved. As a result, the strength of the entire fiber-reinforced resin structure 100-5 can be improved.

Modified Examples 5 and 6

Figure 39:
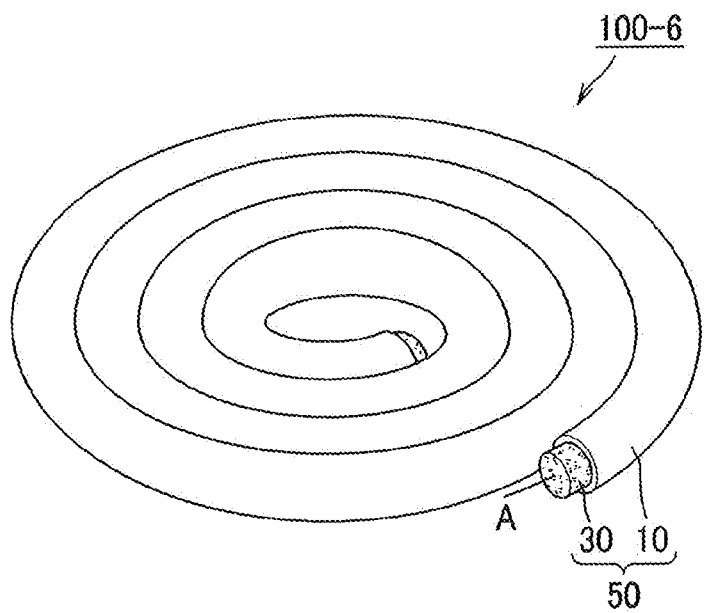
FIG. 39 is a perspective view showing a fiber-reinforced resin structure according to modification 5.
Figure 39:
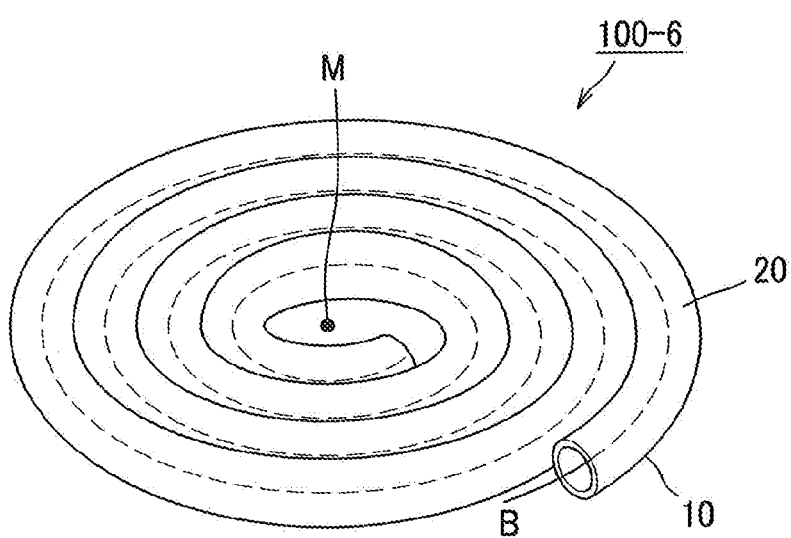
Figure 40:
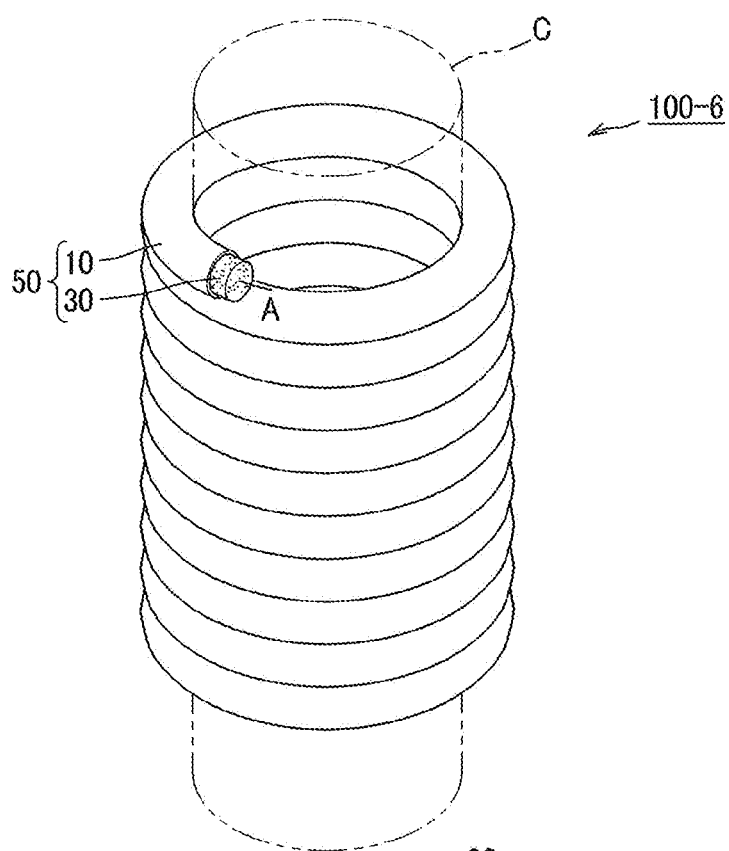
FIG. 40 is a perspective view showing a fiber-reinforced resin structure according to modification 6.
Figure 40:
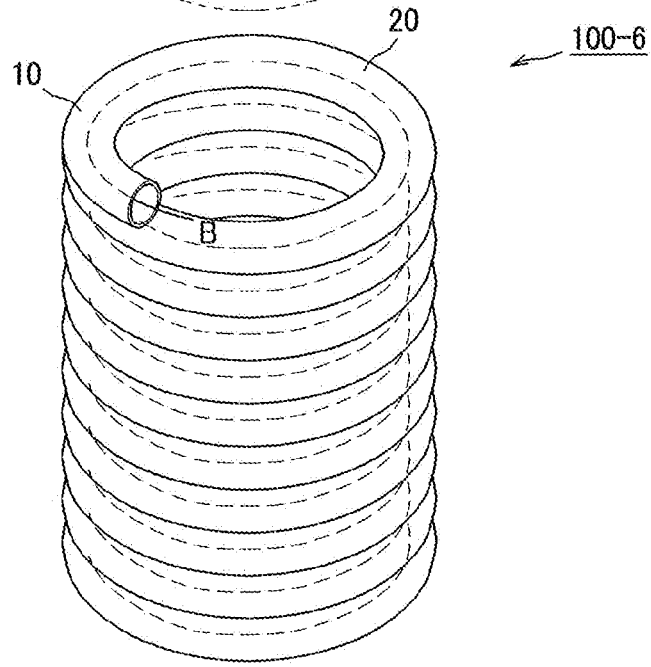

FIGS. 39 and 40 are perspective views showing fiber reinforced resin structures according to the modified examples 5 and 6. The fiber-reinforced resin structure 100-6 according to the modified examples 5 and 6 is manufactured by the method described in FIG. 17.

Comparing the fiber-reinforced resin structures according to the modified examples 1 to 4 with the fiber-reinforced resin structures according to the modified examples 5 and 6, the fiber-reinforced resin structures according to the modified examples 1 to 4 are partially curved in the fiber body 10, whereas the fiber-reinforced resin structures according to the modified examples 5 and 6 are different in that the entire fiber body 10 is curved. In other words, the fiber-reinforced resin structures according to the modified examples 1 to 4 have non-curved portions, but the fiber-reinforced resin structures according to the modified examples 5 and 6 do not have non-curved portions.

As shown in FIG. 39, in the method of manufacturing the fiber-reinforced resin structure 100-6 according to the fifth modification, the laminate 50 is bent in the bending process so that the column axis A of the foam 30 is wound in a screw-like shape in a plane.

After the bending step, the uncured resin impregnated in the fiber body 10 is cured, and then the laminate 50 is cooled, thereby obtaining a fiber-reinforced resin structure 100-6 shown in FIG. 39(a). When the foam 30 is removed from the fiber-reinforced resin structure 100-6 shown in FIG. 39(a), a fiber-reinforced resin structure 100-6 shown in FIG. 39(b) is obtained.

As shown in FIG. 39(b), a fiber-reinforced resin structure 100-6 according to the modified example 5 includes at least a fiber body 10 and a resin 20 impregnated in the fiber body 10, and the fiber body 10 has a cylindrical shape in which a cylinder axis B is a screw-shaped in a planar manner. In other words, the fiber reinforced resin structure 100-6 is spirally formed by being bent a plurality of times in a plane so that the diameter from the virtual center M shown in FIG. 39(b) gradually increases.

As shown in FIG. 40, in the method of manufacturing the fiber-reinforced resin structure 100-6 according to the sixth modification, the laminate 50 is bent in the bending process so that the column axis A of the foam 30 is wound in a spiral spring shape.

In the bending step, a cylindrical guide member C is prepared, and the laminate 50 is wound around the outer peripheral surface of the guide member C.

After the bending step, the uncured resin impregnated in the fiber body 10 is cured in a state where the laminate 50 is wound around the outer peripheral surface of the guide material C. Thereafter, the laminate 50 is cooled and the guide material C is removed to obtain a fiber reinforced resin structure 100-6 shown in FIG. 40(a). When the foam 30 is removed from the fiber-reinforced resin structure 100-6 shown in FIG. 40(a), a fiber-reinforced resin structure 100-6 shown in FIG. 40(b) is obtained.

As described above, by bending one laminate 50 or by bending the aggregate 55 composed of a plurality of laminates 50, it is possible to form fiber-reinforced resin structures having various shapes. In addition, by combining the laminate 50 having a predetermined shape and the laminate 50 having a shape different from the predetermined shape, such as the laminate 50 having a curved structure or the laminate 50 having a cylindrical shape, it is possible to manufacture fiber reinforced resin structures having various shapes. Although illustration and description are omitted, a fiber-reinforced resin structure may be manufactured by combining the laminates 50 having different sizes, or a desired fiber-reinforced resin structure may be manufactured by determining the number, shape, and size of the laminates 50 and appropriately combining them. In addition, the laminate 50 and the assembly 55 before curing are fitted into a predetermined mold to apply an external force, and the uncured resin impregnated in the fiber body 10 is cured, thereby obtaining various components of light weight and high strength. For example, an all used in a boat such as a boat or a canoe is obtained from the assembly 55 shown in FIG. 36(a). For example, a propeller for propelling an aircraft or ship is obtained from the assembly 55 shown in FIG. 37(a) (not shown). For example, a manhole lid, a receiving unit of a parabolic antenna, or a lid of a container for containing a predetermined liquid, solid, or the like can be obtained from the laminate 50 shown in FIG. 39(a) (not shown). For example, a container for containing a predetermined liquid, solid, or the like is obtained from the laminate 50 shown in FIG. 40(a) (not shown). The fiber-reinforced resin structure 100-5 shown in FIGS. 38-1(c) and 38-1(f) can be used as a protective member for protecting a harness by passing a harness or the like through a through hole, or as a container (for example, when a rod-like object is an umbrella, the container is an umbrella) for supporting and storing the rod-like object in an upright state by inserting the rod-like object into the through hole.

Modified Example 7

Figure 41:
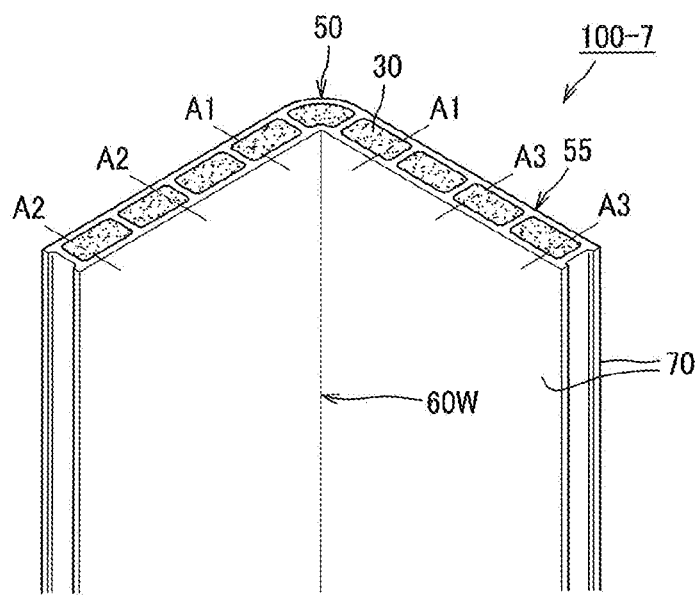
FIG. 41 is a perspective view showing a fiber-reinforced resin structure according to modification 7.
Figure 41:
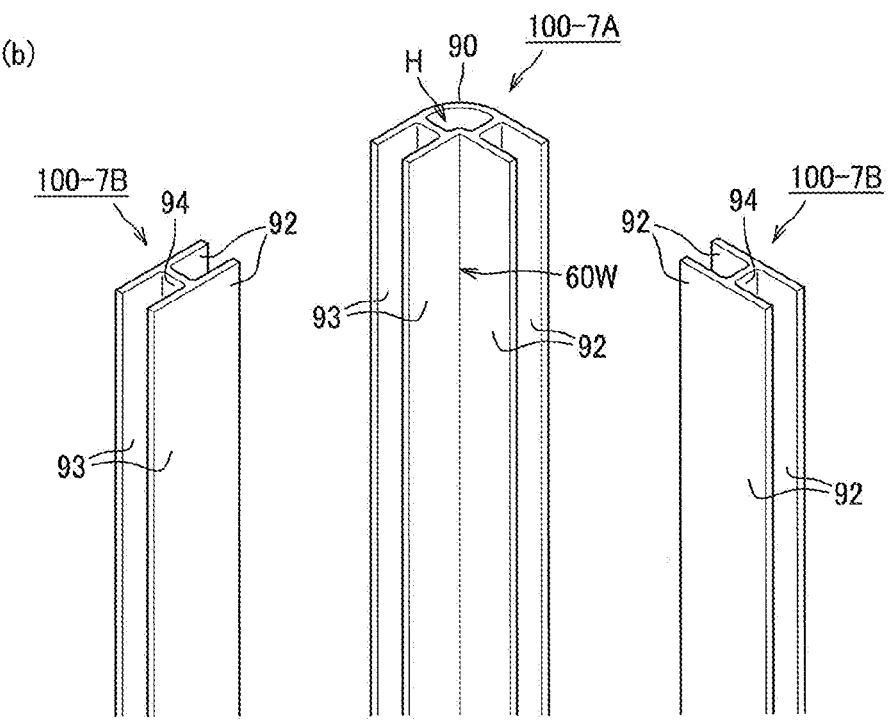
Figure 42:
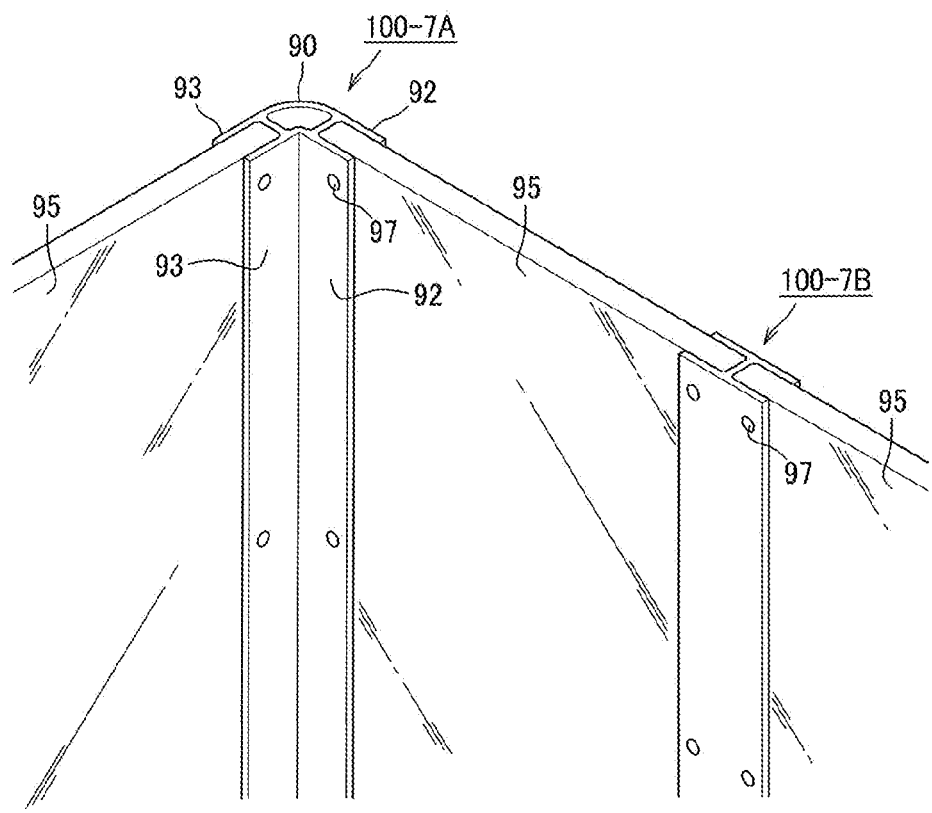
FIG. 42 is a perspective view showing a fiber-reinforced resin structure according to modification 7.

FIGS. 41 and 42 are perspective views showing a fiber reinforced resin structure according to the modified example 7. As shown in FIG. 42(a), a fiber-reinforced resin structure 100-7 according to the seventh modification is manufactured by the method described with reference to FIGS. 32 and 33. That is, in the seventh modification, the assembly 55 shown in FIG. 32(e) or 33(e) is provided by the method described in FIGS. 32(a) to 32(d) or FIGS. 33(a) to 33(d). Here, in FIGS. 32 and 33, the four stacked bodies 50 are sandwiched by two outer peripheral bodies 70, but in the modified example 7, for example, nine stacked bodies 50 are sandwiched by two outer peripheral bodies 70 to form a rectangular plate-shaped aggregate 55.

An external force is applied to the assembly 55 to compress the entire assembly 55, and the assembly 55 is deformed into an L-shape in cross-sectional shape by applying an external force so as to bend both side ends of the assembly 55 in a direction approaching each other around the central stacked body 50 (the fifth stacked body 50 from the left in FIG. 41) of the nine stacked bodies 50 (in other words, applying an external force so as to bend the central stacked body 50), and then cured. Thus, a fiber reinforced resin structure 100-7 having a bent portion 60W and an L-shaped cross section is formed, and the foam 30 is removed from the fiber reinforced resin structure 100-7.

Thereafter, the fiber-reinforced resin structure 100-7 is cut in the vertical direction (vertical direction in FIG. 41) along "A1, A1" shown in FIG. 41(a), whereby the fiber-reinforced resin structure 100-7A having an L-shaped cross section shown in FIG. 41(b) can be obtained. In addition, the fiber-reinforced resin structure 100-7 is cut in the longitudinal direction along A2 and A2 or A3 and A3 shown in FIG.

41(*a*), whereby the fiber-reinforced resin structure 100-7B having an H-shaped cross section shown in FIG. 41(*b*) can be obtained.

The fiber-reinforced resin structure 100-7A includes a corner portion 90 in which a communication hole H is formed, a pair of wall portions 92 extending outward from the corner portion 90 and facing each other, and a pair of wall portions 93 extending outward from the corner portion 90 in a direction different from the direction of the pair of wall portions 92 and facing each other. In the present modification, the pair of wall portions 92 and 93 extend so as to be perpendicular to each other. The angle formed by the pair of wall portions B and C is not limited to vertical, and it is needless to say that an appropriate angle can be set.

For example, as shown in FIG. 42, the fiber-reinforced resin structure 100-7A can function as a glass frame (sometimes referred to as a "glass plate corner", an "edge seal", a "glass edge projector", a "corner block", a "corner piece", or the like) for protecting the edge (side surface) of the glass plate 95 by inserting the end portion of the glass plate 95 between the pair of wall portions 92 and 93. In this case, after the end portion of the glass plate 95 is inserted between the pair of wall portions 92 and 93, the glass plate 95 can be fixed to the glass frame by a fixing tool 97 such as a pin or a screw. The glass plate 95 may be fixed to the fiber-reinforced resin structure 100-7A by adhesion or the like instead of the fixing by the fixing member 97 described above, and the fixing method is not particularly limited.

By inserting the glass plate 95 into the pair of wall portions 92 and 93 in this way, the edge of the glass plate 95 is covered by the pair of wall portions 92 and 93, and therefore, the edge of the glass plate 95 can be protected by the pair of wall portions 92 and 93. In addition, since the corner portion 90 in which the communication hole H is formed is provided between the pair of wall portions 92 and 93 as described above, even when an external force is applied to the corner portion 90 (even when another structure collides with the corner portion 90), the shock can be alleviated by the communication hole H.

Here, the fiber-reinforced resin structure 100-7A is used as a glass frame for protecting the fore edge of the glass plate 95, but instead, for example, a plate-like member such as a panel (not shown) may be inserted between the pair of wall portions 92 and 93 to protect plate members other than the glass plate 95. In short, it is sufficient that the fiber-reinforced resin structure 100-7A can be inserted into the pair of wall portions 92 and 93, and the object to be inserted into the pair of wall portions 92 and 93 is not particularly limited.

Further, in the case of the glass plate 95, the fiber reinforced resin structure 100-7A functions as a glass frame for protecting the fore edge of the glass plate 95, but in the case of an object such as a panel of metal or the like which does not particularly need to be protected, it also functions as a connecting member which connects one object and another object so as to be perpendicular to each other. From this point of view, also in the case of the glass plate 95, as shown in FIG. 42, it can be said that one glass plate 95 (the leftmost glass plate 95 in FIG. 42) and the other glass plate 95 (the central glass plate 95 in FIG. 42) are connected so as to form an angle perpendicular to each other.

Here, it is preferable that the distance between the pair of wall portions 92 and 93 is set to be slightly larger than the thickness of the object to be inserted into the pair of wall portions 92 and 93, and in this case, the object can be easily inserted into the pair of wall portions 92 and 93, and when the inserted object is inserted between the pair of wall portions 92 and 93, the object damage due to friction between the object and the inner side surfaces of the wall portions 92 and 93 can be prevented.

On the other hand, the fiber-reinforced resin structure 100-7B includes a pair of wall portions 92 facing each other and extending in a straight line, a pair of wall portions 93 facing each other and extending in a straight line in a direction opposite to the pair of wall portions 92, and a connecting plate 94 connecting the pair of wall portions 92 and 93. In the fiber-reinforced resin structure 100-7B, similarly to the fiber-reinforced resin structure 100-7B described above, an object such as a glass plate 95 is inserted into the pair of wall portions 92 and 93, and functions as a protective member for protecting the object and a connecting member for connecting the object. The fixing of the object to the fiber-reinforced resin structure 100-7B may be performed by the above-described fixing tool 97 (see FIG. 42(*b*)) or by adhesion.

Modified Example 8

Figure 43:
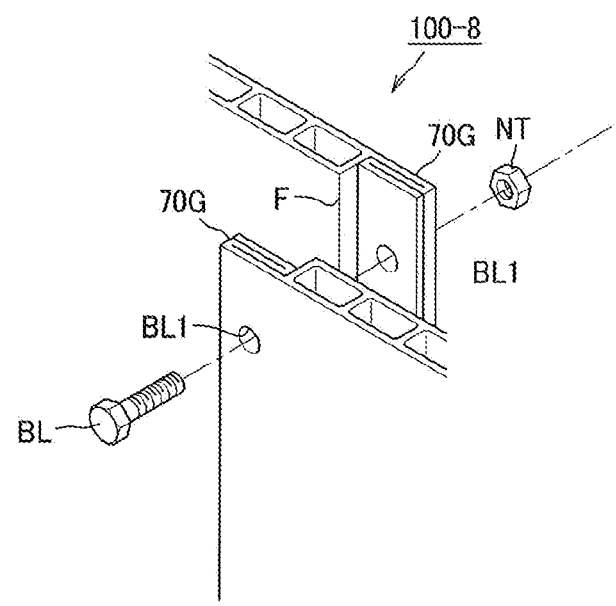
FIG. 43 is a perspective view showing a fiber-reinforced resin structure according to modification 8.
Figure 43:
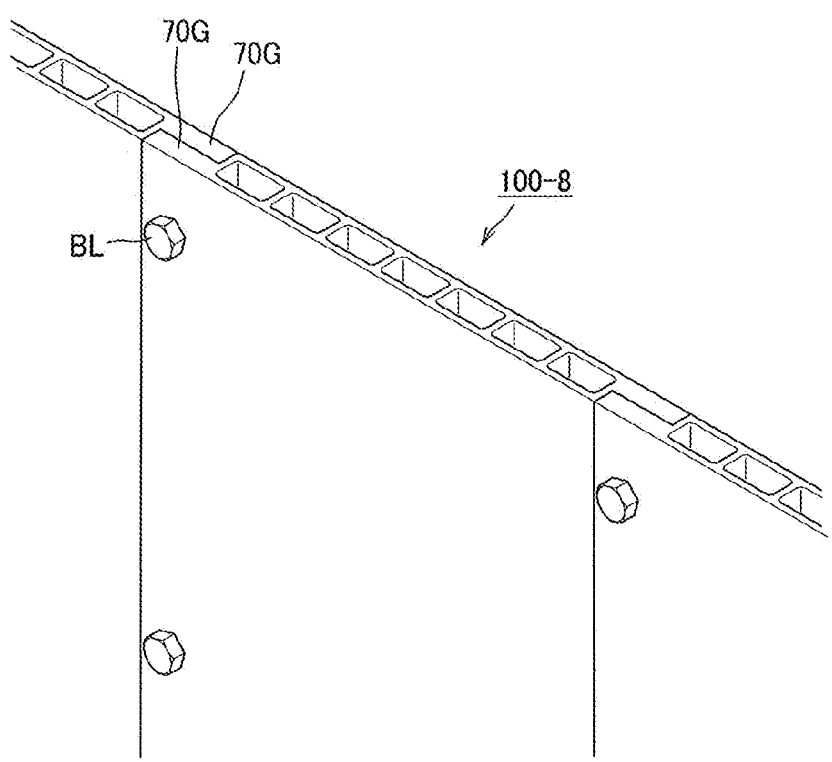

FIG. 43 is a perspective view showing a fiber-reinforced resin structure according to the modified example 8. As shown in FIG. 43, a fiber-reinforced resin structure 100-8 according to Modification B is manufactured by the method described with reference to FIGS. 32 and 33. That is, in the present modification A, the assembly 55 shown in FIGS. 32(*e*) and 33(*e*) is provided by the method described with reference to FIGS. 32(*a*) to 32(*d*) and FIGS. 33(*a*) to 33(*d*). Here, FIGS. 32 and 33 illustrate the outer peripheral body 70 having the same size, but in the present modification 8, one outer peripheral body 70 (the left outer peripheral body 70 in FIGS. 32(*e*) and 33(*e*)) is used to have a length such that it is flush with the side surface of the endmost stacked body 50 in the aggregate 55 (the side surface of the rightmost stacked body 50 in FIGS. 32(*e*) and 33(*e*)), and the other outer peripheral body 70 (the right outer peripheral body 70 in FIGS. 32(*e*) and 33(*e*)) is used to have a length such that it protrudes further outward from the side surface of the endmost stacked body 50 in the stacked body 50. Specifically, in FIGS. 32(*e*) and 33(*e*), the end portion of the outer peripheral body 70 slightly protrudes outward from the side surface of the stack 50 at the end of the assembly 55, but in the other outer peripheral body 70 in the present modification 8, instead of this, an outer peripheral body protruding outward from the side surface of the stack 50 at the end of the assembly 55 by a predetermined length is used. The length of the other outer peripheral body 70 is not limited to this, and an appropriate length can be appropriately set, and in short, an appropriate length according to the number of folds described later or the like can be appropriately applied.

As also shown in FIG. 40, the end portion of the other outer peripheral body 70 is repeatedly subjected to an external force so as to fold a predetermined length portion from the end of the other outer peripheral body 70 and an external force so as to further fold the folded portion (through a folding step of folding the end portion of the other outer peripheral body 70 a plurality of times), whereby the end portion of the other outer peripheral body 70 is folded in a plurality of layers. By curing the aggregate 55 in this state, a plate-like fiber-reinforced resin structure 100-8 is formed, and the end portion of the fiber-reinforced resin structure 100-8 becomes a protruding portion 70G in which the end portion of the other outer peripheral body 70 in a state of being folded in a plurality of layers is cured. Thereafter, the foam 30 is removed from the fiber-reinforced resin structure 100-8 (see FIG. 43(*a*)).

In the modified example 8, as shown in FIG. 43(a), the thickness of the protruding portion 70G of the plate-like fiber-reinforced resin structure 100-8 is half the thickness W1 of the central portion or the like of the plate-like fiber-reinforced resin structure 100-8. A bolt hole BL1 for inserting a bolt BL is formed in the protruding portion 70G. The fiber-reinforced resin structure 100-8 formed in this manner can be used as, for example, a panel material (for example, a floor panel, a wall panel, a roof panel, a frame material, a partition, a door panel, a building material such as a wall material of a container house, an article, or the like).

That is, the plate-like fiber-reinforced resin structure 100-8 as the panel material is connected to each of the fiber-reinforced resin structures 100-8 as shown in FIG. 43(b) by inserting bolts BL into bolt holes BL1 formed in each of the protruding portions 70G and fastening them with nuts NT in a state where the protruding portions 70G of the fiber-reinforced resin structure 100-8 are joined as shown in FIG. 43(a). In other words, the protruding portion 70G is a connecting portion for joining the fiber-reinforced resin structure 100-8. In the modified example 8, since the thickness of the protruding portion 70G is halved, when the protruding portions 70G of the fiber reinforced resin structures 100-8 are joined, the thickness thereof matches the thickness of the fiber reinforced resin structure 100-8.

The thickness of the protruding portion 70G is not limited to the above-described thickness, and may be, for example, one third of the thickness W1, and the thickness can be appropriately set by adjusting the number of folds of the end portion of the other outer peripheral body 70. In the eighth modification, the bolt holes BL1 are formed after the assembly 55 is cured, but the bolt holes BL1 may be formed before curing instead.

Modified Example 9

Figure 44:
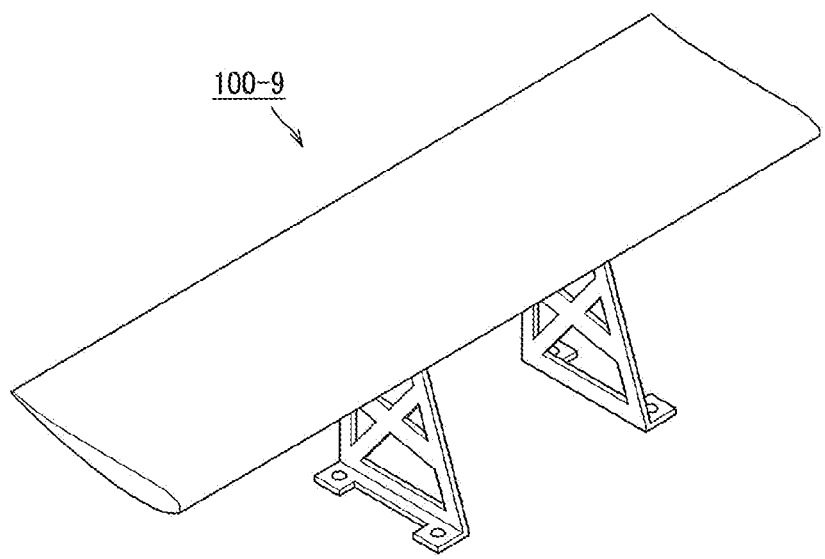
FIG. 44 is a perspective view showing a fiber-reinforced resin structure according to modification 9.
Figure 44:
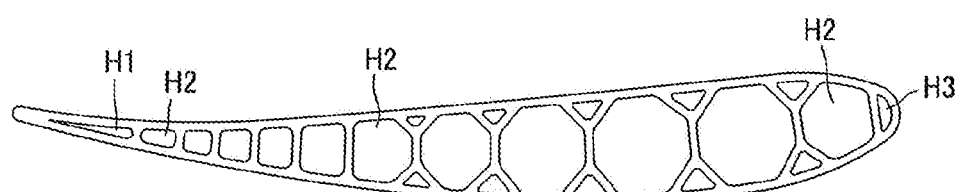

FIG. 44 is a perspective view showing a fiber-reinforced resin structure according to the modified example 9. As shown in FIG. 44(a), a fiber-reinforced resin structure 100-9 according to Modification C is formed in a wing shape. The cross-sectional shape of the fiber-reinforced resin structure 100-9 is as shown in FIG. 44(b). That is, the fiber-reinforced resin structure 100-9 has a through-hole H1 having a wing-shaped cross-sectional shape in which one end portion side is formed at an acute angle and the other end portion is formed in an arc shape, a plurality of through-holes H2 having a circular cross-sectional shape, and a through-hole H3 having a substantially semicircular cross-sectional shape and positioned on the other side of the fiber-reinforced resin structure 100-9. Further, the plurality of through holes H2 are through holes whose diameters gradually increase from one end portion toward the other end portion, and are through holes whose diameters gradually decrease from the middle of the through holes toward the other end portion, and the fiber reinforced resin structure 10-9 is formed into a wing shape by the through holes H1, H2, and H3.

In the fiber-reinforced resin structure 100-9, generally, the laminated bodies 50 having the shapes of the through holes H1, H2, and H3 are arranged as shown in FIG. 44B, and then the outer peripheral body 70 is wound around the laminated bodies 50 to form an assembly 55 (not shown). The entire assembly 55 is compressed and cured, and then the foam 30 is removed. In the ninth modification, in order to maintain the shape of the through-hole H2 having a circular cross-sectional shape, a foam having a hardness such that the shape is not deformed during curing is used. In this way, a through hole having a desired shape can be formed. It is needless to say that the point of "using a foam having a hardness that does not deform the shape when curing" described in the present modification 9 is not applied only to the modified example 9, but can be applied to any of the above-described embodiments.

The fiber-reinforced resin structure 100-9 according to the modified example 9 can be used for, for example, a rear wing of a vehicle. The shape of the fiber-reinforced resin structure 100-9 is not limited to that shown in FIG. 44, and can be formed in various shapes. That is, the fiber-reinforced resin structure 100-9 having a desired shape can be formed by appropriately combining the laminates 50 having various shapes. Specifically, the through holes having various shapes shown in FIG. 45 can be formed, which will be described as the modified examples 10-1 to 10-3.

Modified Example 10-1

As shown in FIG. 45(a), a cylindrical laminated body 50 is disposed around a cylindrical core made of resin or metal so as to be turned, and an outer peripheral body 70 is wound around the outer periphery of the laminated body 50 to form an assembly 55. When the entire assembly 55 is compressed, as shown in FIG. 45(b), the adjacent stacked bodies 50 and the outer peripheral body 70 are joined while the cross-sectional shape of the stacked bodies 50 is deformed so as to fill the gaps between the adjacent stacked bodies 50 and the gaps between the adjacent outer peripheral bodies 70. When the aggregate 55 in this state is cured, a fiber-reinforced resin structure 100-10 having a core material SZ is formed as shown in FIG. 45(c).

Modified Example 10-2

As shown in FIG. 45(d), after a plurality of (three in the drawing) stacks 50 are bundled so as to be in contact with each other, the outer peripheral body 70 is wound around the bundled stacks 50 so that the inner peripheral surface of the outer peripheral body 70 and the outer peripheral surface of the bundled stacks 50 are in contact with each other, thereby forming an assembly 55. When the whole assembly 55 is compressed so as to be drawn, as shown in FIG. 45(e), the cross-sectional shapes of the respective stacked bodies 50 are deformed so as to fill the gaps between the adjacent stacked bodies 50 and the gaps between the adjacent outer peripheral bodies 70, and the adjacent stacked bodies 50 and the adjacent outer peripheral bodies 70 are joined. When the foam 30 is removed after the assembly 55 in this state is cured, a cylindrical fiber-reinforced resin structure 100-11 in which a plurality of through holes H are formed is formed as shown in FIG. 45(f). In other words, the fiber-reinforced resin structure 100-11 is formed as a cylindrical member having a partition wall (rib) KH which partitions the inside of a cylinder into three sections inside. In this way, by having the partition wall KH, the strength of the fiber-reinforced resin structure 100-11 can be improved.

Modified Example 10-3

Figure 45:
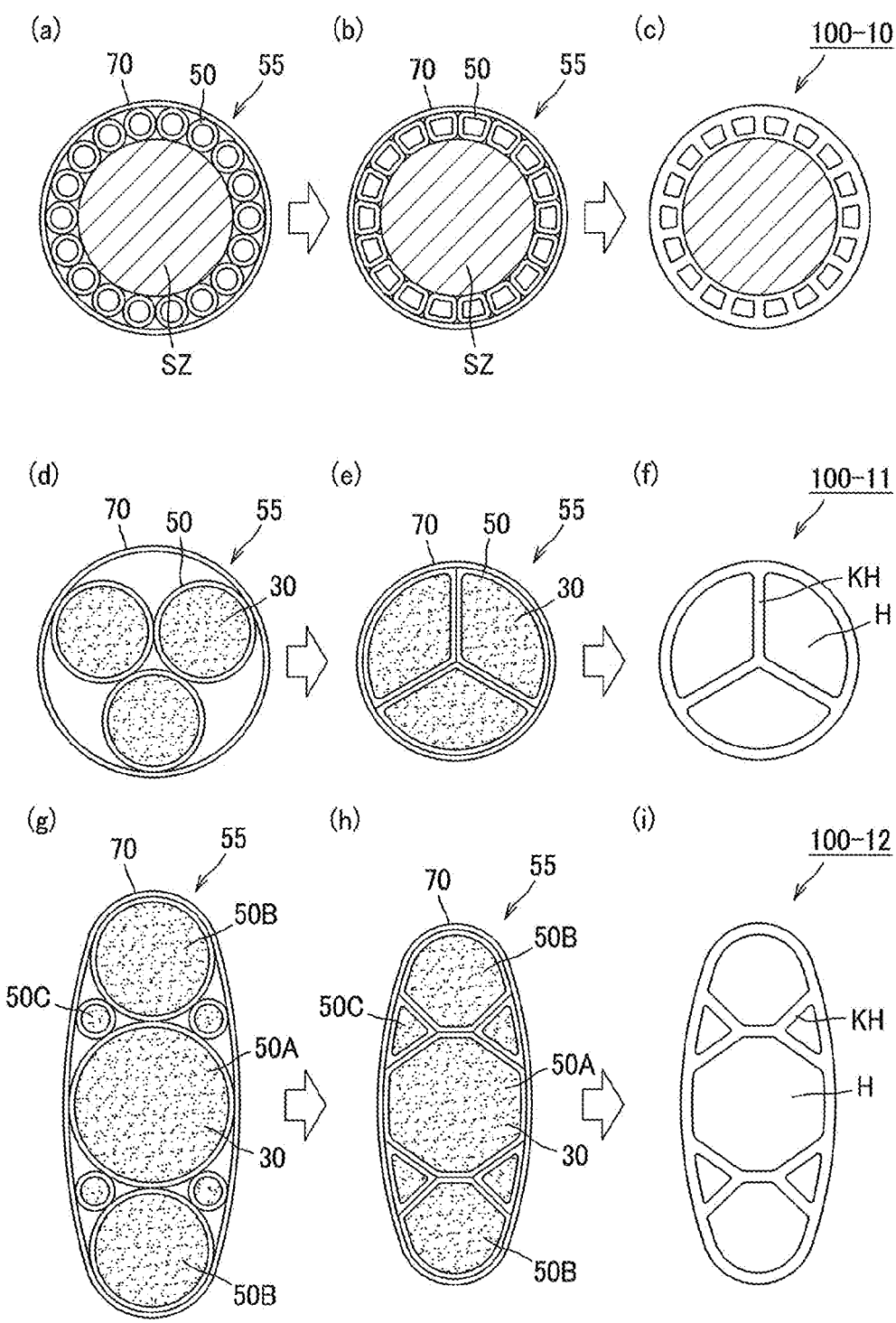
FIG. 45 is a perspective view showing a fiber-reinforced resin structure according to modifications 10-1 to 10-3.

As shown in FIG. 45(g), a laminate 50A in the center and laminates 50B smaller in diameter than the laminate 50 are arranged above and below the laminate 50A so as to be in contact with each other, and a laminate 50C smaller in diameter than the laminates 50A and 50B is arranged on both sides of a joint portion between the uppermost laminate 50B and the center laminate 50A and on both sides of a joint portion between the lowermost laminate 50B and the center laminate 50A so as to be in contact with the laminates 50A and 50B, respectively. After that, when the outer peripheral body 70 is wound around the peripheries thereof to form the assembly 55 and the entire assembly 55 is compressed, as shown in FIG. 45(*h*), the cross-sectional shapes of the stacked bodies 50A to 50C are deformed so as to fill the gaps between the adjacent stacked bodies 50A to 50C and the gaps between the adjacent stacked bodies 50A to 50C and the outer peripheral body 70, and the adjacent stacked bodies 50A to 50C and the outer peripheral body 70 are joined. When the foam body 30 is removed after the assembly 55 in this state is cured, as shown in FIG. 45(*i*), a cylindrical fiber-reinforced resin structure 100-12 having an elliptical cross-sectional shape in which a plurality of through holes H having different sizes are formed inside is formed. In other words, the fiber-reinforced resin structure 100-12 is formed as a cylindrical member having a partition wall KH that partitions the inside thereof into a plurality of sections, and the strength can be improved as described above by having the partition wall KH. In this way, by using the stacked body 50 having different diameters, a plurality of through holes KH having different cross-sectional areas can be formed, and the size and shape of the cross-sectional area of the through holes KH can be appropriately set by adjusting the size and shape of the stacked body 50. In the fiber-reinforced resin structure 100-11 shown in FIG. 45, in order to enhance the shape retention of the laminate 50 (foam 30), it is needless to say that the curing step may be performed in a state in which the laminate 50 (which may be a single laminate or a plurality of laminates) is fitted into a mold or a shrink tape is disposed around the laminate 50. The same is true for the fiber-reinforced resin structure 100-5 shown in FIGS. 36 to 38, the fiber-reinforced resin structure 100-9 shown in FIG. 44, and the like, and it is needless to say that the present invention can be applied to any of the embodiments described above as necessary.

Various fiber-reinforced resin structures having a complicated shape can be manufactured by appropriately combining the above-described steps.

<Use of Fiber-reinforced Resin Structure>

Although various fiber-reinforced resin structures have been described above, the fiber-reinforced resin structures described above can be applied to various structures. Next, the use of the fiber reinforced resin structure described herein is sequentially listed. The way of using the fiber-reinforced resin structure listed below is merely an example, and it is needless to say that the fiber-reinforced resin structure can be used as appropriate in addition to the ones listed below.

<Pipe Material>

Figure 15:
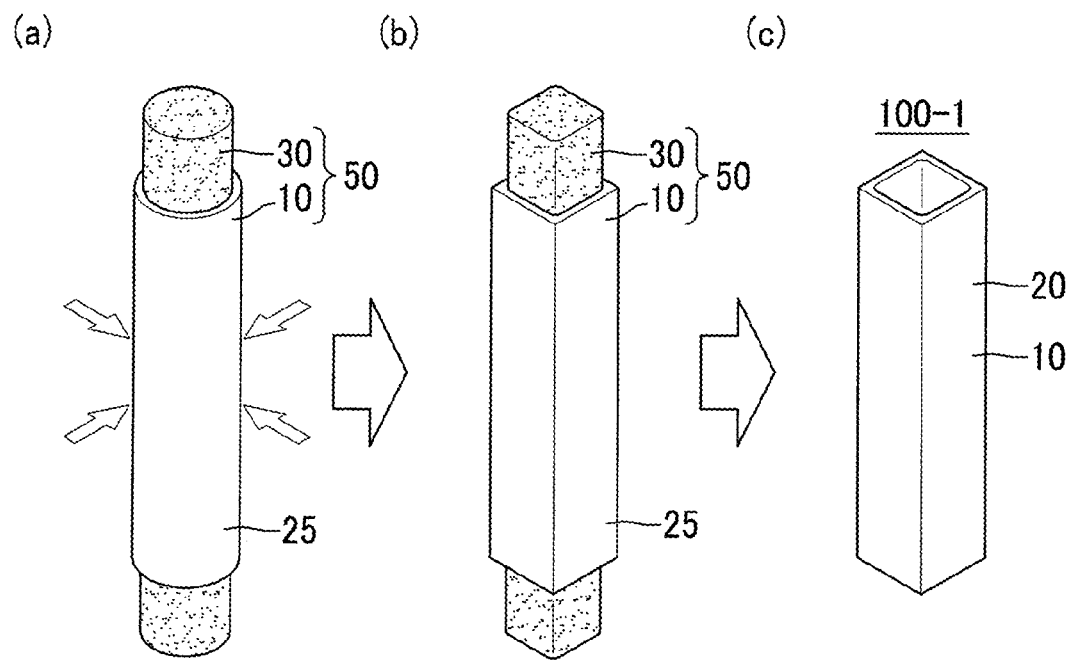
FIG. 15 is a perspective view showing a fiber-reinforced resin structure and a manufacturing method thereof according to a modification of embodiment I.
Figure 16:
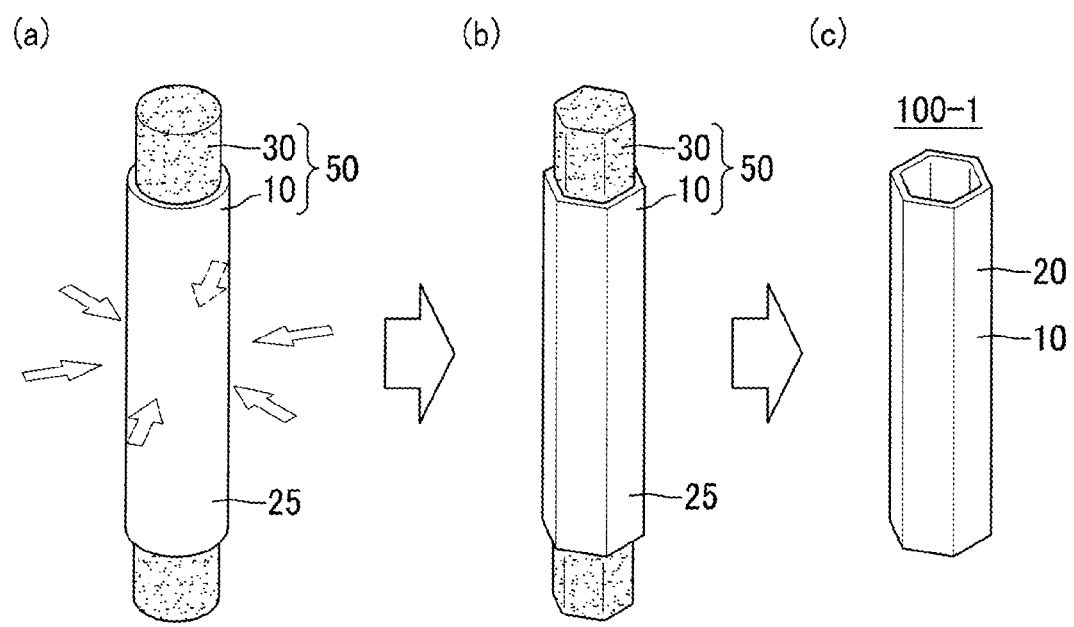
FIG. 16 is a perspective view showing a fiber-reinforced resin structure and a method of manufacturing the same according to a modification of embodiment I.

For example, the fiber reinforced resin structure 100-1 shown in FIGS. 14 to 16, such as a cylindrical shape, a quadrangular prism shape, or a hexagonal prism shape, can be used as a pipe material. The fiber-reinforced resin structure as the pipe material is not limited to the fiber-reinforced resin structure 100-1 having the above-described cross-sectional shape, and for example, the cross-sectional shape may be a triangular shape or a trapezoidal shape, or as illustrated in FIGS. 23, 26 to 28, and 45, the fiber-reinforced resin structure may have a plurality of through holes having cross-sectional shapes and sizes different from each other, and may have partition walls that partition the through holes. Further, the fiber reinforced resin structure shown in FIGS. 17, 18, and 34 or the fiber reinforced resin structure in a bent shape shown in FIGS. 19, 39, and 40 may be used, and the fiber reinforced resin structure in the above-described embodiment or in an appropriate shape other than the above-described embodiment may be used depending on the usage or the specifications. The fiber-reinforced resin structure as the pipe member of this type may be provided with a flange portion or a handle portion.

<Panel Material>

For example, the fiber-reinforced resin structure shown in FIGS. 20 to 22, 29, 30, 32, 33, and 43 can be used as a panel material, and any of the fiber-reinforced resin structures can be connected to be straight, bent, or circular. In this case, for example, a fiber-reinforced resin structure shown in FIG. 42 may be used to connect a fiber-reinforced resin structure formed in a plate shape, or as shown in FIG. 43, a protruding portion (connecting portion) 70G shown in FIG. 43 may be provided in any of the fiber-reinforced resin structures to connect the fiber-reinforced resin structures.

<Bicycle Related>

The fiber-reinforced resin structure of the above-described embodiment can be used, for example, in a handle, a frame, or the like of a bicycle.

<Motorcycle Related>

The fiber-reinforced resin structure of the above-described embodiment can be used for, for example, a handle, a frame, a swing arm, a cowling, a wing, a manifold, a wheel, various pipes through which gas and liquid pass, and the like of a motorcycle.

<Automobile Related>

The fiber-reinforced resin structure of the above-described embodiment can be used, for example, in a reinforcement (pillar, side sill, seat structure, etc.), a wing, a hood, a floor panel (bulkhead, etc.), a roof panel (outer panel, door beam, etc.), a bucket seat, a tower bar, an intake manifold, an under panel, a wheel, various pipes through which gas and liquid pass, and the like of a vehicle.

<Bus Related>

The fiber-reinforced resin structure of the above-described embodiment can be used for, for example, a reinforcement (pillar, side sill, seat structure, or the like), a wing, a hood, a floor panel (bulkhead, or the like), a roof panel (outer panel, door beam, or the like), a bucket seat, a tower bar, an intake manifold, an under panel, a wheel, various pipes through which gas and liquid pass, a baggage rack, a handrail (various pipes as a handrail), or the like of a bus.

<Truck Related>

The fiber-reinforced resin structure of the above-described embodiment can be used for, for example, a reinforcement (pillar, side sill, seat structure, etc.), a wing, a hood, a floor panel (bulkhead, etc.), a roof panel (outer panel, door beam, etc.), a bucket seat, a tower bar, an intake manifold, an under panel, a wheel, various pipes through which gases and liquids pass, an aerodynamic panel, a load-carrying panel, a maintenance panel (seat structure, pillar, ladder frame, etc.), a load container, a cold-holding vehicle container, a camping car shell, an intake manifold of a traction trailer, a car for high-facility work, a side guard (wheel), and the like of a truck.

<Container Related>

The fiber reinforced resin structure of the above embodiment may be used for an outer panel, a floor panel, a frame, etc. in a luggage container, a container house, a dome house, etc.

<Train Related>

The fiber-reinforced resin structure of the above-described embodiment can be used for, for example, a door panel, an interior parting (seat structure), a baggage rack, a handrail (various pipes as a handrail), a home door, and the like of a vehicle body of a train.

<Aircraft Related>

The fiber-reinforced resin structure of the above-described embodiment can be used for, for example, a seat structure, an intake manifold, a propeller, a blade, a wing, a rotor of a helicopter, a turbine component, a parting, a door panel, a bulkhead, various pipes through which gas and liquid pass, and the like of an aircraft.

<Spacecraft Related>

The fiber-reinforced resin structure of the above-described embodiment can be used for, for example, a seat structure (rocket, etc.), an intake manifold, wings, blades, turbine components, bulkheads, various pipes through which gases and liquids pass, and the like of a spacecraft.

<Ship Related>

The fiber-reinforced resin structure of the above-described embodiment can be used for, for example, a seat structure, a hull, a deck (floor panel), a ladder, a keel, a mast, a boom, a propeller, a blade, a bulkhead, an all, an all, a paddle, an intake manifold, and various pipes through which gas and liquid pass of a ship.

Building Related>

The fiber-reinforced resin structure of the above-described embodiment can be used for, for example, a floor panel, a wall panel, a roof panel, a frame member, a partition, a container house, a door panel, an arcade, or the like of a building.

<Civil Engineering, Infrastructure and other Related>

The fiber-reinforced resin structure of the above-described embodiment can be used for, for example, piping such as a water pipe, a gate bar, a fence, a safety fence, a water tank, a lid, a parabolic antenna, a blade, a support column, an elevator cage, a case, a home door, an insulating work table, an insulating husks, a tank, a shelter, a grating (an appropriate shape such as a honeycomb is applicable), a floating tool, an artificial fishing wheel, a growth-habitus fence, a gate door, a bench, various parts of a musical instrument, and the like.

<Industrial Equipment Related>

The fiber-reinforced resin structure of the above-described embodiment can be used, for example, for various components of an industrial robot, rollers, working tables, turbine components, and the like.

<Medical Equipment Related>

The fiber-reinforced resin structure of the above-described embodiment can be used for, for example, a medical device head, an X-ray fluoroscopic rack, an X-ray fluoroscopic surgical table, a car part, a crutch, a medical robot part, an infectious disease isolation shelter, and various pipes through which gases and liquids pass.

<Sports Related>

It can be used for a bat of a baseball, a racket (such as a frame) such as tennis, a table tennis racket, a stick or a puck of an ice hockey, a shaft portion such as a driver or an iron of golf, a fishing rod (rod), and the like.

DESCRIPTION OF THE REFERENCE NUMERALS

100-1 to 100-12 fiber-reinforced resin structure
10 fiber body
15 reinforcing member
20 resin (cured resin)
25 resin (uncured resin)
30 foam
50 laminate
55 aggregate
60 bending portion
70 outer peripheral body
A cylindrical axis
B cylindrical shaft
C hole axis
H communication hole

The invention claimed is:

1. A method of manufacturing a fiber-reinforced resin structure, comprising the steps of:
preparing an assembly having a first foam body in a columnar shape, which is a flexible body, a first fiber body which is wound one or more turns around a side surface portion of the first foam body, a second foam body in a columnar shape, which is a flexible body, and a second fiber body which is wound one or more turns around the second foam body, wherein a column axis of the first foam body and a column axis of the second foam body are arranged parallel such that the column axis of the first foam body and the column axis of the second foam body are directed to the same direction and the first fiber body and the second fiber body are contact with each other, and wherein both the first foam body and the second foam body do not have a hollow portion having a diameter that is $\frac{1}{20}$ or more of each outer diameter of the first foam body and the second foam body, and wherein an uncured thermosetting resin is impregnated in the first fiber body and the second fiber body,
curving the assembly so that the column axis of the first foam body and the column axis of the second foam body are curved together in parallel to the same degrees as the first fiber body and the second fiber body are curved,
thermally curing the thermosetting resin included in the assembly in order for the first foam body and the second foam body to remain in a posture in which the first foam body and the second foam body are curved,
cooling the assembly to shrink the first foam body and the second foam body after the thermally curing step, and
removing the first foam body and the second foam body from the assembly;
wherein
the uncured thermosetting resin is one or more selected from the group consisting of an epoxy resin, an unsaturated polyester resin, a polyvinyl ester resin, a phenol resin, a polyurethane resin, an acrylic resin, a melamine resin, a urea resin, a benzoguanamine resin, a rosin-modified maleic acid resin and a rosin-modified fumaric acid resin,
a resin constituting the first foam body and the second foam body is polyethylene and/or polypropylene, and
each of the first foam body and the second foam body is a closed cell foam or a foam containing both closed cells and open cells, wherein, in the case where the first foam body and/or the second foam body contain closed cells and open cells, the closed cell ratio is 50.0 to 99.9%.

2. The method according to claim 1, further comprising: a deforming step of applying an external force to the assembly to deform the cross-sectional shapes of the first foam body and the second foam body before the thermally curing step.

3. The method according to claim 1, wherein the first foam body and the second foam body have a density of 1 to 800 kg/m$^3$.

4. The method according to claim 2, wherein the deforming step is performed in a reduced pressure atmosphere.

5. A method of manufacturing a fiber-reinforced resin structure, comprising the steps of:
preparing an assembly having a first foam body in a columnar shape, which is a flexible body, a first fiber body which is wound one or more turns around a side surface portion of the first foam body, a second foam body in a columnar shape, which is a flexible body, and a second fiber body which is wound one or more turns around the second foam body, wherein a column axis of the first foam body and a column axis of the second foam body are arranged parallel such that the column axis of the first foam body and the column axis of the second foam body are directed to the same direction and the first fiber body and the second fiber body are contact with each other, and wherein both the first foam body and the second foam body do not have a hollow portion having a diameter that is 1/20 or more of each outer diameter of the first foam body and the second foam body, and wherein an uncured thermosetting resin is impregnated in the first fiber body and the second fiber body,
applying an external force to the assembly to deform the cross-sectional shapes of the first foam body and the second foam body,
thermally curing the thermosetting resin included in the assembly in order for the first foam body and the second foam body to remain in a posture in which the first foam body and the second foam body are deformed,
cooling the assembly to shrink the first foam body and the second foam body after the thermally curing step, and
removing the first foam body and the second foam body from the assembly;
wherein
the uncured thermosetting resin is one or more selected from the group consisting of an epoxy resin, an unsaturated polyester resin, a polyvinyl ester resin, a phenol resin, a polyurethane resin, an acrylic resin, a melamine resin, a urea resin, a benzoguanamine resin, a rosin-modified maleic acid resin and a rosin-modified fumaric acid resin,
a resin constituting the first foam body and the second foam body is polyethylene and/or polypropylene, and
each of the first foam body and the second foam body is a closed cell foam or a foam containing both closed cells and open cells, wherein, in the case where the first foam body and/or the second foam body contain closed cells and open cells, the closed cell ratio is 50.0 to 99.9%.

6. The method according to claim 5, wherein the first foam body and the second foam body have a density of 1 to 800 kg/m$^3$.

7. The method according to claim 5, wherein the applying step is performed in a reduced pressure atmosphere.

8. The method according to claim 1, wherein a 25% compressive load measured according to JIS K6400-2:2012 of the first foam body and the second foam body is 1 to 2000 kPa.

9. The method according to claim 5, wherein a 25% compressive load measured according to JIS K6400-2:2012 of the first foam body and the second foam body is 1 to 2000 kPa.

10. The method according to claim 1, wherein the first foam body and the second foam body have a tensile elongation at break at 25° C. of greater than 25% and less than 400%.

11. The method according to claim 5, wherein the first foam body and the second foam body have a tensile elongation at break at 25° C. of greater than 25% and less than 400%.

12. The method according to claim 1, wherein the linear thermal expansion coefficient of the first foam body and the second foam body is 0.01% or more and 10.00% or less.

13. The method according to claim 5, wherein the linear thermal expansion coefficient of the first foam body and the second foam body is 0.01% or more and 10.00% or less.

14. The method according to claim 1, wherein the softening point of the resin constituting the first foam body and the second foam body is 60 to 200° C.

15. The method according to claim 5, wherein the softening point of the resin constituting the first foam body and the second foam body is 60 to 200° C.

* * * * *